United States Patent
Omura et al.

(10) Patent No.: US 8,083,078 B2
(45) Date of Patent: Dec. 27, 2011

(54) VIBRATION-BASED EJECTION CASSETTE, DRUG DISPENSING APPARATUS, PTP DISPENSING APPARATUS, PHARMACEUTICAL PRODUCT STORAGE APPARATUS AND PTP DISPENSING SYSTEM

(75) Inventors: Shiro Omura, Tokyo (JP); Yoshihito Omura, Tokyo (JP); Hideaki Hirobe, Tokyo (JP)

(73) Assignee: Tosho Inc., Tokyo (JP)

( * ) Notice: Subject to any disclaimer, the term of this patent is extended or adjusted under 35 U.S.C. 154(b) by 723 days.

(21) Appl. No.: 11/576,974

(22) PCT Filed: Sep. 2, 2005

(86) PCT No.: PCT/JP2005/016145
§ 371 (c)(1),
(2), (4) Date: Apr. 10, 2007

(87) PCT Pub. No.: WO2006/040887
PCT Pub. Date: Apr. 20, 2006

(65) Prior Publication Data
US 2008/0061071 A1  Mar. 13, 2008

(30) Foreign Application Priority Data

| Oct. 12, 2004 | (JP) | 2004-297063 |
| Oct. 12, 2004 | (JP) | 2004-297064 |
| Oct. 12, 2004 | (JP) | 2004-297065 |
| Feb. 17, 2005 | (JP) | 2005-040296 |
| Jun. 29, 2005 | (JP) | 2005-190718 |
| Jun. 29, 2005 | (JP) | 2005-190724 |

(51) Int. Cl.
*A47F 1/04* (2006.01)
*A47F 7/00* (2006.01)
*B65G 59/00* (2006.01)
*B65H 3/00* (2006.01)
*G07F 11/16* (2006.01)

(52) U.S. Cl. .............. 211/59.3; 211/59.2; 211/59.4; 211/51; 221/125; 221/232; 221/126; 221/127; 221/129; 221/153; 221/154

(58) Field of Classification Search .......... 221/59.2, 221/59.3, 59.4, 125, 232, 126, 127, 129, 221/153, 154; 211/59.2, 59.3, 59.4, 51; 312/61
See application file for complete search history.

(56) References Cited

U.S. PATENT DOCUMENTS
2,893,596 A * 7/1959 Gabrielsen ............ 221/129
(Continued)

FOREIGN PATENT DOCUMENTS
JP 06-135401 5/1994
(Continued)

OTHER PUBLICATIONS
International Search report for International Application PCT/JP2005/016145.
(Continued)

*Primary Examiner* — Gene O. Crawford
*Assistant Examiner* — Rakesh Kumar
(74) *Attorney, Agent, or Firm* — Matthew B. Dernier, Esq.; Gibson & Dernier LLP

(57) ABSTRACT

A vibration-assisted ejection cassette includes: outer plates 11 which align PTP-packaged drugs 20 for storage; a top frame 12 which is provided above an open front and which prevents accommodated drugs from being falling forward; an inner plate 13 which carries the accommodated drugs and advances the drugs when vibrated; and a vibrating member 15 which vibrates the inner plate 13. Thereby, vibration is exploited to maintain the drugs 20 in alignment with each other, advance the drugs while maintaining the drugs in alignment and eject them one by one. Additionally, a retention member 18 for retaining an ejected drug is provided in front of the open front. A control circuit 17 activates or stops activating the vibrating member 15 in accordance with whether or not an ejection detecting member detects that a drug is being retained. In this way, it is ensured that drugs are either manually picked up one by one or ejected by an automatic mechanism in an equally easy and stable manner.

13 Claims, 44 Drawing Sheets

U.S. PATENT DOCUMENTS

| | | | | |
|---|---|---|---|---|
| 3,703,232 A | * | 11/1972 | Zbiegien | 198/383 |
| 4,279,534 A | * | 7/1981 | Eigenmann | 404/72 |
| 4,336,892 A | * | 6/1982 | Cox et al. | 221/125 |
| 4,869,395 A | * | 9/1989 | Rubbmark | 221/131 |
| 5,105,930 A | * | 4/1992 | Spatafora et al. | 198/453 |
| 5,207,784 A | * | 5/1993 | Schwartzendruber | 221/6 |
| 5,263,596 A | * | 11/1993 | Williams | 221/153 |
| 5,639,995 A | * | 6/1997 | Mosher | 177/64 |
| 5,671,262 A | * | 9/1997 | Boyer et al. | 377/11 |
| 6,079,549 A | * | 6/2000 | Meitinger | 198/751 |
| 6,189,727 B1 | * | 2/2001 | Shoenfeld | 221/2 |
| 6,742,671 B2 | * | 6/2004 | Hebron et al. | 221/9 |
| 7,404,494 B2 | * | 7/2008 | Hardy | 211/59.3 |
| 2005/0189309 A1 | * | 9/2005 | Hardy | 211/59.3 |
| 2009/0014461 A1 | * | 1/2009 | Omura et al. | 221/156 |

FOREIGN PATENT DOCUMENTS

| | | | |
|---|---|---|---|
| JP | 10192369 A | * | 7/1998 |
| JP | 11-114025 | | 4/1999 |
| JP | 2000-024083 | | 1/2000 |
| JP | 2000-167023 | | 6/2000 |
| JP | 2001-097532 | | 4/2001 |
| JP | 2001-198190 | | 7/2001 |
| JP | 2001-198194 | | 7/2001 |
| JP | 2004-148036 | | 5/2004 |
| JP | 2004-187958 | | 7/2004 |

OTHER PUBLICATIONS

International Preliminary Report on Patentability for International Application PCT/JP2005/016145.

* cited by examiner

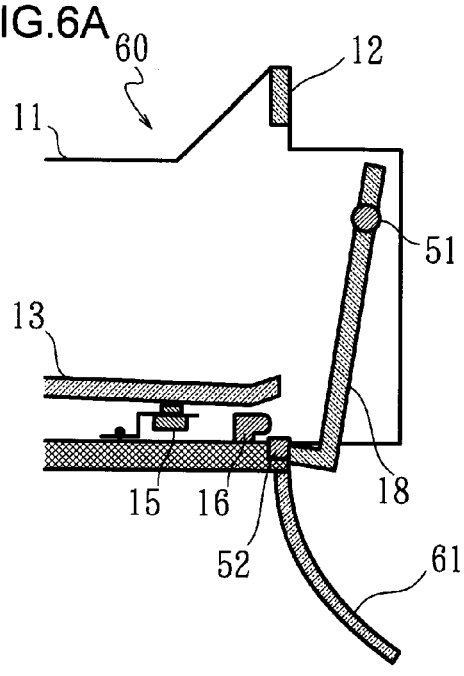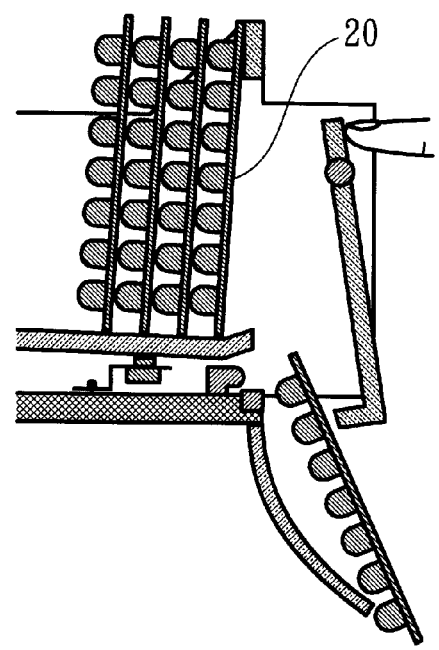

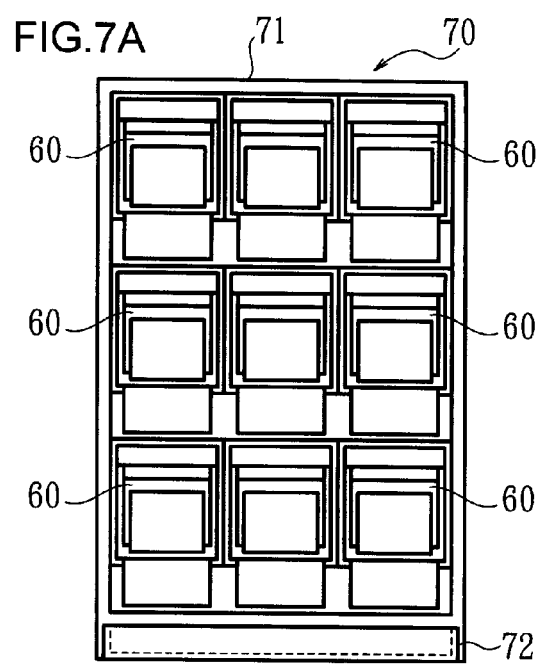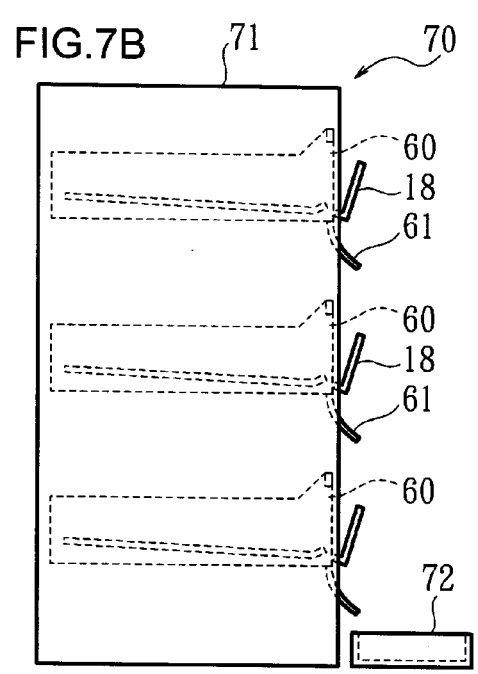

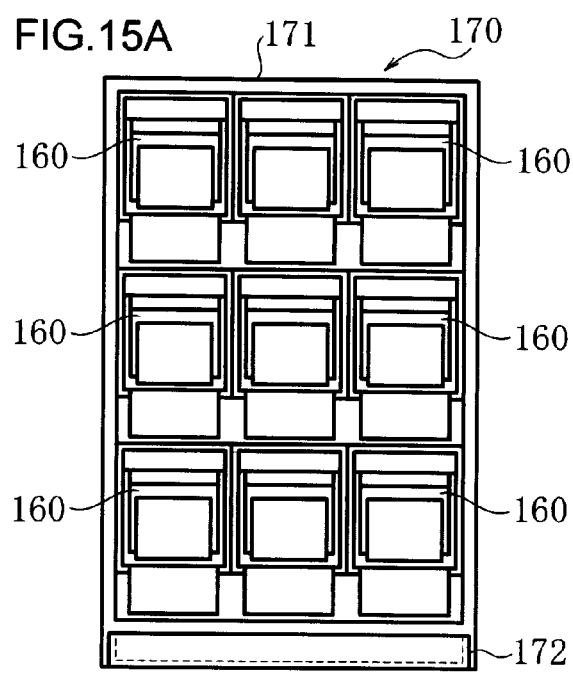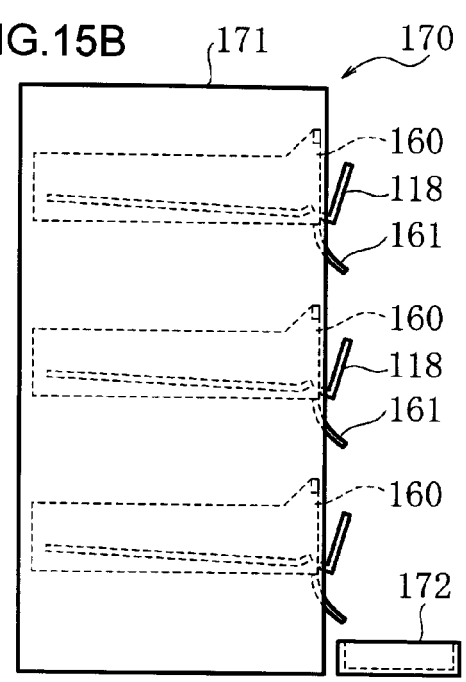

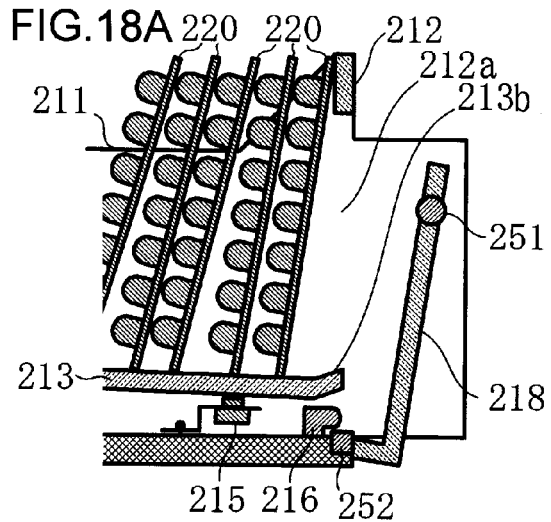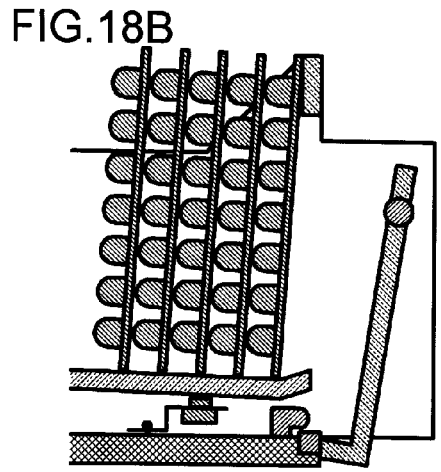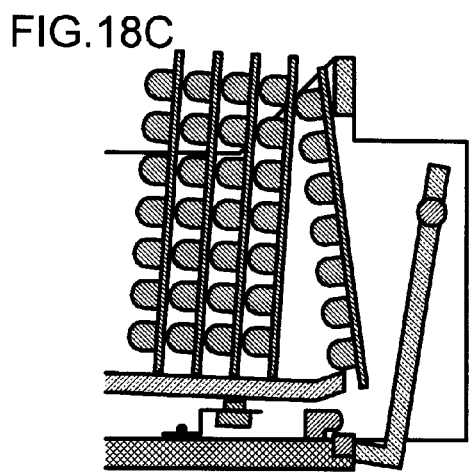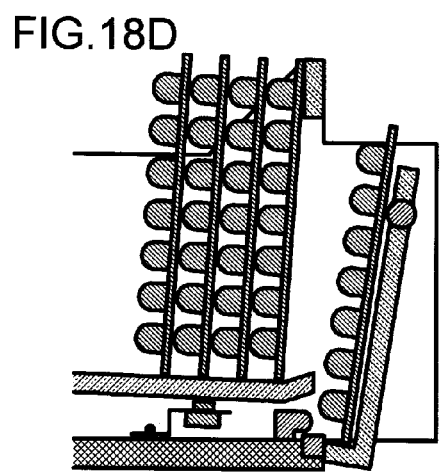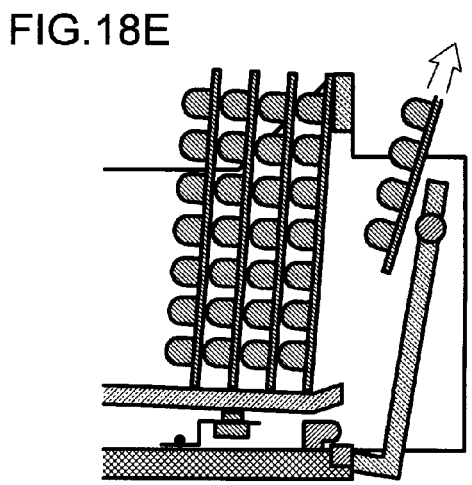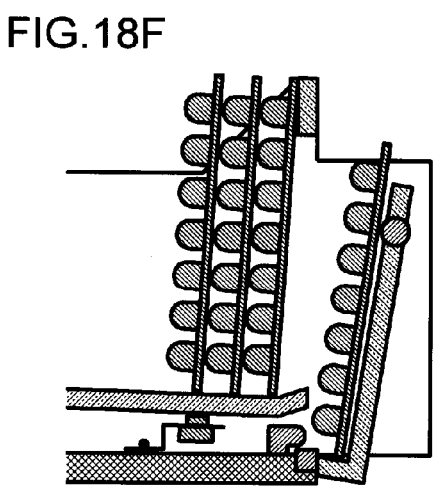

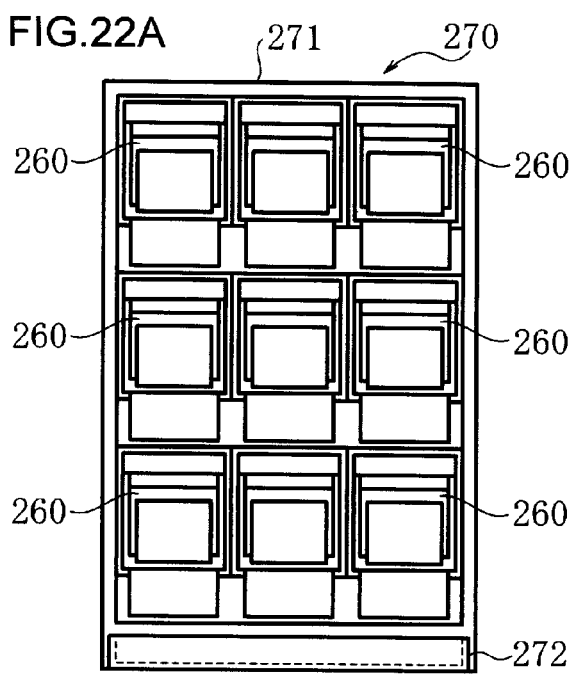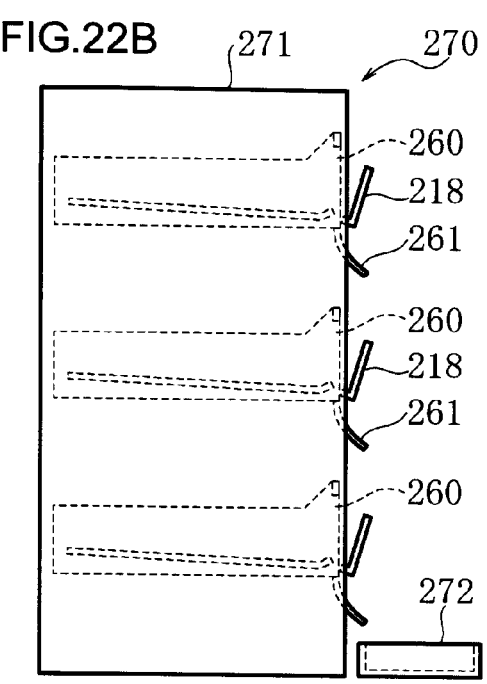

VIBRATION-BASED EJECTION CASSETTE, DRUG DISPENSING APPARATUS, PTP DISPENSING APPARATUS, PHARMACEUTICAL PRODUCT STORAGE APPARATUS AND PTP DISPENSING SYSTEM

TECHNICAL FIELD

The present invention relates to a vibration-assisted ejection cassette, a drug dispensing apparatus and a PTP dispensing apparatus which align PTP-packaged or equivalently packaged drugs for storage and which sequentially eject the drugs. The invention also relates to a pharmaceutical product storage apparatus such as a medicine storage apparatus, a medicine rack, a preparation table and a medical tool storage. The invention also relates to a PTP dispensing system which stores PTP-packaged or equivalently packaged drugs and also other types of pharmaceutical products and which dispenses necessary pharmaceutical products in accordance with prescription or the like.

BACKGROUND TECHNOLOGY

Drug dispensing apparatuses for drug preparation capable of dispensing drugs of various forms are provided (see, for example, patent document No. 1). The document discloses an apparatus for dispensing drugs for preparation, provided with a large number of drug cassettes accommodating drugs and a dispensing/transporting mechanism for retrieving a desired drug from the drug cassette accommodating the desired drug and transporting the retrieved drug to a predetermined position. The dispensing/transporting mechanism is provided with a friction member responsible for dispensing drugs. A large number of projections are formed on the friction surface facing the drug cassette. The friction member is driven upward or diagonally upward. The apparatus has extensive applications so long as it is provided with the friction surface, regardless of different forms and hardness of drugs.

There is also available an apparatus for dispensing drugs for preparation, designed to dispense various drugs for preparation by sucking in a drug for dispensing (see, for example, patent document No. 2). The apparatus is provided with a large number of drug cassettes stored in a rotatable container and a retrieval mechanism for retrieving drugs by sucking in a drug from a drug cassette brought to a position for retrieval. By fixing the retrieving mechanism and allowing it to be shared by multiple cassettes, the structure of the drug cassettes, which are large in number, is simplified. There is no need to install pipes for sucking in drugs in various places, either.

There is also available a powder medicine supplying apparatus capable of configuring the condition of vibration automatically (see, for example, patent document No. 3). The apparatus is provided with a powder medicine feeder for feeding powder medicine by vibration, a controlling means for configuring the intensity of vibration in accordance with the type and weight of powder medicine, and a correcting means for correcting the configuration in accordance with the characteristics of the powder medicine feeder. Further, the apparatus is provided with an input means for entering the type and weight of powder medicine, a first configuration determining means for referring to the type of powder medicine so as to determine a predetermined category defined according to the grain size, and a second configuration determining means for determining the intensity of vibration in accordance with the category determined by the first configuration determining means. By correcting the intensity of vibration, which is configured in accordance with the type of powder medicine, in accordance with the characteristics of the powder feeder, tolerance requirements for individual powder feeders are made less severe and differences in them are canceled.

There is also available a medicine storage apparatus capable of making available a pharmaceutical product in one action, returning the product without disrupting the arrangement and keeping track of storage status properly (see, for example, patent document No. 4). The apparatus is provided with a large number of drug cassettes which align pharmaceutical products for storage, a support means which holds an array of the cassettes, wherein a mouth is formed in the cassette to allow extracting a pharmaceutical product from the cassette or forcing a pharmaceutical product into the cassette. A biasing means for biasing the accommodated pharmaceutical product toward the mouth is also provided. The support means holds the cassette with the mouth being exposed. The apparatus is also provided with a counting means for counting the number of pharmaceutical products stored. With this structure, pharmaceutical products can be manually and directly retrieved from and stored in the cassette. The number of pharmaceutical products in the cassettes is counted automatically.

There is also available a pharmaceutical product storage apparatus capable of individual shuttering so that storage according to the category and selective dispensing is performed easily and properly by a manual operation (see, for example, patent document No. 5). The apparatus is provided with multiple containers each provided with an opening covered by an openable and closable cover member so that pharmaceutical products are retrieved and stored via the opening. The apparatus is further provided with multiple drive means provided in respective containers to activate and open the associated shutter member, multiple indicators provided in respective containers to display at least a one-digit number, and a control device which selects one or multiple containers in accordance with pharmaceutical product dispensing information so as to activate the drive means associated with the selection and cause the indicator associated with the selection to display the number of products retrieved. With this structure, the operation of opening the shutter member and the counting of the number of products retrieved, as well as the selection of a pharmaceutical product stored according to the category, are performed automatically. Thus, the location of a desired pharmaceutical product is immediately known and the product is brought to a retrievable state concurrently. In addition to this, visual guidance to the location is provided.

As described, in the case of non-packaged powder medicine, a vibration-assisted feeder is used in combination with weight measurement so that a desired amount is supplied. In the case of drugs that can be grasped easily such as ampouled injection medicines, vibration is not utilized. Drugs are aligned for storage in cassettes, and the biasing means advances the accommodated drugs so that the drugs are taken out one by one from the queue or ejected by an automatic mechanism. Vibration is not utilized, either, if the drugs are individually packaged as in the case of PTP-packaged drugs. Drugs are aligned for storage in cassettes and are taken out one by one from the queue. Pharmaceutical product storage apparatuses in which individual shuttering and selective dispensing are performed manually is capable of providing guidance on the number of products retrieved. However, such apparatuses do not align products for storage so that it cannot be known whether retrieval takes place.

[patent document No. 1]
JP 2000-024083 (page 1)
[patent document No. 2]
JP 2000-167023 (page 1)
[patent document No. 3]
JP 2001-097532 (page 1)
[patent document No. 4]
JP 2001-198190 (page 1)
[patent document No. 5]
JP 2004-187958 (page 1)
[patent document No. 6]
JP 2001-198194 (FIG. 5, FIG. 11)
[patent document No. 7]
JP 2004-148036 (page 1, FIG. 4)

Meanwhile, PTP-packaged drugs, even as they are individually packaged, are thin and irregular in cross section. As such, it is not necessarily easy to properly grasp the one at the head of the queue of drugs aligned for storage. The ejecting mechanism can be simplified only in a limited way if automatization is achieved by a mechanism for grasping or absorbing drugs. To eliminate a biasing means for advancing accommodated drugs, there would be required, for example, a mechanism for translating the absorbing mechanism instead.

DISCLOSURE OF THE INVENTION

In this background, it is desirable to simplify the mechanism by putting the vibration-assisted method, which is used in a powder medicine feeder, to the use of dispensing PTP-packaged drugs and, in this process, eliminating the need for a weighing member for measuring weight or a biasing member for advancing drugs. That is, a technical task to be achieved is to utilize vibration so as to maintain PTP-packaged drugs in alignment with each other, advance the drugs while maintaining the drugs in alignment and eject them one by one.

An embodiment of the present invention relates to a vibration-assisted ejection cassette. The cassette comprises: outer plates which align PTP-packaged or equivalently packaged drugs for storage; a top frame which is provided above an open front and which prevents accommodated drugs from being falling forward; an inner plate which carries the accommodated drugs and advances the drugs when vibrated; and a vibrating member which vibrates the inner plate.

Another embodiment of the present invention also relates to a vibration-assisted ejection cassette. The vibration-assisted ejection cassette is for aligning PTP-packaged or equivalently packaged drugs for storage and sequentially ejecting the drugs, and comprises: outer plates which bound at least the sides of a drug accommodating space, the top of the space being open so as to facilitate replenishment of a drug and the front of the space being open so as to facilitate ejection of a drug; a top frame which is provided above the front of the space and which prevents a drug at the head of a queue of drugs accommodated from falling forward by interfering with the top end of the drug; an inner plate which is movably inserted to rest on the interior bottom of the drug accommodating space so as to be vibratably supported, the front end portion of the top face of the inner plate being formed as an ascending slope and the remaining portion being formed as a descending slope; and a vibrating member which vibrates the inner plate.

Another embodiment of the present invention also relates to a vibration-assisted ejection cassette. The cassette comprises: outer plates which align PTP-packaged or equivalently packaged drugs for storage; a top frame which is provided above an open front and which prevents accommodated drugs from being falling forward; an inner plate which carries the accommodated drugs and advances the drugs when vibrated; a vibrating member which vibrates the inner plate; a retention member which is provided in front of the open front and which retains the accommodated drug ejected from the open front; and a cassette controller which detects whether or not a drug is retained so as to activate the vibrating member when a drug is not retained and stop activating the vibrating member when a drug is retained.

Another embodiment of the present invention also relates to a vibration-assisted ejection cassette. The vibration-assisted ejection cassette comprises: outer plates which bound at least the sides of a drug accommodating space, the top of the space being open so as to facilitate replenishment of a drug and the front of the space being open so as to facilitate ejection of a drug; a top frame which is provided above the front of the space and which prevents a drug at the head of a queue of drugs accommodated from falling forward by interfering with the top end of the drug; an inner plate which is movably inserted to rest on the interior bottom of the drug accommodating space so as to be vibratably supported, the front end portion of the top face of the inner plate being formed as an ascending slope and the remaining portion being formed as a descending slope; a vibrating member which vibrates the inner plate; a retention member which is provided in front of the open front and which retains the accommodated drug ejected from the open front; and a cassette controller which detects whether or not a drug is retained so as to activate the vibrating member when a drug is not retained and stop activating the vibrating member when a drug is retained.

These vibration-assisted ejection cassettes may be arranged in a housing to form a drug dispensing apparatus. The cassette further comprises: a plurality of indicators which are provided directly in the respective vibration-assisted ejection cassettes or indirectly provided in association therewith, so as to display at least a one-digit number; and an apparatus controller which selects one of the indicators in accordance with drug dispensing information such as drug preparation data, which causes the selected indicator to display the number of drugs to be taken out, and which updates the displayed number in accordance with the detection of ejection from the vibration-assisted ejection cassette for which the selected indicator is provided.

Another embodiment of the present invention also relates to a vibration-assisted ejection cassette. The cassette comprises: outer plates which align PTP-packaged or equivalently packaged drugs for storage; a top frame which is provided above an open front and which prevents accommodated drugs from being falling forward; an inner plate which carries the accommodated drug and advances the drug when vibrated; a vibrating member which vibrates the inner plate; a retention member which is provided in front of the open front and which retains the accommodated drug ejected from the open front; and a controller which detects whether or not a drug is retained so as to activate the vibrating member when a drug is not retained and stop activating the vibrating member when a drug is retained, wherein the retention member is movable and adapted to be positioned to discharge a drug as well as being positioned to retain one.

Another embodiment of the present invention also relates to a vibration-assisted ejection cassette. The vibration-assisted ejection cassette is for aligning PTP-packaged or equivalently packaged drugs for storage and sequentially ejecting the drugs, and comprises: outer plates which bound at least the sides of a drug accommodating space, the top of the space being open so as to facilitate replenishment of a drug and the front of the space being open so as to facilitate ejection of a drug; a top frame which is provided above the front of the space and which prevents a drug at the head of a queue of drugs accommodated from falling forward by interfering with the top end of the drug; an inner plate which is movably inserted to rest on the interior bottom of the drug accommodating space so as to be vibratably supported, the front end portion of the top face of the inner plate being formed as an ascending slope and the remaining portion being formed as a descending slope; a vibrating member which vibrates the inner plate; a retention member which is provided in front of the open front and which retains the accommodated drug ejected from the open front; and a controller which detects whether or not a drug is retained so as to activate the vibrating member when a drug is not retained and stop activating the vibrating member when a drug is retained, wherein the retention member is movable and adapted to be positioned to discharge a drug as well as being positioned to retain one.

These vibration-assisted ejection cassettes may be arranged in a housing to form a drug dispensing apparatus. The apparatus may comprise an actuator mechanism which selects a desired vibration-assisted ejection cassette and activates the retention member of the selected cassette.

Another embodiment of the present invention relates to a PTP dispensing apparatus. The apparatus comprises: a large number of cassettes which align PTP-packaged or equivalently packaged drugs for storage so that the drugs are sequentially ejectable; a support which accommodates and holds the cassettes; a descent guidance member which guide the drugs discharged from the cassettes downward; and a collecting mechanism which collect the drugs, wherein each of the cassettes comprises: outer plates which accommodate drugs; a top frame which is provided above an open front and which prevents accommodated drugs from being falling forward; an inner plate which carries the accommodated drugs and advances the drugs when vibrated; a vibrating member which vibrates the inner plate; and a retention member which is provided in front of the open front and which retains the accommodated drug ejected from the open front, wherein an activating mechanism, which acts on the retention member so as to discharge a retained drug toward the descent guidance member, is provided for each cassette so as to detect whether or not a drug is retained in the retention member and activate the vibrating member when a drug is not retained and stop activating the vibrating member when a drug is retained.

In the top frame may be formed: a first contact surface interfering with the top end of the drug at the head of a queue on the inner plate; and a second contact surface located in front of and below the first contact surface and interfering with the top end of the drug retained on the retention member. The activating mechanism may axially rotate the retention member so that the retention member assumes one of two positions, i.e., a position to retain a drug and a position to discharge one.

Another embodiment of the present invention relates to a pharmaceutical product storage apparatus. The apparatus comprises: a large number of containers which accommodates pharmaceutical products; a storing unit which holds the containers in a two-dimensional array so that the containers are drawable in a forward direction; and a large number of container opening mechanisms, each of the mechanisms being provided behind the associated container and advancing the associated container, wherein the mechanism is of a type with reduced distance in driving, and a light projecting member for projecting light passing through a space in front of at least some of the containers in a pushed-back state is provided, and a visualizing means for directing the projected light forward is formed in or attached to the front end of each of the containers.

The container opening mechanism may be provided with a motor and an eccentric cam fitted to the rotation shaft of the motor.

Another embodiment of the present invention relates to a PTP dispensing system. The system comprises a PTP dispensing apparatus and a pharmaceutical product storage apparatus, the PTP dispensing apparatus holding an array of a large number of cassettes for aligning PTP-packaged or equivalently packaged drugs for storage so that the drugs are sequentially ejectable, the PTP dispensing apparatus automatically discharging the drugs from the cassettes and guiding the drugs downward for collection, the pharmaceutical product storage apparatus holding a two-dimensional array of a large number of containers accommodating pharmaceutical products so that the containers are adapted to be drawn forward, and the pharmaceutical product storage apparatus being configured to advance the containers by using container opening mechanisms provided behind the containers, wherein a work table is attached to the pharmaceutical storage apparatus, a chute is formed by cutting a portion of the work table, a weighing scale is provided in the chute, the system being further provided with a transporting mechanism for feeding a drug ejected by the PTP dispensing apparatus to the chute, wherein the cassette of the PTP dispensing apparatus maintains the drugs in alignment, advances the drugs while maintaining alignment thereof and sequentially ejects the drugs, and the pharmaceutical product storage apparatus is provided with a light projecting member for projecting light passing through a space in front of at least some of the containers in a pushed-back state, and wherein a visualizing means for directing the projected light forward is formed in or attached to the front end of each of the containers.

Another embodiment of the present invention also relates to a PTP dispensing system. The system comprises a PTP dispensing apparatus and a pharmaceutical product storage apparatus, the PTP dispensing apparatus holding an array of a large number of cassettes for aligning PTP-packaged or equivalently packaged drugs for storage so that the drugs are sequentially ejectable, the PTP dispensing apparatus automatically discharging the drugs from the cassettes and guiding the drugs downward for collection, the pharmaceutical product storage apparatus holding a two-dimensional array of a large number of containers accommodating pharmaceutical products so that the containers are adapted to be drawn forward, and the pharmaceutical product storage apparatus being configured to advance the containers by using container opening mechanisms provided behind the containers, wherein the PTP dispensing apparatus is configured such that vibration is used by the cassette to maintain the drugs in alignment, to advance the drugs while maintaining alignment thereof and to sequentially eject the drugs, and the pharmaceutical product storage apparatus is provided with a light projecting member for projecting light passing through a space in front of at least some of the containers in a pushed-back state, and wherein a visualizing means for directing the projected light forward is formed in or attached to the front end of each of the containers.

Another embodiment of the present invention also relates to a PTP dispensing system. The system comprises a PTP dispensing apparatus and a pharmaceutical product storage apparatus, the PTP dispensing apparatus holding an array of a large number of cassettes for aligning PTP-packaged or equivalently packaged drugs for storage so that the drugs are sequentially ejectable, the PTP dispensing apparatus automatically discharging the drugs from the cassettes and guiding the drugs downward for collection, the pharmaceutical product storage apparatus holding a two-dimensional array of a large number of containers accommodating pharmaceutical products so that the containers are adapted to be drawn forward, and the pharmaceutical product storage apparatus being configured to advance the containers by using container opening mechanisms provided behind the containers, wherein a work table is attached to the pharmaceutical storage apparatus, a chute is formed by cutting a portion of the work table, a weighing scale is provided in the chute, the system being further provided with a transporting mechanism for feeding a drug ejected by the PTP dispensing apparatus to the chute.

According to the present invention, the task of dispensing drugs such as PTP-packaged drugs can be performed efficiently.

BRIEF DESCRIPTION OF THE DRAWINGS

FIG. 1A is a perspective view showing the appearance of the cassette. FIG. 1B is a sectional left side view of the cassette. FIG. 1C is a perspective view showing the appearance of a PTP-packaged drug. FIG. 1D is a sectional left side view of an essential part of the cassette aligning drugs for storage.

FIGS. 2A-2F are sectional left side views of an essential part of the cassette.

FIGS. 3A-3B are sectional left side views of the cassette.

FIG. 4A is a front view. FIG. 4B is a sectional left side view.

FIGS. 5A-5F are sectional left side views of an essential part of the cassette.

FIGS. 6A-6B show the structure of a vibration-assisted ejection cassette according to an illustrative embodiment 1-5 of the first embodiment. FIGS. 6A-6B are sectional left side views of an essential part of the cassette.

FIGS. 7A-7B show the structure of a drug dispensing apparatus according to an illustrative embodiment 1-6 of the first embodiment. FIG. 7A is a front view. FIG. 7B is a sectional left side view.

FIG. 9A is a perspective view showing the appearance of a cassette. FIG. 9B is a sectional left side view of the cassette. FIG. 9C is a perspective view showing the appearance of a PTP-packaged drug. FIG. 9D is a sectional left side view of an essential part of the cassette aligning drugs for storage.

FIGS. 10A-10F are sectional left side views of an essential part of the cassette.

FIGS. 11A-1B show the structure of a vibration-assisted ejection cassette according to an illustrative embodiment 2-2 of the second embodiment. FIGS. 11A-11B are sectional left side views of the cassette.

FIG. 12A is a front view. FIG. 12B is a sectional left side view.

FIGS. 13A-13F are sectional left side views of an essential part of the cassette.

FIGS. 14A-14B are sectional left side views of an essential part of the cassette.

FIGS. 15A-15B show the structure of a drug dispensing apparatus according to an illustrative embodiment 2-6 of the second embodiment. FIG. 15A is a front view. FIG. 15B is a sectional left side view.

FIG. 16A is a front view showing the whole apparatus. FIG. 16B is a front view of an indicator. FIG. 16C is a block diagram of a control circuit.

FIG. 17A is a perspective view showing the appearance of the cassette. FIG. 17B is a sectional left side view of the cassette. FIG. 17C is a perspective view showing the appearance of a PTP-packaged drug. FIG. 17D is a sectional left side view of an essential part of the cassette aligning drugs for storage.

FIGS. 18A-18F show how the vibration-assisted ejection cassette according to the illustrative embodiment 3-1 operates. FIGS. 18A-18B are sectional left side views of an essential part of the cassette.

FIGS. 19A-19F are sectional left side views of an essential part of the cassette.

FIGS. 20A-20B are sectional left side views of the cassette.

FIGS. 21A-21B are sectional left side views of an essential part of the cassette.

FIGS. 22A-22B show the structure of a drug dispensing apparatus according to an illustrative embodiment 3-4 of the third embodiment. FIG. 22A is a front view. FIG. 22B is a sectional left side view.

FIGS. 24A-24C show the structure of a PTP dispensing apparatus according to an illustrative embodiment 4-1 of a fourth embodiment. FIG. 24A is a front view. FIG. 24B is a sectional left side view. FIG. 24C is a sectional front view showing an essential part including two cassettes.

FIG. 30A is a front view of the whole apparatus. FIG. 30B is a perspective view of the whole apparatus. FIG. 30C is a perspective view of a container. FIG. 30D is a perspective view of a container opening mechanism. FIGS. 30E-30F are right side views of an essential part.

FIG. 32A is a perspective view of a container. FIG. 32B is a front view of a name plate. FIG. 32C is a perspective view of a container.

FIGS. 33A-33C are right side views of an essential part.

FIG. 34A is a front view of the whole apparatus. FIG. 34B is a front view of a pharmaceutical product storage apparatus. FIG. 34C is a perspective view of the apparatus.

FIG. 35A is a front view showing the whole apparatus. FIG. 35B is a perspective view of the whole apparatus. FIG. 35C is a perspective view of a container. FIG. 35D is a perspective view of a container opening mechanism. FIGS. 35E-35F are right side views of an essential part.

FIGS. 36A-36C show the structure of a PTP dispensing apparatus according to the illustrative embodiment 6-1. FIG. 36A is a front view. FIG. 36B is a right side view. FIG. 36C is a sectional front view of an essential part including two cassettes.

FIGS. 41A-40B are sectional front views of an essential part including one cassette.

FIG. 43A is a perspective view of a container. FIG. 43B is a front view of a name plate. FIG. 43C is a perspective view of a container.

FIGS. 44A-44C are right side views of an essential part.

EXPLANATION OF SYMBOLS

Figure 1A:
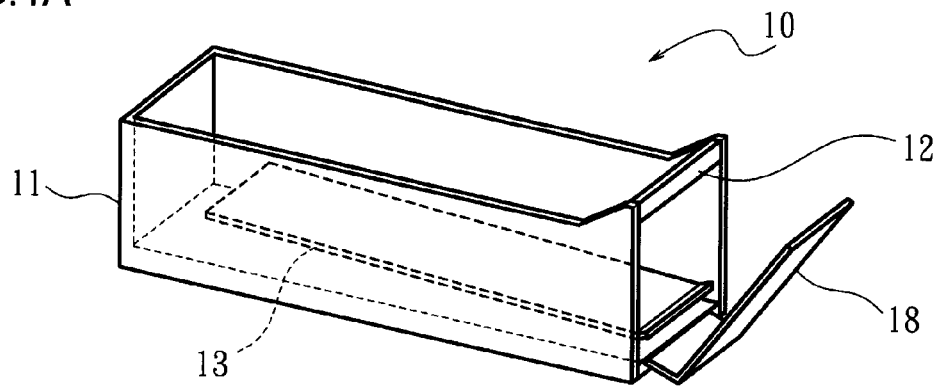
FIGS. 1A-1D show the structure of a vibration-assisted ejection cassette according to an illustrative embodiment 1-1 of a first embodiment of the present invention.

10 cassette (vibration-assisted ejection cassette), 11 outer plates, 12 top frame, 13 inner plate, 13a descending slope, 13b ascending slope, 14 elastic support member, 15 vibrating member, 16 ejection detecting member, 17 control circuit, 18 retention member, 20 drug (PTP-packaged or equivalently packaged drug), 30 cassette (vibration-assisted ejection cassette), 40 drug dispensing apparatus, 41 housing, 50 cassette (vibration-assisted ejection cassette), 51 pivotal shaft, 52 retention detecting member, 60 cassette (vibration-assisted ejection cassette), 61 descent guidance member, 70 drug dispensing apparatus, 72 receiving box, 80 drug dispensing apparatus, 81 housing, 82 Y axis, 83 X axis, 84 XY translation unit, 85 actuator, 86 collecting box, 110 cassette (vibration-assisted ejection cassette), 111 outer plates, 112 top frame, 113 inner plate, 113a descending slope, 113b ascending slope, 114 elastic support member, 115 vibrating member, 116 ejection detecting member, 117 cassette control circuit, 118 retention member, 120 drug (PTP-packaged or equivalently packaged drug), 130 cassette (vibration-assisted ejection cassette), 140 drug dispensing apparatus, 141 housing, 150 cassette (vibration-assisted ejection cassette), 151 pivotal shaft, 152 retention detecting member, 160 cassette (vibration-assisted ejection cassette), 161 descent guidance member, 170 drug dispensing apparatus, 171 housing, 172 receiving box, 180 drug dispensing apparatus, 181 indicator, 182 apparatus control circuit, 210 cassette (vibration-assisted ejection cassette), 211 outer plates, 212 top frame, 213 inner plate, 213a descending slope, 213b ascending slope, 214 elastic support member, 215 vibrating member, 216 ejection detecting member, 217 control circuit, 218 retention member, 220 drug (PTP-packaged or equivalently packaged drug), 230 cassette (vibration-assisted ejection cassette), 251 pivotal shaft, 252 retention detecting member, 260 cassette (vibration-assisted ejection cassette), 261 descent guidance member, 270 drug dispensing apparatus, 271 housing, 272 receiving box, 280 drug dispensing apparatus, 281 housing, 282 Y axis, 283 X axis, 284 XY translating unit, 285 actuator, 286 collecting box, 310 cassette (vibration-assisted ejection cassette), 311 outer plates, 312 top frame, 312a first contact surface, 312b second contact surface, 313 inner plate, 313a descending slope, 313b ascending slope, 314 elastic support member, 315 vibrating member, 316 ejection detecting member, 318 retention member, 320 drug (PTP-packaged or equivalently packaged drug), 340 PTP dispensing apparatus, 341 drawer rack, 342 descent guidance duct, 343 support member, 344 collecting mechanism, 345 transporting mechanism, 346 dispensing outlet, 351 connector, 352 control circuit, 353 solenoid, 354 hook member, 410 pharmaceutical product storage apparatus, 411 housing, 412 shutter, 413 light projecting member, 414 storing unit, 415 drawer, 416 electric equipment, 420 container, 421 front plate, 422 slope, 423 side plate, 424 bottom plate, 425 name plate, 430 motor, 431 rotation shaft, 432 eccentric cam, 433 origin sensor, 440 main controller, 441 subcontroller, 450 pharmaceutical product, 460 light receiving member, 1010 cassette (vibration-assisted ejection cassette), 1011 outer plates, 1012 top frame, 1012a first contact surface, 1012b second contact surface, 1013 inner plate, 1013a descending slope, 1013b ascending slope, 1014 elastic support member, 1015 vibrating member, 1016 ejection detecting member, 1018 retention member, 1020 drug (PTP-packaged or equivalently packaged drug), 1040 PTP dispensing apparatus, 1041 drawer rack, 1042 descent guidance duct, 1043 support member, 1044 collecting mechanism, 1045 transporting mechanism, 1046 dispensing outlet, 1051 connector, 1052 vibration control circuit, 1053 solenoid, 1054 hook member, 1100 pharmaceutical product storage apparatus, 1111 housing, 1112 shutter, 1114 storing unit, 1115 work table, 1116 chute, 1117 discharge opening, 1118 incoming port, 1150 indicator, 1160 transporting mechanism, 1170 weighing scale, 1200 pharmaceutical product storage apparatus, 1211 housing, 1212 shutter, 1213 light projecting member, 1214 storing unit, 1215 drawer, 1216 electric equipment, 1220 container, 1221 front plate, 1222 slope, 1223 side plate, 1224 bottom plate, 1225 name plate, 1230 motor, 1231 rotation shaft, 1232 eccentric cam, 1233 origin sensor, 1250 pharmaceutical product, 1260 light receiving member, 130 main controller, 1310, 1311, 1312 subcontrollers

BEST MODE FOR CARRYING OUT THE INVENTION

A description of the best mode of carrying out the present invention will be given by highlighting first through sixth embodiments.

First Embodiment

A first embodiment of the present invention relates to a vibration-assisted ejection cassette and a drug dispensing apparatus for aligning PTP-packaged or equivalently packaged drugs for storage and sequentially ejecting the drugs, and, more particularly, to a technology to feed and eject drugs by using vibration.

A brief summary of the first embodiment will be given.

A first vibration-assisted ejection cassette according to the first embodiment comprises: outer plates which align PTP-packaged or equivalently packaged drugs for storage; a top frame which is provided above an open front and which prevents accommodated drugs from being falling forward; an inner plate which carries the accommodated drugs and advances the drugs when vibrated; and a vibrating member which vibrates the inner plate.

The term "PTP-packaged or equivalently packaged drugs" refers to drugs accommodated in a thin paper case or a plastic case and, more particularly, to those that can be aligned for storage in an upright position, such as the PTP-packaged drug.

A second vibration-assisted ejection cassette according to the first embodiment is a modification to the first vibration-based ejection cassette mentioned above, wherein the top of a drug accommodating space bounded by the outer plates is open so as to facilitate replenishment of a drug, an inner plate is movably inserted to rest on the interior bottom of the drug accommodating space so as to be vibrated while carrying an accommodated drug, and the front end portion of the top face of the inner plate is formed as an ascending slope and the remaining portion is formed as a descending slope so that the inner plate when vibrated advances an accommodated drug. That is, the vibration-assisted ejection cassette is for aligning PTP-packaged or equivalently packaged drugs for storage and sequentially ejecting the drugs, and comprises: outer plates which bound at least the sides of a drug accommodating space, the top of the space being open so as to facilitate replenishment of a drug and the front of the space being open so as to facilitate ejection of a drug; a top frame which is provided above the front of the space and which prevents a drug at the head of a queue of drugs accommodated from falling forward by interfering with the top end of the drug; an inner plate which is movably inserted to rest on the interior bottom of the drug accommodating space so as to be vibratably supported, the front end portion of the top face of the inner plate being formed as an ascending slope and the remaining portion being formed as a descending slope; and a vibrating member which vibrates the inner plate.

According to the first vibration-assisted ejection cassette described above, a large number of drugs can be aligned for storage without falling down, by accommodating PTP-packaged drugs etc. in the drug accommodating space bounded by the outer plates, by arranging the drugs above the vibrating member in an upright position, and by allowing the accommodated drug at the head of the queue to lean against the top frame. When the inner plate is vibrated by the vibrating member, the accommodated drugs advance. Since the drug at the head of the queue is prevented from advancing by the top frame, the accommodated drugs are closely arranged. When the lower end of the drug at the head is thrust forward so as to be removed from the inner plate, the drug at the head is let fall and ejected from the open front. In association with this, the top end of the drug that replaces the ejected drug and brought to a position at the head is slightly inclined forward and caught by the top frame. When the lower end of the replacing drug is thrust forward so as to be removed from the inner plate, the drug is similarly let fall and ejected.

In this way, PTP-packaged drugs etc. are aligned for storage and ejected one by one by vibration. The cassette is implemented such that the top frame is provided above the open front so as to prevent the accommodated drug from falling forward, and the accommodated drugs are advanced as a result of vibrating the inner plate carrying the accommodated drugs and are let fall and ejected one by one from the open front. Thus, vibration operates to maintain the PTP-packaged drugs in alignment, advance the drugs while maintaining alignment thereof and sequentially eject the drugs. Since there is no need to provide a weighing member or a biasing member, the mechanism is simplified.

Thus, the first vibration-assisted ejection cassette is configured for simple vibration-assisted ejection, in which PTP-packaged drugs etc. are aligned for storage and are ejected sequentially and properly.

In the second vibration-assisted ejection cassette, not only the front of the drug accommodating space bounded by the outer plates is open for drug ejection but also the top of the space is open for drug replenishment. Therefore, drugs can be aligned for storage easily at the time of replenishment. The inner plate is movably inserted to rest on the interior bottom of the drug accommodating space so as to be vibratable while carrying an accommodated drug. A major portion of the top face of the inner plate is formed as a descending slope so that the inner plate when vibrated advances the accommodated drug, and the front end portion of the top face of the inner plate is formed as an ascending slope so that the drug is prevented from being accelerated unnecessarily and advanced substantially at a regular speed. Accordingly, vibration of the inner plate properly operates to maintain the PTP-packaged drugs in alignment, advance the drugs while maintaining alignment thereof and sequentially eject the drugs without a weighing member or a biasing member.

Thus, the second vibration-assisted ejection cassette is configured for simple vibration-assisted ejection, in which PTP-packaged drugs etc. are easily aligned for storage when replenishing the drugs and sequentially ejected in a reliable and stable manner.

Suitable embodiments for implementing the vibration-assisted ejection cassette according to the first embodiment and the drug dispensing apparatuses provided with the same will be described.

The embodiments described below are for addressing a challenge of ensuring that drugs are either manually picked up one by one or ejected by an automatic mechanism in an equally easy and stable manner.

A third vibration-assisted ejection cassette according to the first embodiment is a modification to the first vibration-assisted ejection cassette or the second vibration-assisted ejection cassette mentioned above, comprising: a retention member which is provided in front of the open front and retains an accommodated drug ejected from the open front; and a controller which detects whether or not a drug is retained so as to activate the vibrating member when a drug is not retained and stop activating the vibrating member when a drug is retained.

According to the third vibration-assisted ejection cassette, the drug ejected from the open front is retained in the retention member in front. When the drug is retained, ejection of the next drug is prevented. When the drug is no longer retained in the retention member, the next drug is ejected by vibration and retained in the retention member.

By ensuring that one of the drugs is detached from the queue and retained in the retention member, the drugs can be taken out one by one far more easily and reliably than when the drug is directly taken out from the head of the queue either manually or automatically, while keeping the mechanism simple.

The first drug dispensing apparatus according to the first embodiment is configured such that an array of one of the first through third vibration-assisted ejection cassettes mentioned above is arranged in a housing.

By arranging simple vibration-assisted ejection cassettes capable of aligning PTP-packaged drugs etc. for storage and ejecting the drugs sequentially and reliably, a simple and inexpensive drug dispensing apparatus (first drug dispensing apparatus) suitable for storing various PTP-packaged drugs etc. and dispensing a desired drug results.

A fourth vibration-assisted ejection cassette according to the first embodiment is a modification to the third vibration-assisted ejection cassette mentioned above, wherein the retention member is movable and adapted to be positioned to discharge a drug as well as being positioned to retain one.

By ensuring that the retention member is movable and is capable of discharging a drug as well as retaining one in the fourth vibration-assisted ejection cassette, drugs can be taken out one by one by positioning the retention member to discharge a drug as well as by picking up the drug retained. Discharging of a drug can be performed more easily than picking up one.

A second drug dispensing apparatus according to the first embodiment is configured such that the fourth vibration-assisted ejection cassettes are arranged in a housing.

By arranging simple vibration-assisted ejection cassettes capable of aligning PTP-packaged drugs etc. for storage and ejecting the drugs sequentially and reliably, a simple and inexpensive drug dispensing apparatus (second drug dispensing apparatus) suitable for storing various PTP-packaged drugs etc. and dispensing a desired drug results.

A third drug dispensing apparatus according to the first embodiment is a modification to the second drug dispensing apparatus, wherein an actuator mechanism is provided which selects a desired vibration-assisted ejection cassette and activates the retention member of the selected cassette.

By providing an actuator mechanism for selecting a desired vibration-assisted ejection cassette and causing the cassette to discharge a drug, the third drug dispensing apparatus is capable of automatically dispensing a necessary drug. The actuator, for actuating the retention member, has only to let the retention member to assume one of only two states. Consequently, the resultant apparatus is simplified in structure, while providing the necessary advantage of automation.

Thus, the third drug dispensing apparatus embodies a simple and inexpensive drug dispensing apparatus suitable for aligning PTP-packaged drugs etc. for storage and sequentially dispensing a desired drug.

Specific embodiments of the vibration-assisted ejection cassette and the drug dispensing apparatus provided with the same according to the first embodiment will be described using illustrative embodiments 1-1 through 1-7.

Figure 3A:
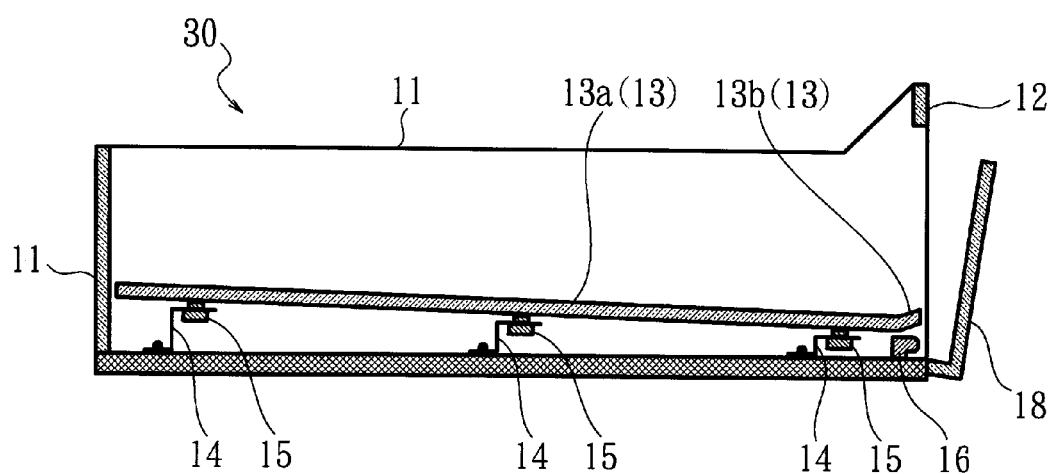
FIGS. 3A-3B show the structure of a vibration-assisted ejection cassette according to an illustrative embodiment 1-2 of the first embodiment.
Figure 3B:
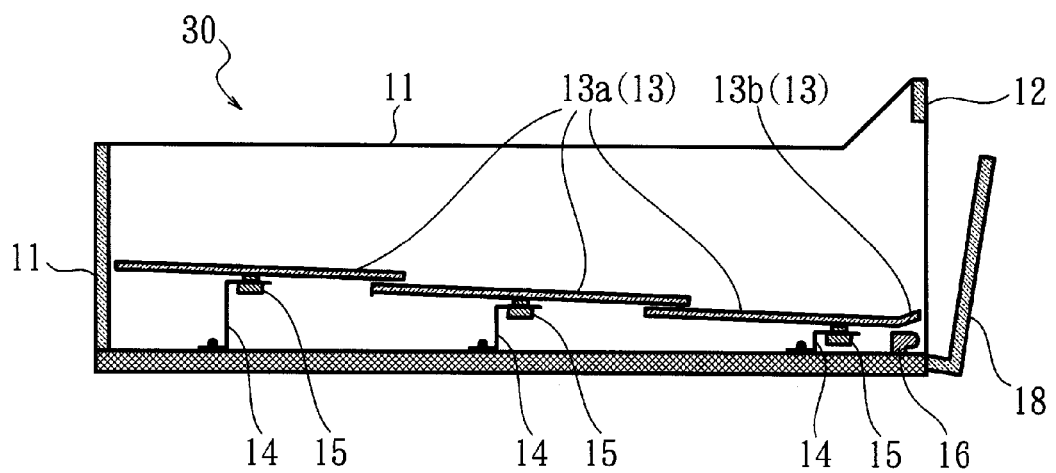
Figure 4A:
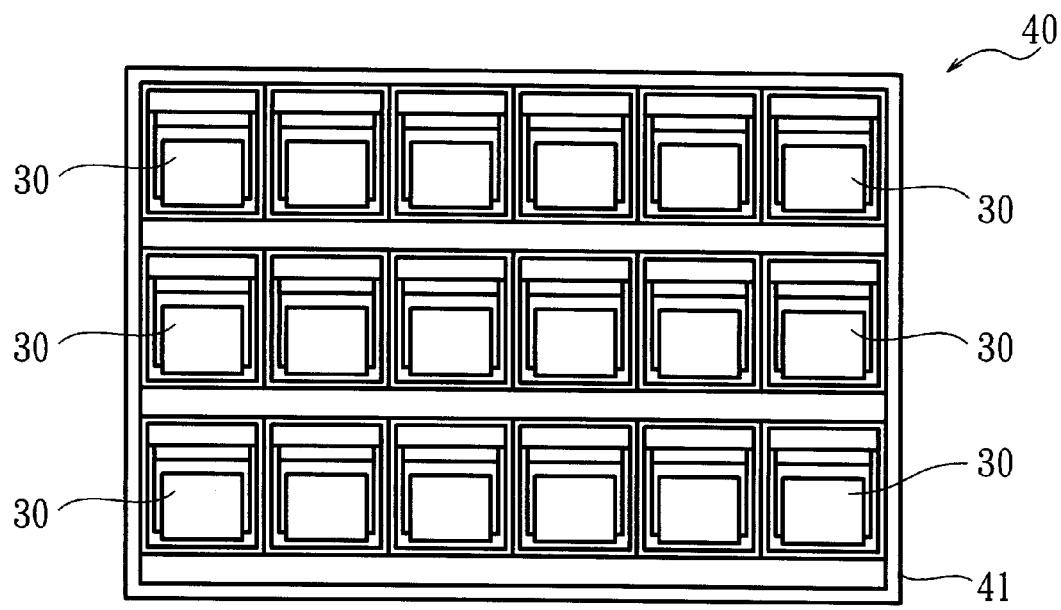
FIGS. 4A-4B show the structure of a drug dispensing apparatus according to an illustrative embodiment 1-3 of the first embodiment.
Figure 4B:
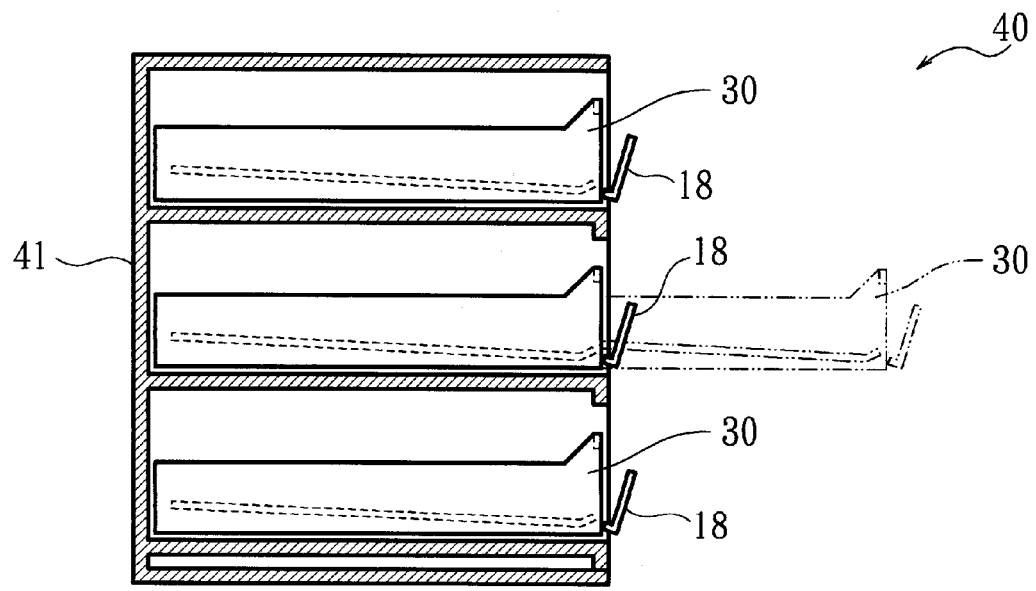
Figure 5A:
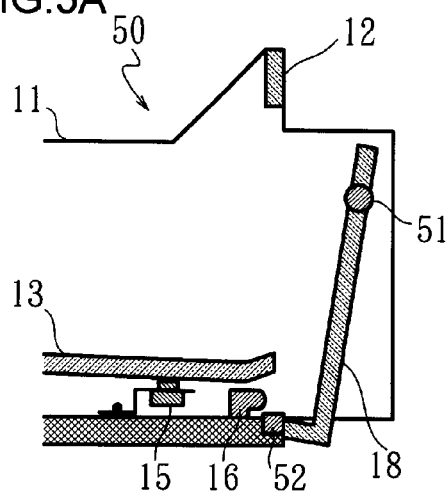
FIGS. 5A-5F show the structure of a vibration-assisted ejection cassette according to an illustrative embodiment 1-4 of the first embodiment.
Figure 5B:
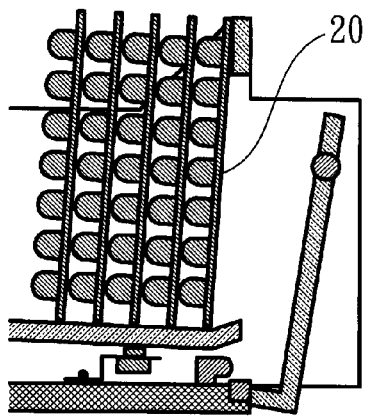
Figure 5C:
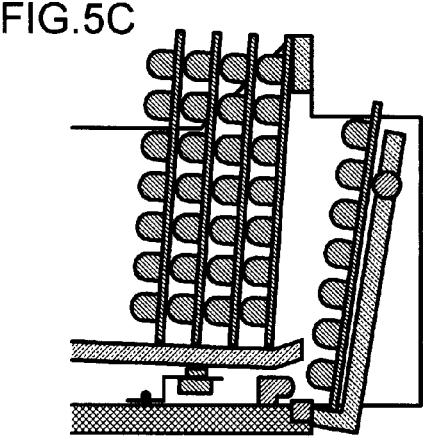
Figure 5D:
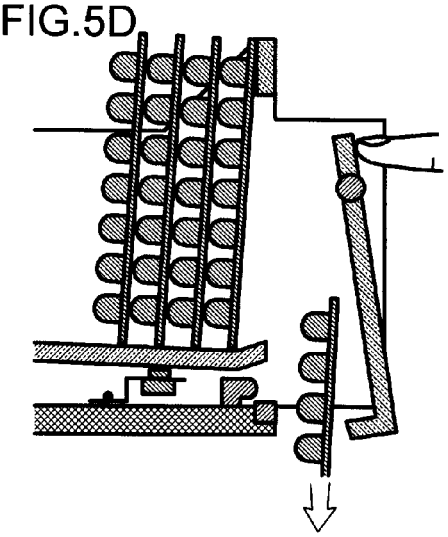
Figure 5E:
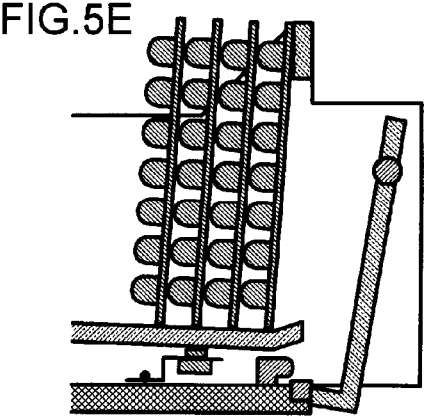
Figure 5F:
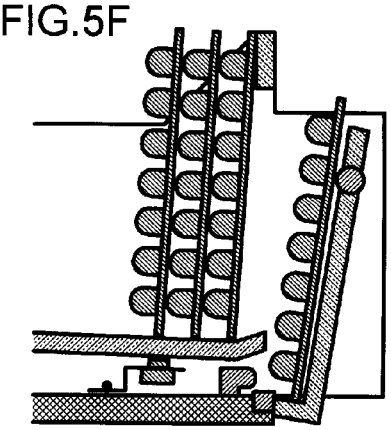

The illustrative embodiment 1-1 shown in FIGS. 1A-2F is an embodiment of the first through third vibration-assisted ejection cassettes mentioned above. The illustrative embodiment 1-2 shown in FIGS. 3A-3B is a variation to the illustrative embodiment 1-1. The illustrative embodiment 1-3 shown in FIGS. 4A-4B is an embodiment of the first drug dispensing apparatus mentioned above. The illustrative embodiment 1-4 shown in FIGS. 5A-5F is an embodiment of the fourth vibration-assisted ejection cassette mentioned above. The illustrative embodiment 1-5 shown in FIGS. 6A-6B is a variation to the illustrative embodiment 1-4.

Figure 8:
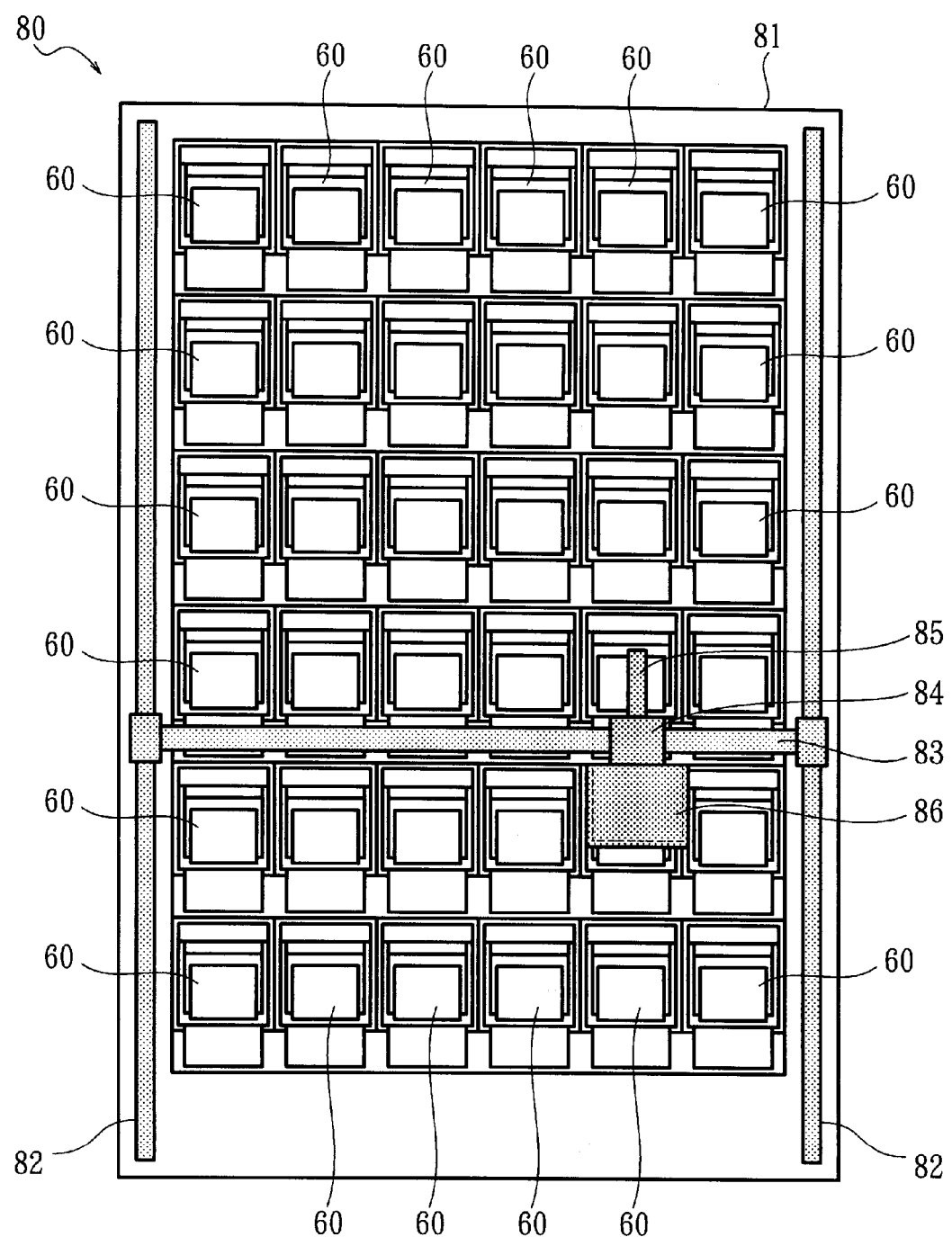
FIG. 8 is a front view of a drug dispensing apparatus according to an illustrative embodiment 1-7 of the first embodiment.

The illustrative embodiment 1-6 shown in FIGS. 7A-7B is an embodiment of the second drug dispensing apparatus mentioned above. The illustrative embodiment 1-7 shown in FIG. 8 is an embodiment of the third drug dispensing apparatus mentioned above.

In the illustration, fasteners such as bolts, connectors such as hinges, detailed electric and electronic circuits are omitted for brevity, highlighting those elements necessary to explain the embodiment and related elements.

Illustrative Embodiment 1-1

Figure 1B:
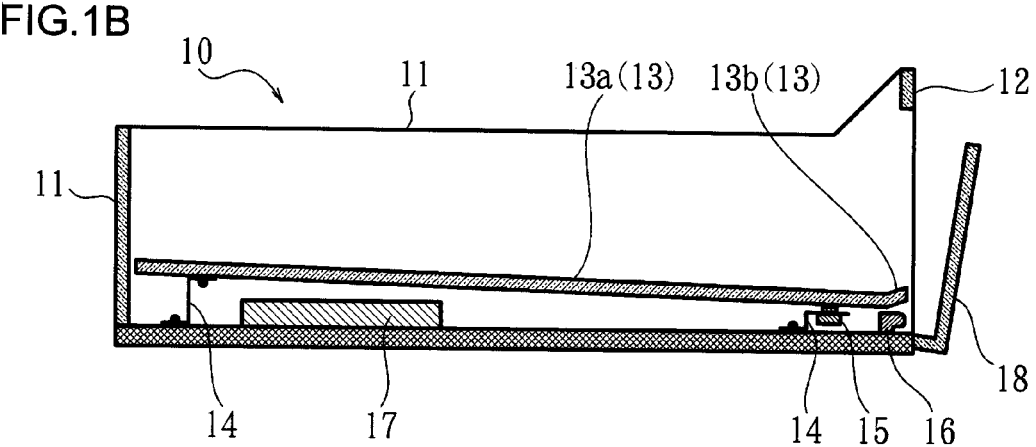
Figure 1C:
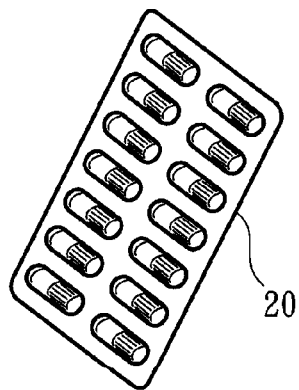
Figure 1D:
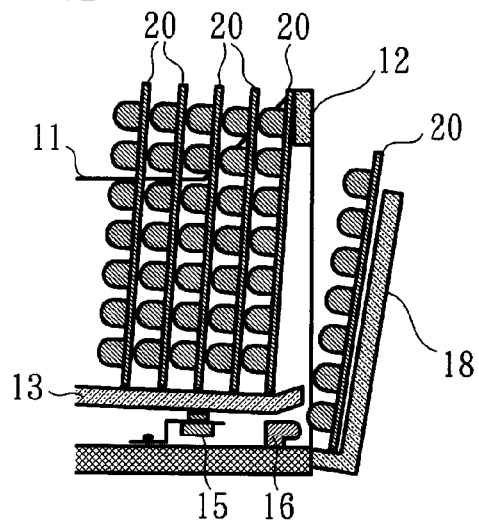

The specific structure of the illustrative embodiment 1-1 of the vibration-assisted ejection cassette according to the first embodiment will be described with reference to the associated drawings. FIG. 1A is a perspective view showing the appearance of a vibration-assisted ejection cassette 10; FIG. 1B is a sectional left side view of the cassette 10; FIG. 1C is a perspective view showing the appearance of a PTP-packaged drug 20; and FIG. 1D is a sectional left side view of an essential part of the cassette 10 aligning the drugs 20 for storage.

The vibration-assisted ejection cassette 10 comprises outer plates 11, a top frame 12, an inner plate 13, elastic support members 14, a vibrating member 15, an ejection detecting member 16, a control circuit 17 and a retention member 18 (see FIGS. 1A and 1B). The cassette 10 is designed to align the PTP-packaged drugs 20 for storage in an upright position in a horizontal queue, and to eject the drugs 20 one by one in the order of arrangement (see FIGS. 1C and 1D).

To describe the cassette in further detail, the outer plates 11 (see FIGS. 1A and 1B) form a box in which is secured a drug accommodating space for aligning the drugs 20 for storage. The outer plates 11 bound at least the sides of the space. In the illustrated example, the back (read face; in the figure, left end face) and the bottom (underside) are also bounded by the outer plates 11. The outer plates 11 may be integrally formed of transparent resin. Alternatively, plates may be formed individually and built to form a box by being adhesively attached to each other. The drug accommodating space inside is substantially cuboid in shape and longitudinally (in the figure, sideways) elongated. Substantially the entirety of the top of the space is open to facilitate replenishment of drugs. The front (in the figure, right end face) is wide open to facilitate ejection of drugs. The width of the open front is greater than the width of the drug 20. For example, the open front has a width of 10-100 mm. The height of the open front is slightly less than the length of the drug 20. For example, the open front has a height of 100-200 mm.

The top frame 12 is provided above the open front of the drug accommodating space defined by the outer plates 11 and is a horizontal-bridging member extending horizontally (see FIGS. 1A and 1B). The top frame 12 operates to interfere with the top end of the drug 20 at the head of the queue to prevent the drug from falling forward (see FIG. 1D).

The inner plate 13 (see FIGS. 1A, 1B and 1D) carries the drug 20 and advances the same when vibrated. The inner plate 13 comprises a descending slope 13a and an ascending slope 13b in order to stabilize the advance, the descending slope 13a occupying the majority of the plate 13 and the ascending slope 13b occupying a small portion of the plate 13 toward the front end thereof. For example, the ascending slope 13b has a length of several mm longitudinally (in the figure, sideways), and the inclination to the horizon is approximately 15°-30°. The descending slope 13a has a length of 10-1000 mm longitudinally, and the inclination to the horizon is approximately 5°-10°. Typically, the inner plate 13 has a width of 10-100 mm.

The inner plate 13 in the stated condition of inclination (see FIG. 1B) is movably inserted to rest on the interior bottom of the drug accommodating space. The plate 13 is connected to the bottom plate of the outer plates 11 via the multiple (in the figure, two) elastic support members 14 in order to maintain the inclined condition. The elastic support member 14 is implemented by, for example, a thin metal plate or a piano wire. The member 14 is easily elastically deformable to support the inner plate 13 vibratably.

The vibrating member 15 (see FIGS. 1B and 1D) is implemented by an inexpensive, mass-produced vibration motor with an eccentric rotor built in, for example, a cell phone. The member 15 is provided closer to the inner plate 13 than the elastic support member 14 or provided on the underside of the inner plate 13 so as to vibrate the inner plate 13.

The retention member 18 (see FIGS. 1A, 1B and 1D) is provided in front of the open front of the drug accommodating space defined by the outer plates 11. The retention member 18 is designed to catch and retain the accommodated drug 20 at the head of the queue ejected from the open front. For this purpose, the retention member 18 is implemented by, for example, a transparent resin plate slightly bent at the lower end thereof. The lower end is connected and secured to the front of the bottom plate of the outer plates 11. The main part and the top end of the member 18 are inclined forward. The length of the retention member 18 is slightly less than the length of the drug 20 so that the top end of the drug 20 retained is projected outside, allowing the drug 20 to be grasped easily (see FIG. 1D). The distance between the lower end of the retention member 18 and the lower end of the top frame 12 is greater than the length of the drug 20 so that the drug 20 thus inclined is allowed to pass through the open front and to fall. Further, the distance between the front end of the inner plate 13 and the opposite face of the retention member 18 is slightly greater than the thickness of the drug 20 so as to properly limit the number of drugs 20 retained in the retention member 18 to one.

The ejection detecting member 16 (see FIGS. 1B and 1D) is implemented by, for example, a reflective photosensor. In the illustrated example, the member 16 is provided on the bottom plate of the outer plates 11 and below the inner plate 13 so as to output a signal which turns on and off according to whether the drug 20 is located in the retention member 18, allowing detection of reflected light, or the drug 20 is not located in the retention member 18, not allowing detection of reflected light.

The control circuit 17 is implemented by a one-chip microcomputer and/or a logic circuit. The control circuit 17 receives a detection signal from the ejection detecting member 16 so as to control the operation of the vibrating member 15. For operation, the circuit 17 is supplied with power from a power supply circuit or a battery (not shown). When the detection result from the ejection detecting member 16 indicates that the drug is not retained, the control circuit 17 activates the vibrating member 15. When the detection result from the ejection detecting member 16 indicates that the drug is retained, the control circuit 17 stops activating the vibrating member 15.

The mode of using the vibration-assisted ejection cassette 10 according to the illustrative embodiment 1-1 and its operation will be described with reference to the drawings. FIGS. 2A-2F are sectional left side views of an essential part of the cassette. FIG. 1C is a perspective view showing the appearance of the PTP-packaged drug 20.

A typical shape of the PTP-packaged drug 20 is a rectangular sheet which is flat on one side and which is provided with an array of pockets for accommodating drugs on the other side. Typically, the width of the PTP-packaged drug 20 is 10-100 mm, the length thereof is 100-200 mm, and the thickness thereof is several mm. The weight of the PTP-packaged drug 20 is typically 10-200 mg.

Figure 2A:
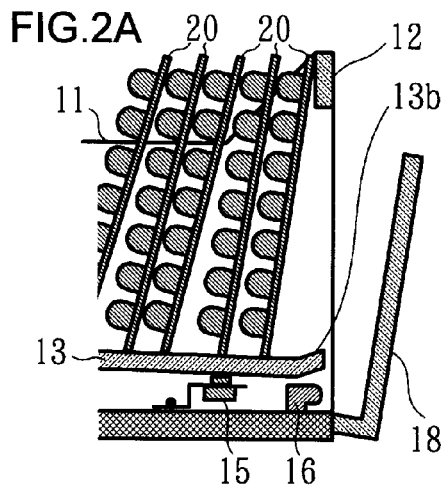
FIGS. 2A-2F show how the vibration-assisted ejection cassette according to the illustrative embodiment 1-1 operates.
Figure 2B:
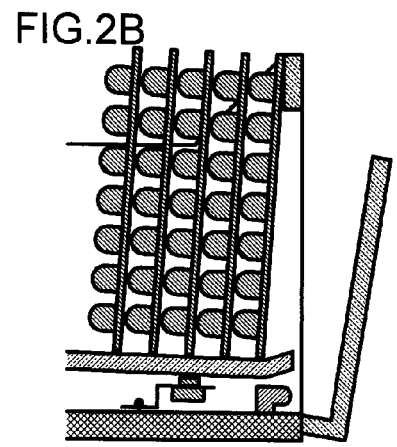
Figure 2C:
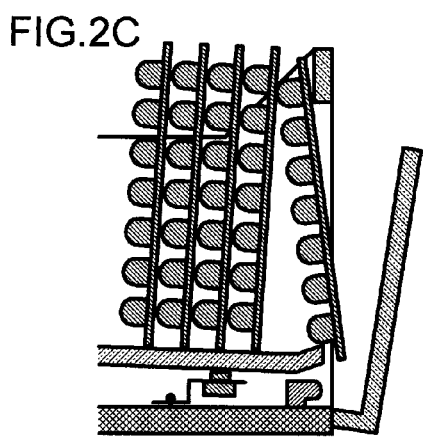
Figure 2D:
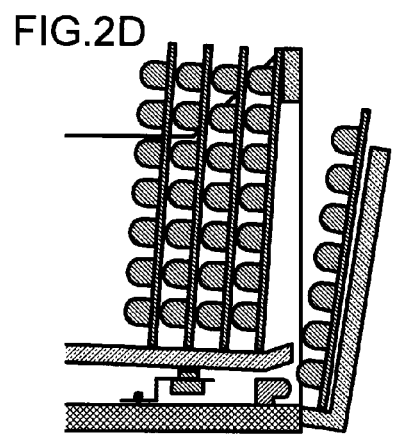
Figure 2E:
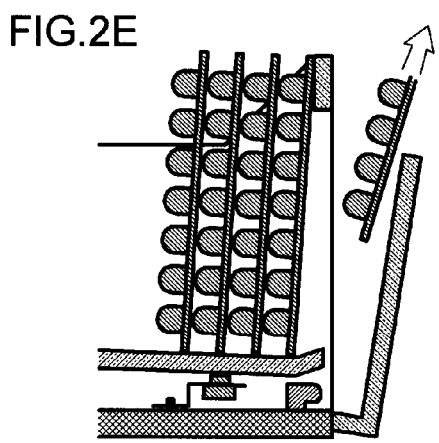
Figure 2F:
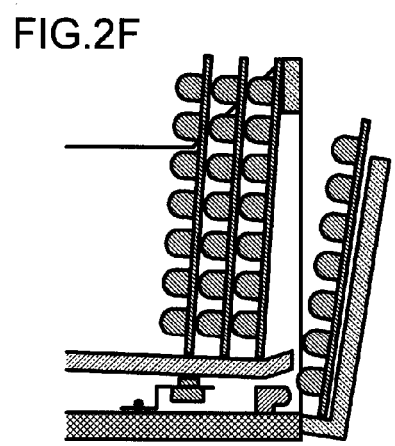

The drugs 20 are manually replenished from above the open top of the empty cassette 10 (see FIG. 2A). While the replenishment is proceeding, the cassette 10 is prevented from being activated, i.e., the vibration of the vibrating member 15 is prevented. The drugs 20 are serially arranged in the longitudinal direction, ensuring that the head and tail of the drugs 20 are identically oriented in the drug accommodating space. More specifically, the drugs 20 are aligned for storage in the drug accommodating space in the outer plates 11, starting at the head of the queue. In this process, each drug 20 is provided above the vibrating member 15 in an upright position inside the drug accommodating space. The drug at the head of the queue is accommodated such that the top end leans against the top frame 12 to prevent the drug from falling down. The other drugs 20 in the queue are made to lean against each other. The drugs 120 may lean at different angles or may be spaced apart from each other, forming different gaps, so long as the drugs 120 are prevented from falling down.

Once the drugs are replenished, the cassette 10 is activated. More specifically, vibration control of the vibrating member 15 in accordance with detection by the ejection detecting member 16 is initiated by, for example, feeding power to the control circuit 17. Since the drug 20 is not located in the retention member 18 (see FIG. 2B), the inner plate 13 is vibrated. This reduces friction so that the thrust derived from gravitation force commensurate with the slope exceeds the friction. The drug 20 above the descending slope 13a of the inner plate 13 advances little by little. The drug 20 at the head of the queue advances to a boundary between the descending slope 13a and the ascending slope 13b and the drugs 20 that follow are moved closer to each other so that the accommodated drugs 20 are neatly aligned inside the drug accommodating space.

In this condition, vibration still continues and the drugs 20 are thrust forward. The drug 20 at the head of the queue continues to be prevented from advancing since the top end thereof is caught by the top frame 12, but the lower end thereof gets over the ascending slope 13b and leaves the inner plate 13 so as to enter the space in front of the open front (see FIG. 2C). The drug 20 at the head is detached from the outer plates 11 and the top frame 12 under its own weight, caught by the retention member 18 and retained there (see FIG. 2D). Concurrently, the top end of the drug 20, next in line and located on the inner plate 13 without the ejected drug 20, leans against the top frame 12, and the lower end of the drug 20 advances to the boundary between the descending slope 13a and the ascending slope 13b. The drug 20 transferred to the retention member 18 enters a range of detection by the ejection detecting member 16. The detection output of the ejection detecting member 16 changes to indicate that the drug is retained. In response to this, the control circuit 17 stops activating the vibrating member 15 so that the inner plate 13 comes to rest and is maintained in the current condition.

The drug 20 retained in the retention member 18 is removed from the queue, and the top end thereof is exposed to allow easy grasping. By grasping and lifting the top end, one PTP-packaged drug 20 can be easily taken out (see FIG. 2E). As the drug is taken out, no drugs 20 remain retained on the retention member 18. The cassette is now in a condition that occurred when the drugs are replenished except that the number of accommodated drugs 20 is reduced by one. Vibration of the inner plate 13 is resumed so that the next drug 20 in line is ejected out of the open front of the outer plates 11 and then retained in the retention member 118 (see FIG. 2F). The operation described above is repeated each time the drug 20 is picked up from the retention member 18. Thus, the vibration-assisted ejection cassette 10 enables easily and properly grasping and taking out the PTP-packaged drug 20 one by one.

Illustrative Embodiment 1-2

A vibration-assisted ejection cassette 30 according to the illustrative embodiment 1-2, shown in the longitudinal sectional left side view of FIG. 3A, differs from the cassette 10 according to the illustrative embodiment 1-1 in that multiple (in the illustrated example, three) vibrating members 15 are provided.

The vibration-assisted ejection cassette 30 according to the illustrative embodiment 1-2 shown in the longitudinal sectional left side view of FIG. 3B is configured such that the descending slope 13a of the inner plate 13 is segmented (in the illustrated example, into three segments) so as to correspond to the vibrating members 15.

The single vibrating member 15 may be replaced by a large one to enhance capability to vibrate. In this case, however, increase in cost is minimized by using a desired number of inexpensive mass-produced products. Another advantage is that, by distributing multiple vibrating members 15 in the longitudinal direction of the inner plate 13, the entire inner plate 13 is vibrated uniformly.

Illustrative Embodiment 1-3

A drug dispensing apparatus 40 according to the illustrative embodiment 1-3 shown in the front view and the left side view of FIGS. 4A and 4B is configured such that an array of the vibration-assisted ejection cassettes 30 described above is provided inside a housing 41.

In the illustrated example, eighteen cassettes 30 are arranged in a 3×6 matrix. For replenishment of the drug 20, each cassette 30 is drawn forward from the housing 41.

The drug dispensing apparatus 40 may be placed on, for example, a preparation desk standalone. Alternatively, the drug dispensing apparatuses 40 may be arranged side by side or stacked one upon another.

Various PTP-packaged drugs 20 are replenished in a large number of cassettes 30. By activating the cassette 30, it is always ensured that the drug 20 is retained one by one in the retention member 18 at the front of the drug dispensing apparatus 40. Thus, a person in charge of preparing drugs can efficiently pick up and collect desired drugs 20 one after another.

Illustrative Embodiment 1-4

A vibration-assisted ejection cassette 50 according to the illustrative embodiment 1-4, an essential part of which is shown in the longitudinal sectional left side view of FIG. 5A-5F, differs from the cassettes 10 and 30 according to the illustrative embodiments 1-1 and 1-2 described above in that the retention member 18 is movable and that there is added a retention detecting member 52 for detecting whether the retention member 18 is positioned to retain a drug or positioned to discharge a drug.

The retention member 18 (see FIG. 5A) is no longer stationary with respect to the outer plates 11. Instead, the retention member 18 is pivotally supported by a horizontally extending (in the figure, in a direction perpendicular to the paper) pivot shaft 51. The pivot shaft 51 is supported in horizontal position by the sides etc. of the outer plates 11 extended forward. The pivotal shaft 51 is connected to the retention member 18 toward the top end of the retention member 18. The retention member 18 may pivotally move together with the pivot shaft 51 or independently thereof. Absent an external force exerted thereon, the retention member is biased by a spring or a weight (not shown) so that the lower end thereof comes into contact with the front end of the bottom plate of the outer plates 11.

The retention detecting member 52 may be a non-contact photosensor similar to the ejection detecting member 16. Alternatively, the retention detecting member 52 may be implemented by an inexpensive contact push switch. In any case, the member 52 is provided in a portion of the bottom plate of the outer plates 11 coming into contact with the retention member 18 or in the neighborhood thereof. When in contact, the member 52 outputs a detection signal indicating that the retention member 18 is positioned to retain a drug. When the retention member 18 is detached from the outer plates 11, the member 52 outputs a signal indicating that the retention member 18 is positioned to discharge a drug. The detection signal is sent to the control circuit 17. The control circuit 17 activates the vibrating member 15 only when the retention member 18 is detected to be positioned to retain a drug. That is, the inner plate 13 is prevented from being vibrated when the retention member 18 is positioned to discharge a drug.

In this embodiment, as the drugs 20 are aligned for storage (see FIG. 5B) in the empty cassette 50 (see FIG. 5A), the inner plate 13 is vibrated because the retention member 18 is positioned to retain a drug but the drug 20 is not there yet. As the accommodated drug 20 at the head of the queue is ejected from its position on the inner plate 13 and transferred to the retention member 18 (see FIG. 5C), vibration of the inner plate 13 is halted and one drug 20 is retained in the retention member 18. In this condition, the drug 20 may be taken out by picking it up. However, the drug 20 may be taken out more easily.

More specifically (see FIG. 5D), by lightly pressing the top end of the retention member 18 by, for example, a finger, the retention member 18 is pivotally moved and the lower end thereof is detached from the outer plates 11, thereby positioning the retention member 18 to discharge the drug. This causes the drug 20 retained in the retention member 18 to be dropped and discharged from a gap created between the lower end of the retention member 18 and the outer plates 11. Thus, the desired drug 20 can easily be taken out from below. As the finger is removed from the retention member 18 afterward, the retention member 18 is pivotally moved in a reverse direction and is positioned again to retain a drug (see FIG. 5E).

The inner plate 13 is vibrated as previously except that the number of accommodated drugs 20 is reduced by one. The next drug 20 in line is ejected out of the open front of the outer plates 11 and then retained in the retention member 18 (see FIG. 5F). The operation described above is repeated each time the drug 20 is picked up or dropped and discharged from the retention member 18. Thus, the vibration-assisted ejection cassette 50 enables the user to take out the PTP-packaged drug 20 one by one easily and properly. In the case of the vibration-assisted cassette 50, the drug 20 is dropped and discharged efficiently by the simple action of lightly pressing the top end of the retention member 18. Thus, the manual operation of taking out drugs is more facilitated in a manner suitable for automated retrieval.

Illustrative Embodiment 1-5

A vibration-assisted ejection cassette 60 according to the illustrative embodiment 1-5, an essential part of which is shown in the longitudinal sectional left side view of FIGS. 6A and 6B, differs from the cassette 50 according to the illustrative embodiment 1-4 in that a descent guidance member 61 is provided below the retention member 18.

The descent guidance member 61 (see FIG. 6A) is formed as a gently curved plate. The top end of the member 61 is connected and secured to the underside of the bottom plate constituting the outer plates 11 toward the front of the bottom plate. The concave face of the member 61 faces in a forward and obliquely upward direction. The lower end of the member 61 extends forward to a space below the cassette.

In this embodiment (see FIG. 6B), the drug 20 is dropped and discharged from the retention member 18 and then guided toward a user by sliding on the concave face of the descent guidance member 61.

Illustrative Embodiment 1-6

A drug dispensing apparatus 70 according to the illustrative embodiment 1-6 shown in the front view and the left side view of FIGS. 7A and 7B is configured such that an array of the vibration-assisted ejection cassettes 60 described above is provided inside a housing 71. In the illustrated example, nine cassettes 60 are arranged in a 3×3 matrix.

In this drug dispensing apparatus 70, the drug 20, dropped and discharged from the retention member 18 of the cassette 60, is guided toward a user by the descent guidance member 61 while descending the slope.

Thus, the drug 20 dropped and discharged from the cassette 60 above successfully drops without being entangled by the retention member 18 of the cassette 60 below.

The desired drug 20 can be dispensed and collected easily and efficiently by, for example, placing a receiving box 72 of an appropriate size in front of the housing 71.

Illustrative Embodiment 1-7

A drug dispensing apparatus 80 according to the illustrative embodiment 1-7 shown in the front view of FIG. 8 is configured such that the drug dispensing apparatus 70 is upgraded to provide automatic dispensing capabilities. The number of cassettes 60 is increased to 36 to form a 6×6 matrix. Dispensing and collecting mechanism 82-86 for X-Y translation are also introduced.

The dispensing and collecting mechanisms 82-86 are for automatic retrieval and automatic collection of drugs by selecting a desired one of a large number of cassettes 60 in an array and then activating the retention member 18 of the selected cassette. For this purpose, the Y-shaft 82 guides the perpendicular Y-direction translation, and the X-shaft 83 guides the horizontal X-direction translation. The X-Y translation unit 84 is supported by the shafts so as to be translatable. An electric motor and a drive circuit (not shown) drive the translation unit 84 to a desired location. An actuator 85 is provided on top of the translation unit 84 and includes an advancing and receding member for pressing the top end of the retention member 18. A collecting box 86 is provided below the X-Y translation unit 84 and accepts the drug 20 that comes sliding down the descent guidance member 61.

In this case, the control 17 is upgraded by, for example, a programmable microprocessor so as to be adapted to download prescription data from a prescription input device or a prescription order entry system (not shown). By causing the X-Y translation unit 84 to make the rounds of cassettes 60 accommodating the desired drugs 20 for storage in accordance with the prescription data, and causing the actuator 85 to pivotally move the retention member 18 accordingly, the necessary drugs 20 are collected one after another in the collecting box 86.

The dispensing and collecting mechanism for automation is not necessarily based on X-Y translation. For example, a combination of vertical transportation and horizontal transportation may be used as in the dispensing/transporting mechanism of patent document No. 1.

The cassettes 60 may be cylindrically arranged as in the storage of patent document No. 2 instead of being rectangularly arranged.

[Other Points of Note]

In the above-described illustrative embodiments, it is ensured that the head and tail of the PTP-packaged drugs are identically oriented when the drugs are aligned in the drug accommodating space of the cassette. However, this is not an essential requirement. The orientation of the head and tail of the PTP-packaged drugs may only be given secondary consideration so long as the aligned condition is not impaired.

In the above-described illustrative embodiments, the drugs are taken out one by one from the cassette. Alternatively, multiple (e.g. two or three) drugs may be taken out at a time. More specifically, this can easily be achieved by extending the distance between the front end of the inner plate and the opposite face of the retention member.

Second Embodiment

A first embodiment of the present invention relates to a vibration-assisted ejection cassette and a drug dispensing apparatus for aligning PTP-packaged or equivalently packaged drugs for storage and sequentially ejecting the drugs, and, more particularly, to a technology to feed and eject drugs by using vibration.

PTP-packaged drugs, even as they are individually packaged, are thinly packaged and irregular in cross section. As such, it is not necessarily easy to properly grasp the one at the head of the queue of drugs aligned for storage. The ejecting mechanism can be simplified only in a limited way if automatization is achieved by a mechanism for grasping or absorbing drugs. To eliminate a biasing means for advancing accommodated drugs, there would be required, for example, a mechanism for translating the absorbing mechanism instead.

In this background, it is desirable to put the vibration-assisted method, which is used in a powder medicine feeder, to the use of dispensing PTP-packaged drugs so as to simplify, in this process, the mechanism by eliminating the need for a weighing member for measuring weight or a biasing member for advancing drugs. That is, a technical task to be achieved is to utilize vibration so as to maintain PTP-packaged drugs in alignment with each other, advance the drugs while maintaining the drugs in alignment and eject them one by one.

The embodiments described below are for addressing a challenge of ensuring that drugs are either manually picked up one by one or ejected by an automatic mechanism in an equally easy and stable manner.

A brief summary of the second embodiment will be given.

A first vibration-assisted ejection cassette according to the second embodiment comprises: outer plates which align PTP-packaged or equivalently packaged drugs for storage; a top frame which is provided above an open front and which prevents accommodated drugs from being falling forward; an inner plate which carries the accommodated drugs and advances the drugs when vibrated; a vibrating member which vibrates the inner plate; a retention member which is provided in front of the open front and which retains the accommodated drug ejected from the open front; and a cassette controller which detects whether or not a drug is retained so as to activate the vibrating member when a drug is not retained and stop activating the vibrating member when a drug is retained.

The term "PTP-packaged or equivalently packaged drugs" refers to drugs accommodated in a thin paper case or a plastic case and, more particularly, to those that can be aligned for storage in an upright position, such as the PTP-packaged drug.

A second vibration-assisted ejection cassette according to the second embodiment is a modification to the first vibration-based ejection cassette mentioned above, wherein the top of a drug accommodating space bounded by the outer plates is open so as to facilitate replenishment of a drug, an inner plate is movably inserted to rest on the interior bottom of the drug accommodating space so as to be vibrated while carrying an accommodated drug, and the front end portion of the top face of the inner plate is formed as an ascending slope and the remaining portion is formed as a descending slope so that the inner plate when vibrated advances an accommodated drug. That is, the vibration-assisted ejection cassette comprises: outer plates which bound at least the sides of a drug accommodating space, the top of the space being open so as to facilitate replenishment of a drug and the front of the space being open so as to facilitate ejection of a drug; a top frame which is provided above the front of the space and which prevents a drug at the head of a queue of drugs accommodated from falling forward by interfering with the top end of the drug; an inner plate which is movably inserted to rest on the interior bottom of the drug accommodating space so as to be vibratably supported, the front end portion of the top face of the inner plate being formed as an ascending slope and the remaining portion being formed as a descending slope; a vibrating member which vibrates the inner plate; a retention member which is provided in front of the open front and which retains the accommodated drug ejected from the open front; and a cassette controller which detects whether or not a drug is retained so as to activate the vibrating member when a drug is not retained and stop activating the vibrating member when a drug is retained.

A first drug dispensing apparatus according to the second embodiment is configured such that an array of one of the first or second vibration-assisted ejection cassettes mentioned above is arranged in a housing.

A second drug dispensing apparatus according to the second embodiment is a modification to the first drug dispensing apparatus mentioned above, further comprising: a plurality of indicators which are provided directly in the respective vibration-assisted ejection cassettes or indirectly provided in association therewith, so as to display at least a one-digit number; and an apparatus controller which selects one of the indicators in accordance with drug dispensing information such as drug preparation data, which causes the selected indicator to display the number of drugs to be taken out, and which updates the displayed number in accordance with the detection of ejection from the vibration-assisted ejection cassette for which the selected indicator is provided.

According to the first vibration-assisted ejection cassette, a large number of drugs can be aligned for storage without falling down, by accommodating PTP-packaged drugs etc. in the drug accommodating space bounded by the outer plates, by arranging the drugs above the vibrating member in an upright position, and by allowing the accommodated drug at the head of the queue to lean against the top frame. When the inner plate is vibrated by the vibrating member, the accommodated drugs advance. Since the drug at the head of the queue is prevented from advancing by the top frame, the accommodated drugs are closely arranged. When the lower end of the drug at the head is thrust forward so as to be removed from the inner plate, the drug at the head is let fall and ejected from the open front. In association with this, the top end of the drug that replaces the ejected drug and brought to a position at the head is slightly inclined forward and caught by the top frame. When the lower end of the replacing drug is thrust forward so as to be removed from the inner plate, the drug is similarly let fall and ejected.

In this way, PTP-packaged drugs etc. are aligned for storage and ejected one by one by vibration. The cassette is implemented such that the top frame is provided above the open front so as to prevent the accommodated drug from falling forward, and the accommodated drugs are advanced as a result of vibrating the inner plate carrying the accommodated drugs and are let fall and ejected one by one from the open front. Thus, vibration operates to maintain the PTP-packaged drugs in alignment, advance the drugs while maintaining alignment thereof and sequentially eject the drugs. Since there is no need to provide a weighing member or a biasing member, the mechanism is simplified. Thus, the first vibration-assisted ejection cassette is configured for simple vibration-assisted ejection, in which PTP-packaged drugs etc. are aligned for storage and are ejected sequentially and properly.

According to the first vibration-assisted ejection cassette, the drug ejected from the open front is retained in the retention member in front. When the drug is retained, ejection of the next drug is prevented. When the drug is no longer retained in the retention member, the next drug is ejected by vibration and retained in the retention member.

By ensuring that one of the drugs is detached from the queue and retained in the retention member, the drugs can be taken out one by one far more easily and reliably than when the drug is directly taken out from the head of the queue either manually or automatically, while keeping the mechanism simple.

Thus, the first vibration-assisted ejection cassette is configured for simple vibration-assisted ejection, in which PTP-packaged drugs etc. are aligned for storage and are ejected one by one properly.

In the second vibration-assisted ejection cassette, not only the front of the drug accommodating space bounded by the outer plates is open for drug ejection but also the top of the space is open for drug replenishment. Therefore, drugs can be aligned for storage easily at the time of replenishment. The inner plate is movably inserted to rest on the interior bottom of the drug accommodating space so as to be vibratable while carrying an accommodated drug. A major portion of the top face of the inner plate is formed as a descending slope so that the inner plate when vibrated advances the accommodated drug, and the front end portion of the top face of the inner plate is formed as an ascending slope so that the drug is prevented from being accelerated unnecessarily and advanced substantially at a regular speed. Accordingly, vibration of the inner plate properly operates to maintain the PTP-packaged drugs in alignment, advance the drugs while maintaining alignment thereof and sequentially eject the drugs without a weighing member or a biasing member.

Thus, the second vibration-assisted ejection cassette is configured for simple vibration-assisted ejection, in which PTP-packaged drugs etc. are easily aligned for storage when replenishing the drugs and ejected one by one in a reliable and stable manner.

By arranging simple vibration-assisted ejection cassettes capable of aligning PTP-packaged drugs etc. for storage and ejecting the drugs one by one properly, a simple and inexpensive drug dispensing apparatus (first drug dispensing apparatus) suitable for storing various PTP-packaged drugs etc. and dispensing a desired drug results.

The number of drugs to be taken out is displayed by an indicator attached in association with the vibration-assisted ejection cassette of the second drug dispensing apparatus, which is provided with a large number of cassettes. The displayed value is updated each time a drug is taken out. By utilizing the function for detection of ejection provided for stable operation of vibration-assisted sequential ejection, so as to update the displayed number of drugs to be taken out, the structure of the vibration-assisted ejection cassette is prevented from becoming complicated and, at the same time, the location of a desired drug is immediately known. Even when the number of drugs necessary or the number of drugs to be taken out is large, drugs can be taken out easily and without fail, merely by following the guidance as displayed and updated.

Thus, a simple and inexpensive drug dispensing apparatus (the second drug dispensing apparatus), capable of storing various PTP-packaged drugs etc. and properly allowing a desired number of drugs to be manually taken out one by one, results.

Specific embodiments of the vibration-assisted ejection cassette and the drug dispensing apparatus according to the second embodiment will be described using illustrative embodiments 2-1 through 2-7.

Figure 14A:
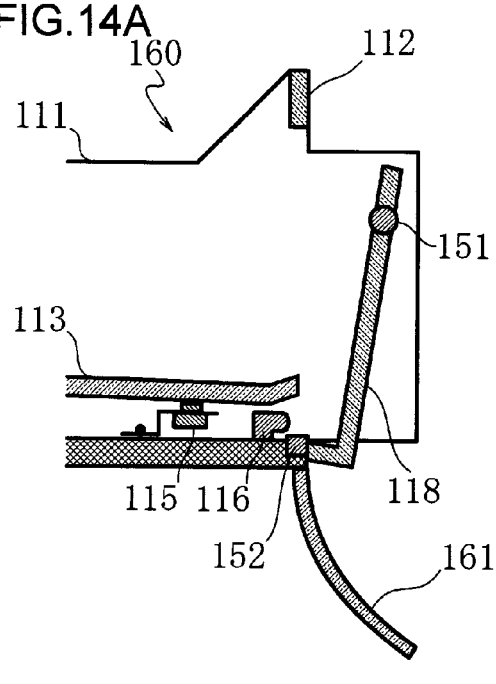
FIGS. 14A-14B show the structure of a vibration-assisted ejection cassette according to an illustrative embodiment 2-5 of the second embodiment.
Figure 14B:
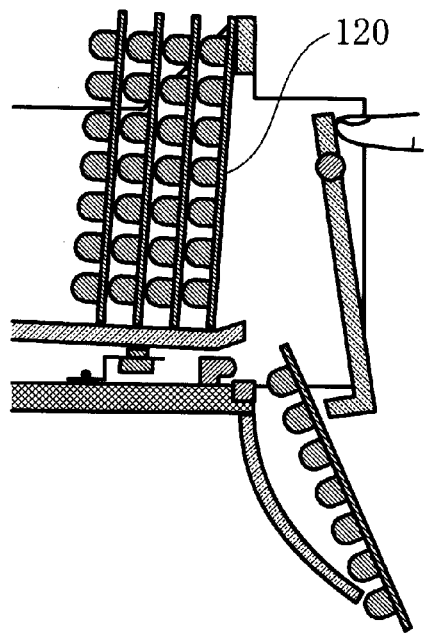

The illustrative embodiment 2-1 shown in FIGS. 9A-10F is an embodiment of the first and second vibration-assisted ejection cassette mentioned above. The illustrative embodiment 2-2 shown in FIGS. 11A-11B is a variation to the illustrative embodiment 2-1. The illustrative embodiment 2-3 shown in FIGS. 12-12B is an embodiment of the first drug dispensing apparatus mentioned above. The illustrative embodiment 2-4 shown in FIGS. 13A-13F, the illustrative embodiment 2-5 shown in FIG. 14A-14B and the illustrative embodiment 2-6 shown in FIGS. 15A-15B are variations to the illustrative embodiment 2-3.

Figure 16A:
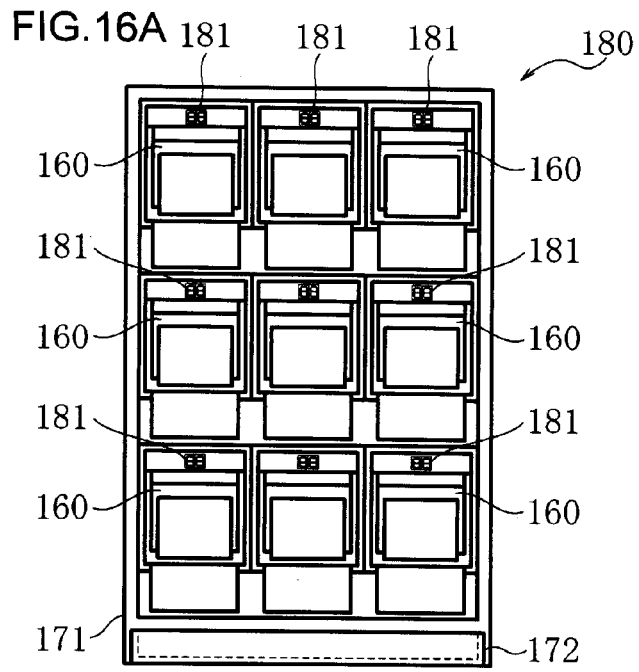
FIGS. 16A-16C show the structure of a drug dispensing apparatus according to an illustrative embodiment 2-7 of the second embodiment.
Figure 16B:
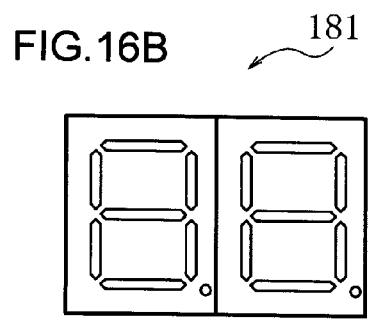
Figure 16C:
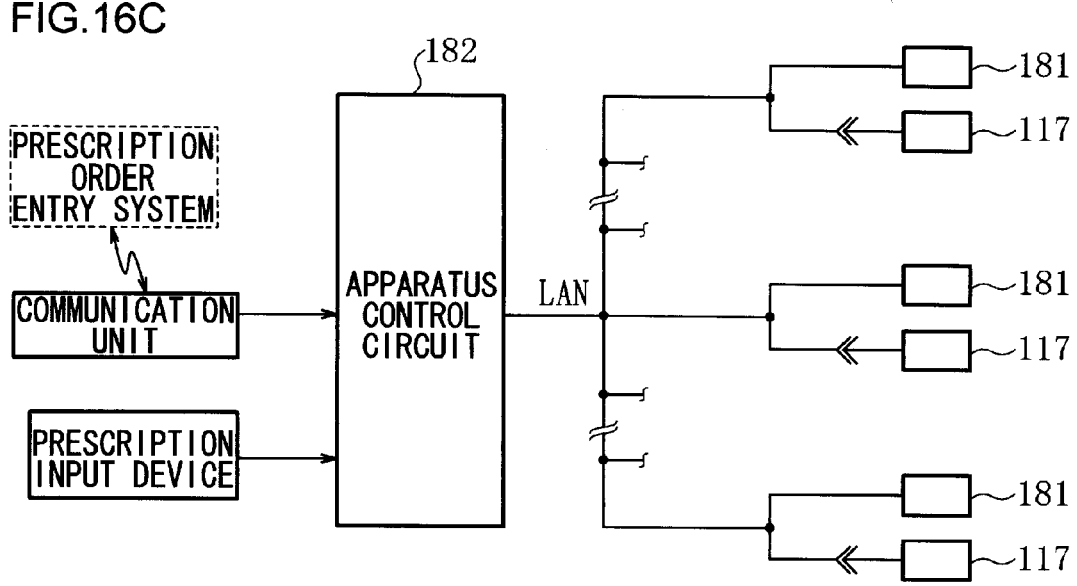

The illustrative embodiment 2-7 shown in FIGS. 16A-16C is an embodiment of the second drug dispensing apparatus mentioned above.

In the illustration, fasteners such as bolts, connectors such as hinges, detailed electric and electronic circuits are omitted for brevity, highlighting those elements necessary to explain the embodiment and related elements.

Illustrative Embodiment 2-1

Figure 9A:
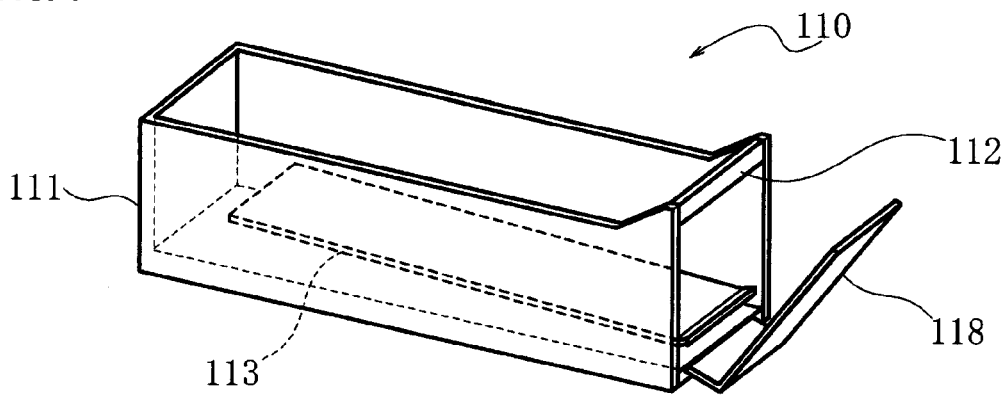
FIGS. 9A-9D show the structure of a vibration-assisted ejection cassette according to an illustrative embodiment 2-1 of a second embodiment.
Figure 9B:
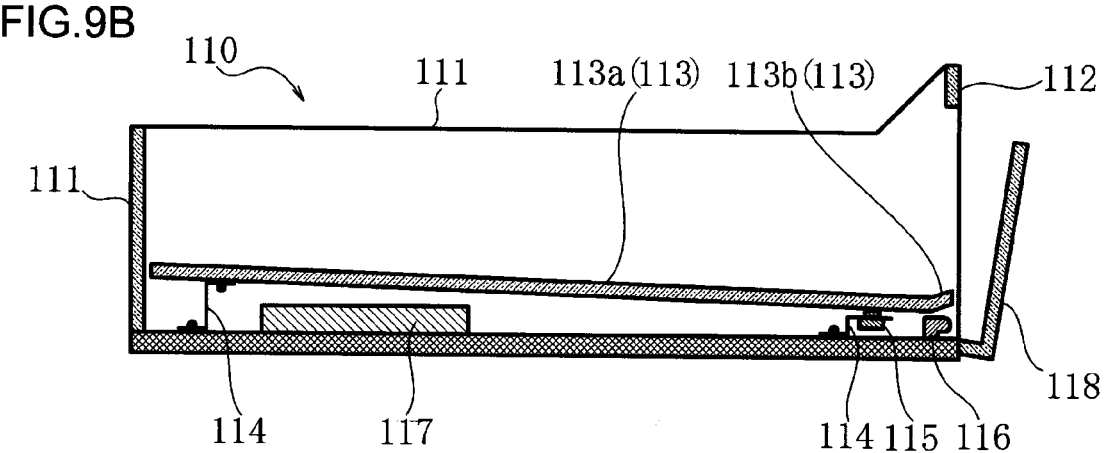
Figure 9C:
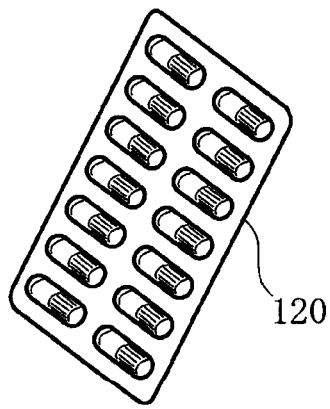
Figure 9D:
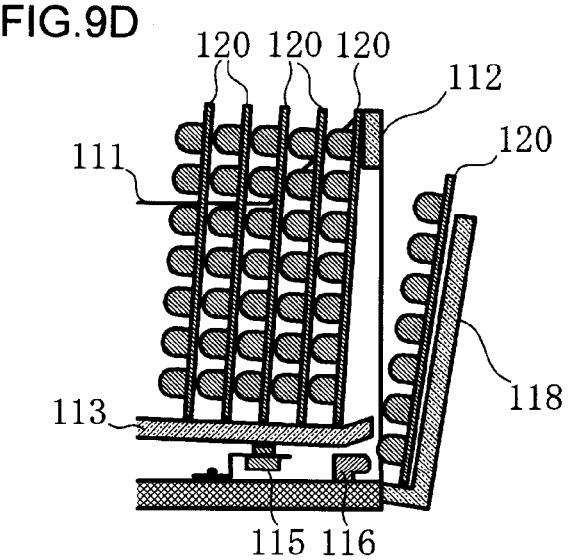

The specific structure of the vibration-assisted ejection cassette according to the illustrative embodiment 2-1 ill be described with reference to the drawings. FIG. 9A is a perspective view showing the appearance of a vibration-assisted ejection cassette 110; FIG. 9B is a sectional left side view of the cassette 110; FIG. 9C is a perspective view showing the appearance of a PTP-packaged drug 120; and FIG. 9D is a sectional left side view of an essential part of the cassette 110 aligning the drugs 120 for storage.

The vibration-assisted ejection cassette 110 comprises outer plates 111, a top frame 112, an inner plate 113, elastic support members 114, a vibrating member 115, an ejection detecting member 116, a cassette control circuit 117 and a retention member 118 (see FIGS. 9A and 9B). The cassette 110 is designed to align the PTP-packaged drugs 120 for storage in an upright position in a horizontal queue, and to eject the drugs 120 one by one in the order of arrangement (see FIGS. 9C and 9D).

To describe the cassette in further detail, the outer plates 111 (see FIGS. 9A and 9B) form a box in which is secured a drug accommodating space for aligning the drugs 120 for storage. The outer plates 111 bound at least the sides of the space. In the illustrated example, the back (read face; in the figure, left end face) and the bottom (underside) are also bounded by the outer plates 111. The outer plates 111 may be integrally formed of transparent resin. Alternatively, plates may be formed individually and built to form a box by being adhesively attached to each other. The drug accommodating space inside is substantially cuboid in shape and longitudinally (in the figure, sideways) elongated. Substantially the entirety of the top of the space is open to facilitate replenishment of drugs. The front (in the figure, right end face) is wide open to facilitate ejection of drugs. The width of the open front is greater than the width of the drug 120. For example, the open front has a width of 10-100 mm. The height of the open front is slightly less than the length of the drug 120. For example, the open front has a height of 100-200 mm.

The top frame 112 is provided above the open front of the drug accommodating space defined by the outer plates 111 and is a horizontal-bridging member extending horizontally (see FIGS. 9A and 9B). The top frame 112 operates to interfere with top end of the drug 120 at the head of the queue to prevent the drug from falling forward (see FIG. 9D).

The inner plate 113 (see FIGS. 9A, 9B and 9D) carries the drug 120 and advances the same when vibrated. The inner plate 113 comprises a descending slope 113$a$ and an ascending slope 113$b$ in order to stabilize the advance, the descending slope 113$a$ occupying the majority of the plate 113 and the ascending slope 113$b$ occupying a small portion of the plate 113 toward the front end thereof. For example, the ascending slope 113$b$ has a length of several mm longitudinally (in the figure, sideways), and the inclination to the horizon is approximately 15°-30°. The descending slope 113$a$ has a length of 10-1000 mm longitudinally, and the inclination to the horizon is approximately 5°-10°. Typically, the inner plate 113 has a width of 10-100 mm.

The inner plate 113 in the stated condition of inclination (see FIG. 9B) is movably inserted to rest on the interior bottom of the drug accommodating space. The plate 113 is connected to the bottom plate of the outer plates 111 via the multiple (in the figure, two) elastic support members 114 in order to maintain the inclined condition. The elastic support member 114 is implemented by, for example, a thin metal plate or a piano wire. The member 114 is easily elastically deformable to support the inner plate 113 vibratably.

The vibrating member 115 (see FIGS. 9B and 9D) is implemented by an inexpensive, mass-produced vibration motor with an eccentric rotor built in, for example, a cell phone. The member 115 is provided closer to the inner plate 113 than the elastic support member 114 or provided on the underside of the inner plate 113 so as to vibrate the inner plate 113.

The retention member 118 (see FIGS. 9A, 9B and 9D) is provided in front of the open front of the drug accommodating space defined by the outer plates 111. The retention member 118 is designed to catch and retain the accommodated drug 120 at the head of the queue ejected from the open front. For this purpose, the retention member 118 is implemented by, for example, a transparent resin plate slightly bent at the lower end thereof. The lower end is connected and secured to the front of the bottom plate of the outer plates 111. The main part and the top end of the member 118 are inclined forward. The length of the retention member 118 is slightly less than the length of the drug 120 so that the top end of the drug 120 retained is projected outside, allowing the drug 120 to be grasped easily (see FIG. 9D). The distance between the lower end of the retention member 118 and the lower end of the top frame 112 is greater than the length of the drug 120 so that the drug 120 thus inclined is allowed to pass through the open front and to fall. Further, the distance between the front end of the inner plate 113 and the opposite face of the retention member 118 is slightly greater than the thickness of the drug 120 so as to properly limit the number of drugs 120 retained in the retention member 118 to one.

The ejection detecting member 116 (see FIGS. 9B and 9D) is implemented by, for example, a reflective photosensor. In the illustrated example, the member 116 is provided on the bottom plate of the outer plates 111 and below the inner plate 113 so as to output a signal which turns on and off according to whether the drug 120 is located in the retention member 118, allowing detection of reflected light, or the drug 120 is not located in the retention member 118, not allowing detection of reflected light.

The cassette control circuit 117 is implemented by a one-chip microcomputer and/or a logic circuit. The control circuit 117 receives a detection signal from the ejection detecting member 116 so as to control the operation of the vibrating member 115. For operation, the circuit 117 is supplied with power from a power supply circuit or a battery (not shown). When the detection result from the ejection detecting member 116 indicates that the drug is not retained, the control circuit 117 activates the vibrating member 115. When the detection result from the ejection detecting member 116 indicates that the drug is retained, the control circuit 117 stops activating the vibrating member 115.

The mode of using the vibration-assisted ejection cassette 110 according to the illustrative embodiment 2-1 and its operation will be described with reference to the drawings. FIGS. 10A-10F are sectional left side views of an essential part of the cassette. FIG. 9C is a perspective view showing the appearance of the PTP-packaged drug 120.

A typical shape of the PTP-packaged drug 120 is a rectangular sheet which is flat on one side and which is provided with an array of pockets for accommodating drugs on the other side. Typically, the width of the PTP-packaged drug 120 is 10-100 mm, the length thereof is 100-200 mm, and the thickness thereof is several mm. The weight of the PTP-packaged drug 120 is typically 10-200 mg.

Figure 10A:
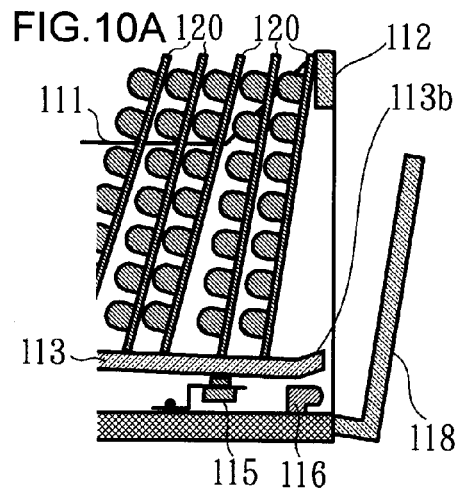
FIGS. 10A-10F show how a vibration-assisted ejection cassette according to the illustrative embodiment 2-1 operates.
Figure 10B:
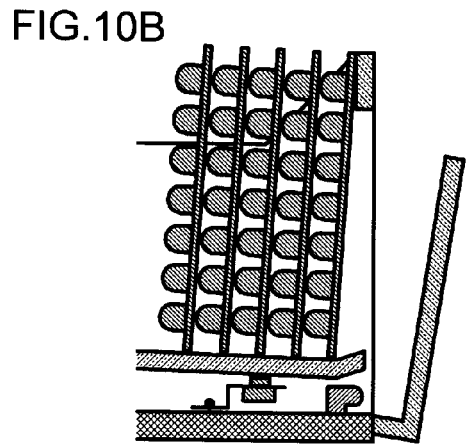
Figure 10C:
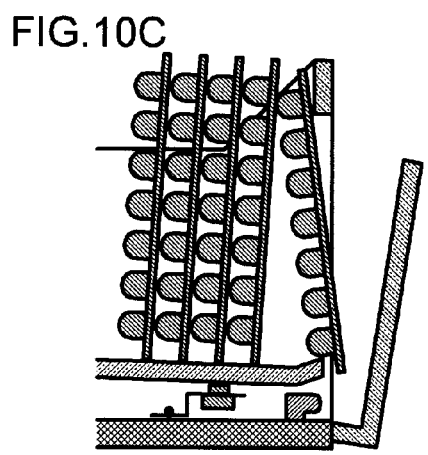
Figure 10D:
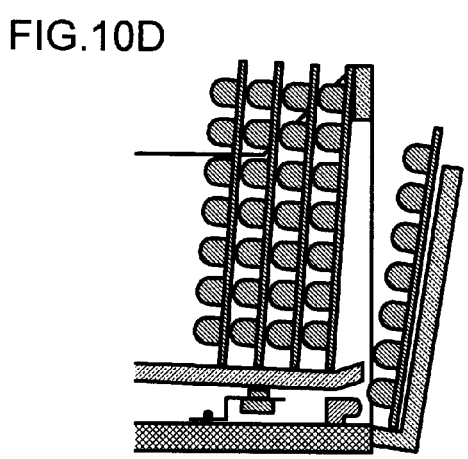
Figure 10E:
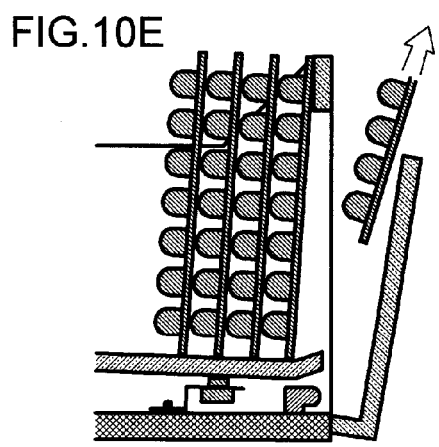
Figure 10F:
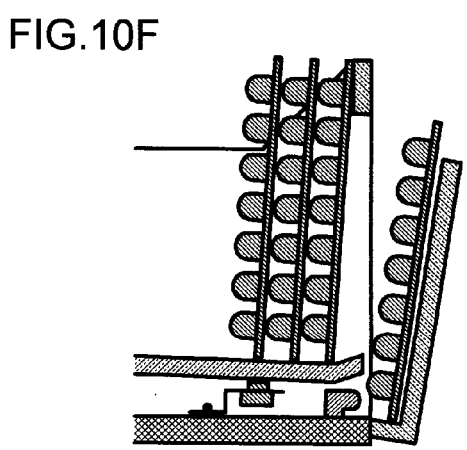
Figure 11A:
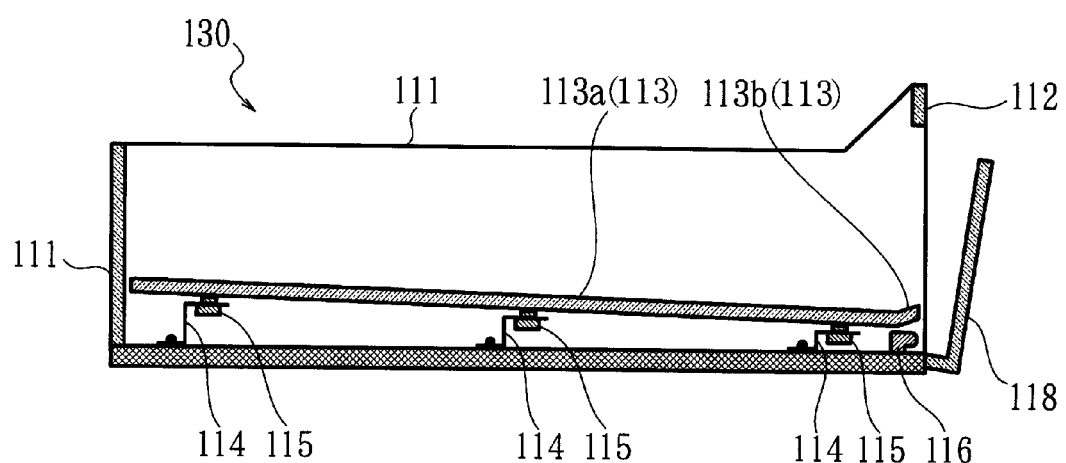
Figure 11B:
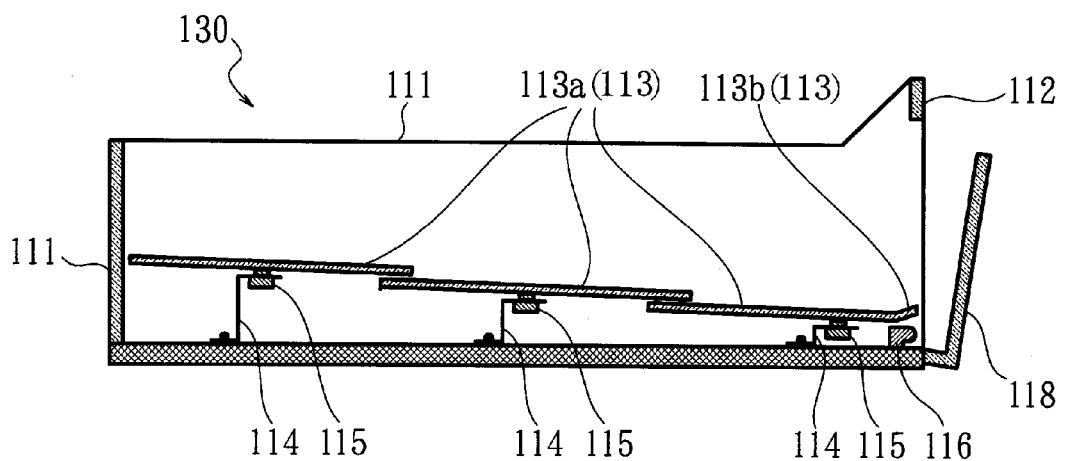

The drugs 120 are manually replenished from above the open top of the empty cassette 110 (see FIG. 10A). While the replenishment is proceeding, the cassette 110 is prevented from being activated, i.e., the vibration of the vibrating member 115 is prevented. The drugs 120 are serially arranged in the longitudinal direction, ensuring that the head and tail of the drugs 120 are identically oriented in the drug accommodating space. More specifically, the drugs 120 are aligned for storage in the drug accommodating space in the outer plates 111, starting at the head of the queue. In this process, each drug 120 is provided above the vibrating member 115 in an upright position inside the drug accommodating space. The drug at the head of the queue is accommodated such that the top end leans against the top frame 112 to prevent the drug from falling down. The other drugs 120 in the queue are made to lean against each other. The drugs 120 may lean at different angles or may be spaced apart from each other, forming different gaps, so long as the drugs 120 are prevented from falling down.

Once the drugs are replenished, the cassette 110 is activated. More specifically, vibration control of the vibrating member 115 in accordance with detection by the ejection detecting member 116 is initiated by, for example, feeding power to the cassette control circuit 117. Since the drug 120 is not located in the retention member 118 (see FIG. 10B), the inner plate 113 is vibrated. This reduces friction so that the thrust derived from gravitation force commensurate with the slope exceeds the friction. The drug 120 above the descending slope 113a of the inner plate 113 advances little by little. The drug 120 at the head of the queue advances to a boundary between the descending slope 113a and the ascending slope 113b and the drugs 120 that follow are moved closer to each other so that the accommodated drugs 120 are neatly aligned inside the drug accommodating space.

In this condition, vibration still continues and the drugs 120 are thrust forward. The drug 120 at the head of the queue continues to be prevented from advancing since the top end thereof is caught by the top frame 112, but the lower end thereof gets over the ascending slope 113b and leaves the inner plate 113 so as to enter the space in front of the open front (see FIG. 10C). The drug 120 at the head is detached from the outer plates 111 and the top frame 112 under its own weight, caught by the retention member 118 and retained there (see FIG. 10D). Concurrently, the top end of the drug 120, next in line and located on the inner plate 113 without the ejected drug 120, leans against the top frame 112, and the lower end of the drug 120 advances to the boundary between the descending slope 113a and the ascending slope 113b. The drug 120 transferred to the retention member 118 enters a range of detection by the ejection detecting member 116. The detection output of the ejection detecting member 116 changes to indicate that the drug is retained. In response to this, the control circuit 117 stops activating the vibrating member 115 so that the inner plate 113 comes to rest and is maintained in the current condition.

The drug 120 retained in the retention member 118 is removed from the queue, and the top end thereof is exposed to allow easy grasping. By grasping and lifting the top end, one PTP-packaged drug 120 can be easily taken out (see FIG. 10E). As the drug is taken out, no drugs 120 remain retained on the retention member 118. The cassette is now in a condition that occurred when the drugs are replenished except that the number of accommodated drugs 120 is reduced by one. Vibration of the inner plate 113 is resumed so that the next drug 120 in line is ejected out of the open front of the outer plates 111 and then retained in the retention member 118 (see FIG. 10F). The operation described above is repeated each time the drug 120 is picked up from the retention member 118. Thus, the vibration-assisted ejection cassette 110 enables easily and properly grasping and taking out the PTP-packaged drug 120 one by one.

Illustrative Embodiment 2-2

A vibration-assisted ejection cassette 130 according to the illustrative embodiment 2-2, shown in the longitudinal sectional left side view of FIG. 11A, differs from the cassette 110 according to the illustrative embodiment 2-1 in that multiple (in the illustrated example, three) vibrating members 115 are provided.

The vibration-assisted ejection cassette 130 according to the illustrative embodiment 2-2 shown in the longitudinal sectional left side view of FIG. 11B is configured such that the descending slope 113*a* of the inner plate 113 is segmented (in the illustrated example, into three segments) so as to correspond to the vibrating members 115.

The single vibrating member 115 may be replaced by a large one to enhance capability to vibrate. In this case, however, increase in cost is minimized by using a desired number of inexpensive mass-produced products. Another advantage is that, by distributing multiple vibrating members 115 in the longitudinal direction of the inner plate 113, the entire inner plate 113 is vibrated uniformly.

Illustrative Embodiment 2-3

Figure 12A:
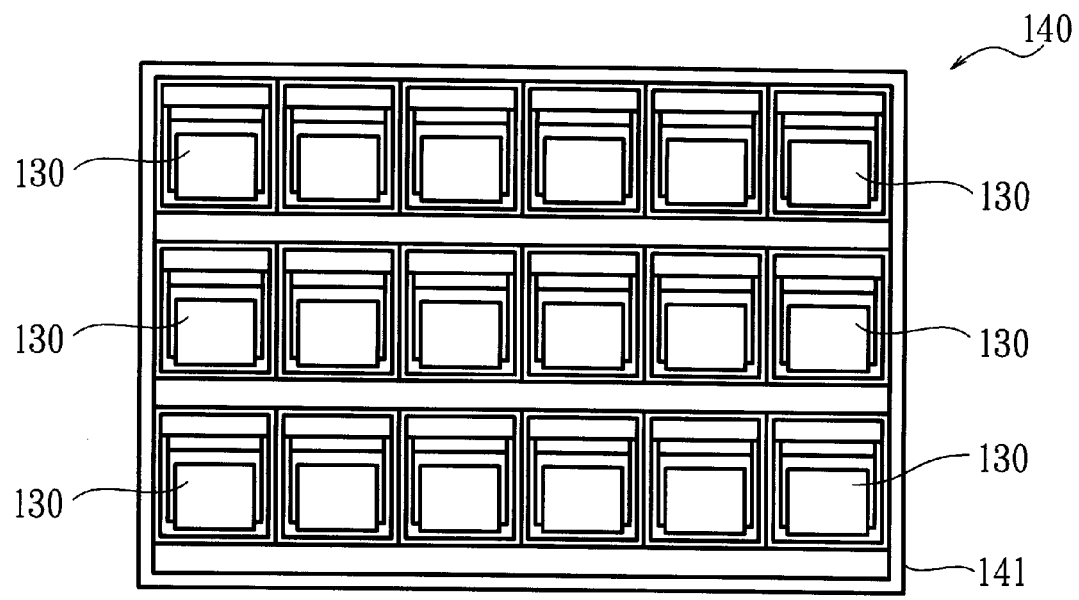
FIGS. 12A-12B show the structure of a drug dispensing apparatus according to an illustrative embodiment 2-3 of the second embodiment.
Figure 12B:
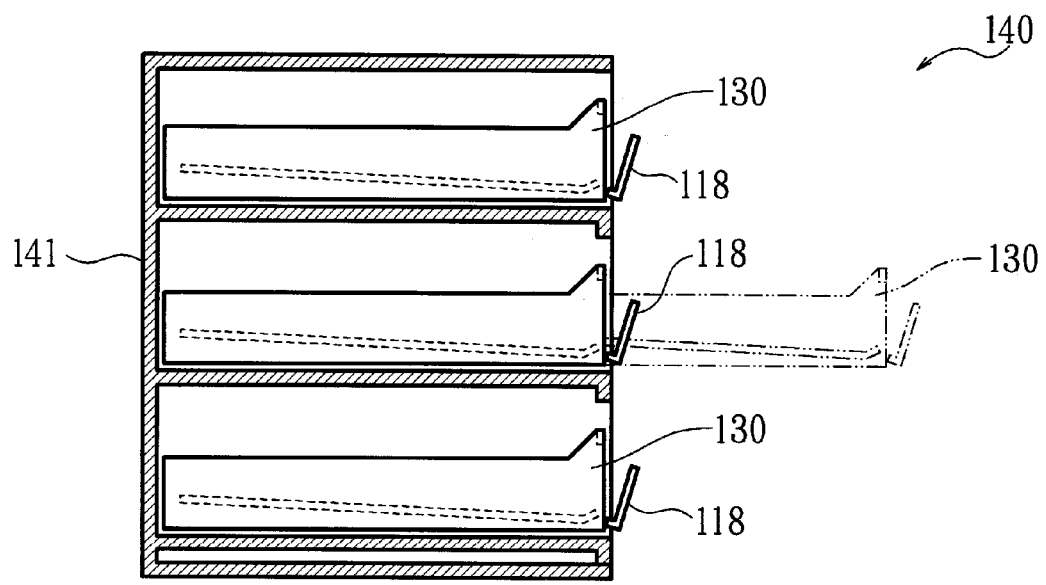
Figure 13A:
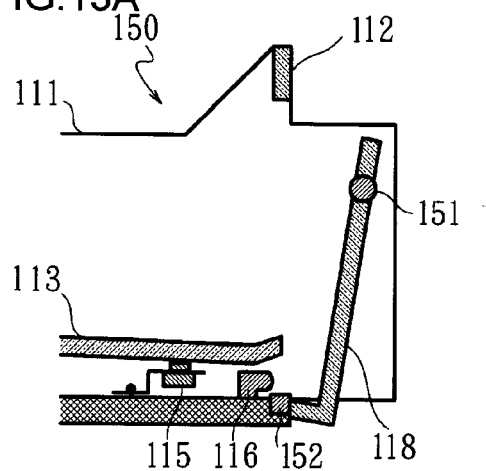
FIGS. 13A-13F show the structure of a vibration-assisted ejection cassette according to an illustrative embodiment 2-4 of the second embodiment.
Figure 13B:
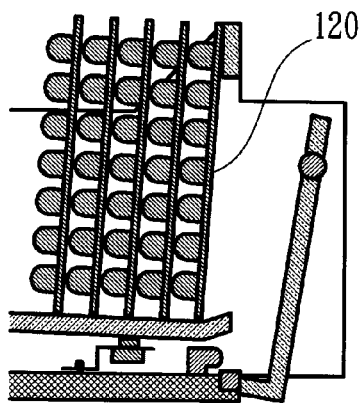
Figure 13C:
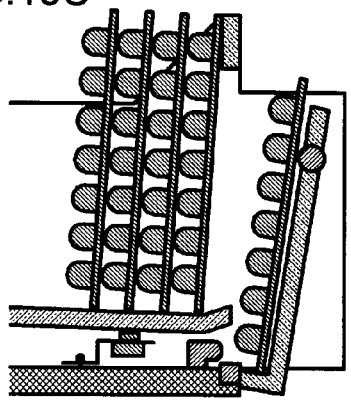
Figure 13D:
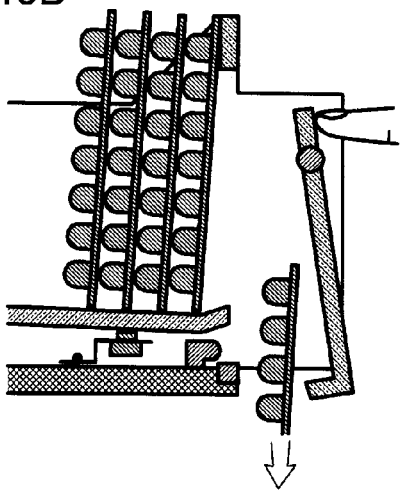
Figure 13E:
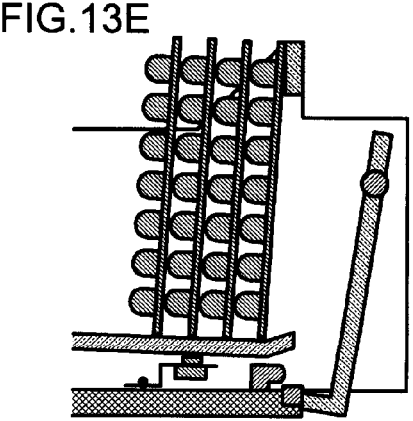
Figure 13F:
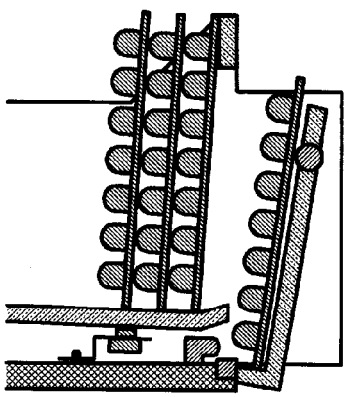

A drug dispensing apparatus 140 according to the illustrative embodiment 2-3 shown in the front view and the left side view of FIGS. 12A and 12B is configured such that an array of the vibration-assisted ejection cassettes 130 described above is provided inside a housing 141.

In the illustrated example, eighteen cassettes 130 are arranged in a 3×6 matrix. For replenishment of the drug 120, each cassette 130 is drawn forward from the housing 141.

The drug dispensing apparatus 140 may be placed on, for example, a preparation desk standalone. Alternatively, the drug dispensing apparatuses 140 may be arranged side by side or stacked one upon another.

Various PTP-packaged drugs 120 are replenished in a large number of cassettes 130. By activating the cassette 130, it is always ensured that the drug 120 is retained one by one in the retention member 118 at the front of the drug dispensing apparatus 140. Thus, a person in charge of preparing drugs can efficiently pick up and collect desired drugs 120 one after another.

Illustrative Embodiment 2-4

A vibration-assisted ejection cassette 150 according to the illustrative embodiment 2-4, an essential part of which is shown in the longitudinal sectional left side view of FIG. 13A-13F, differs from the cassettes 110 and 130 according to the illustrative embodiments 2-1 and 2-2 described above in that the retention member 118 is movable and that there is added a retention detecting member 152 for detecting whether the retention member 118 is positioned to retain a drug or positioned to discharge a drug.

The retention member 118 (see FIG. 13A) is no longer stationary with respect to the outer plates 111. Instead, the retention member 118 is pivotally supported by a horizontally extending (in the figure, in a direction perpendicular to the paper) pivot shaft 151. The pivot shaft 151 is supported in horizontal position by the sides etc. of the outer plates 111 extended forward. The pivotal shaft 151 is connected to the retention member 118 toward the top end of the retention member 118. The retention member 118 may pivotally move together with the pivot shaft 151 or independently thereof. Absent an external force exerted thereon, the retention member is biased by a spring or a weight (not shown) so that the lower end thereof comes into contact with the front end of the bottom plate of the outer plates 111.

The retention detecting member 152 may be a non-contact photosensor similar to the ejection detecting member 116. Alternatively, the retention detecting member 152 may be implemented by an inexpensive contact push switch. In any case, the member 152 is provided in a portion of the bottom plate of the outer plates 111 coming into contact with the retention member 118 or in the neighborhood thereof. When in contact, the member 152 outputs a detection signal indicating that the retention member 118 is positioned to retain a drug. When the retention member 118 is detached from the outer plates 111, the member 152 outputs a signal indicating that the retention member 118 is positioned to discharge a drug. The detection signal is sent to the cassette control circuit 117. The cassette control circuit 117 activates the vibrating member 115 only when the retention member 118 is detected to be positioned to retain a drug. That is, the inner plate 113 is prevented from being vibrated when the retention member 118 is positioned to discharge a drug.

In this embodiment, as the drugs 120 are aligned for storage (see FIG. 13B) in the empty cassette 150 (see FIG. 13A), the inner plate 113 is vibrated because the retention member 118 is positioned to retain a drug but the drug 120 is not there yet. As the accommodated drug 120 at the head of the queue is ejected from its position on the inner plate 113 and transferred to the retention member 118 (see FIG. 13C), vibration of the inner plate 113 is halted and one drug 120 is retained in the retention member 118. In this condition, the drug 120 may be taken out by picking it up. However, the drug 120 may be taken out more easily.

More specifically (see FIG. 13D), by lightly pressing the top end of the retention member 118 by, for example, a finger, the retention member 118 is pivotally moved and the lower end thereof is detached from the outer plates 111, thereby positioning the retention member 118 to discharge the drug. This causes the drug 120 retained in the retention member 118 to be dropped and discharged from a gap created between the lower end of the retention member 118 and the outer plates 111. Thus, the desired drug 120 can easily be taken out from below. As the finger is removed from the retention member 118 afterward, the retention member 118 is pivotally moved in a reverse direction and is positioned again to retain a drug (see FIG. 13E).

The inner plate 113 is vibrated as previously except that the number of accommodated drugs 120 is reduced by one. The next drug 120 in line is ejected out of the open front of the outer plates 111 and then retained in the retention member 118 (see FIG. 13F). The operation described above is repeated each time the drug 120 is picked up or dropped and discharged from the retention member 118. Thus, the vibration-assisted ejection cassette 150 enables the user to take out the PTP-packaged drug 120 one by one easily and properly. In the case of the vibration-assisted ejection cassette 150, the drug 120 is dropped and discharged efficiently by the simple action of lightly pressing the top end of the retention member 118. Thus, the manual operation of taking out drugs is more facilitated in a manner suitable for automated retrieval.

Illustrative Embodiment 2-5

A vibration-assisted ejection cassette 160 according to the illustrative embodiment 2-5, an essential part of which is shown in the longitudinal sectional left side view of FIGS.

14A and 14B, differs from the cassette 150 according to the illustrative embodiment 2-4 in that a descent guidance member 161 is provided below the retention member 118.

The descent guidance member 161 (see FIG. 14A) is formed as a gently curved plate. The top end of the member 161 is connected and secured to the underside of the bottom plate constituting the outer plates 111 toward the front of the bottom plate. The concave face of the member 161 faces in a forward and obliquely upward direction. The lower end of the member 161 extends forward to a space below the cassette.

In this embodiment (see FIG. 14B), the drug 120 is dropped and discharged from the retention member 118 and then guided toward a user by sliding on the concave face of the descent guidance member 161.

Illustrative Embodiment 2-6

A drug dispensing apparatus 170 according to the illustrative embodiment 2-6 shown in the front view and the left side view of FIGS. 15A and 15B is configured such that an array of the vibration-assisted ejection cassettes 160 described above is provided inside a housing 171. In the illustrated example, nine cassettes 160 are arranged in a 3×3 matrix.

In this drug dispensing apparatus 170, the drug 120, dropped and discharged from the retention member 118 of the cassette 160, is guided toward a user by the descent guidance member 161 while descending the slope.

Thus, the drug 120 dropped and discharged from the cassette 160 above successfully drops without being entangled by the retention member 118 of the cassette 160 below.

The desired drug 120 can be dispensed and collected easily and efficiently by, for example, placing a receiving box 172 of an appropriate size in front of the housing 171.

Illustrative Embodiment 2-7

A drug dispensing apparatus 180 according to the illustrative embodiment 2-7 shown in the front views and the control circuit block diagram of FIGS. 16A-16C differs from the drug dispensing apparatus 170 described above in that an indicator 181 is provided in one-to-one relation to the vibration-assisted ejection cassette 160 (see FIGS. 16A and 16B), and that there is provided an apparatus control circuit 182 for causing the indicator to display the number of drugs to be taken out (see FIG. 16C).

The indicator 181 is provided at, for example, the front of the apparatus in an easily viewable manner, so as to let an operator know the number of drugs to be taken out from the vibration-assisted ejection cassette 160 for which the indicator 181 is provided. The indicator may be directly provided in, for example, the front end of the vibration-assisted ejection cassette 160. In this example, however, the indicator is attached to the housing 171. Like a name plate or an identification information sticker of a drug, the location of attachment is selected such that the correspondence between the indicator and the vibration-assisted ejection cassette 160 for which it is provided is immediately known. An indicator capable of displaying at least one-digit number is employed as the indicator 181. In the illustrated example (see FIG. 16B), an indicator capable of displaying two-digit decimal numbers is employed. The number displaying unit 181 used in a one-digit display unit at each digit position may be a general-purpose product. For example, seven light-emitting devices may be used as elements to constitute a pattern representing a number and arranged to define a numeral "8". Alternatively, a small dot-matrix liquid crystal panel may be used.

The control circuit 182 (see FIG. 16C) is a programmable electronic controller implemented by, for example, a general-purpose personal computer or a microprocessor system. In addition to a standard input and output device (not shown) such as a touch panel, there are also provided a communication unit responsible for communication with an external prescription order entry system for input of drug dispensing information, and a prescription input device comprising a one-dimensional or two-dimensional barcode reader and/or a character reader. A local area network (LAN) cable is provided between the apparatus control circuit 182, the indicator 181 and the part where the vibration-assisted ejection cassette is attached. When the vibration-assisted ejection cassette 160 is attached, the cassette control circuit 117 is connected to the LAN via an appropriate connector.

While a manual dispensing support program is being run, the apparatus control circuit 182 receives drug dispensing information such as prescription data or drug preparation data generated by extracting from or categorizing the prescription data. In accordance with the input drug dispensing information, the circuit 182 selects the indicator 181, displays the number of drugs to be taken out and updates the displayed number. That is, when the drug dispensing information is input, the circuit 182 selects the indicator 181 corresponding to the vibration-assisted ejection cassette 160 storing the drug 120 designated in the drug dispensing information, and causes the selected indicator 181 to display the number of drugs to be taken out. The circuit 182 also collects data by detecting ejection from the vibration-assisted ejection cassette 160 for which the indicator is provided. The circuit 182 updates the number displayed in the indicator 181 in accordance with the detection.

When there is only one type of drug 120 designated in the drug dispensing information, the circuit 182 selects one indicator 181. When multiple types are designated, the circuit 182 selects multiple indicators 181. If necessary, the number of drugs designated in the drug dispensing information may be translated into the number of PTO-packaged drugs before displaying the number of drugs to be taken out. Updating of the displayed number is performed on the basis of the detection by the ejection detecting member 116 in the vibration-assisted ejection cassette 160 for which the indicator is provided. When the detection output changes to indicate that a drug is no longer retained, the circuit 182 determines that one drug 120 is taken out so as to reduce the number displayed in the associated indicator 181 by one. When the displayed number reaches "0", the circuit 182 stops displaying the number.

In the drug dispensing apparatus 180, when drug dispensing information such as prescription data or drug preparation data is input from the prescription input device or the prescription order entry system, the number of drugs to be taken out is displayed by the indicator 181 corresponding to the vibration-assisted ejection cassette 160 aligning and storing the drug designated by the information to be collected by an operator. This makes the number of desired drugs 120 to be taken out/dispensed immediately known. The operator preparing the drug follows the guidance as displayed so as to take out and collect the drugs 120 one by one from the vibration-assisted ejection cassette 160 associated with the indicator 181 displaying the number of drugs yet to be taken out. Even when the number of drugs 120 necessary or the number of drugs to be taken out is large, or even when drugs are dispensed manually, desired drugs 120 can be collected easily, efficiently and without fail, merely by following the guidance as displayed and updated.

[Other Points of Note]

The cassettes 160 may be cylindrically arranged as in the storage of patent document No. 2 instead of being rectangularly arranged.

In the illustrative embodiment above, the indicator is configured to display the number of drugs yet to be taken out. Alternatively, the indicator may display the fixed number of drugs designated and the number of drugs ejected side by side.

In the above-described illustrative embodiments, it is ensured that the head and tail of the PTP-packaged drugs are identically oriented when the drugs are aligned in the drug accommodating space of the cassette. However, this is not an essential requirement. The orientation of the head and tail of the PTP-packaged drugs may only be given secondary consideration so long as the aligned condition is not impaired.

In the above-described illustrative embodiments, the drugs are taken out one by one from the cassette. Alternatively, multiple (e.g. two or three) drugs may be taken out at a time. More specifically, this can easily be achieved by extending the distance between the front end of the inner plate and the opposite face of the retention member.

Third Embodiment

A third embodiment of the present invention relates to a vibration-assisted ejection cassette and a drug dispensing apparatus for aligning PTP-packaged or equivalently packaged drugs for storage and sequentially ejecting the drugs, and, more particularly, to a technology to feed and eject drugs by using vibration.

PTP-packaged drugs, even as they are individually packaged, are thinly packaged and irregular in cross section. As such, it is not necessarily easy to properly grasp the one at the head of the queue of drugs aligned for storage. The ejecting mechanism can be simplified only in a limited way if automatization is achieved by a mechanism for grasping or absorbing drugs. To eliminate a biasing means for advancing accommodated drugs, there would be required, for example, a mechanism for translating the absorbing mechanism instead.

In this background, it is desirable to simplify the mechanism by putting the vibration-assisted method, which is used in a powder medicine feeder, to the use of dispensing PTP-packaged drugs and, in this process, eliminating the need for a weighting member for measuring weight or a biasing member for advancing drugs. That is, a technical task to be achieved is to utilize vibration so as to maintain PTP-packaged drugs in alignment with each other, advance the drugs while maintaining the drugs in alignment and eject them one by one.

An additional challenge is to ensure that drugs can be either manually removed one by one or automatically ejected in an equally easy and reliable manner.

A brief summary of the third embodiment will be given.

A first vibration-assisted ejection cassette according to the second embodiment comprises: outer plates which align PTP-packaged or equivalently packaged drugs for storage; a top frame which is provided above an open front and which prevents accommodated drugs from being falling forward; an inner plate which carries the accommodated drug and advances the drug when vibrated; a vibrating member which vibrates the inner plate; a retention member which is provided in front of the open front and which retains the accommodated drug ejected from the open front; and a controller which detects whether or not a drug is retained so as to activate the vibrating member when a drug is not retained and stop activating the vibrating member when a drug is retained, wherein the retention member is movable and adapted to be positioned to discharge a drug as well as being positioned to retain one.

The term "PTP-packaged or equivalently packaged drugs" refers to drugs accommodated in a thin paper case or a plastic case and, more particularly, to those that can be aligned for storage in an upright position, such as the PTP-packaged drug.

A second vibration-assisted ejection cassette (second means to solve the problem) according to the third embodiment is a modification to the first vibration-based ejection cassette mentioned above, wherein the top of a drug accommodating space bounded by the outer plates is open so as to facilitate replenishment of a drug, an inner plate is movably inserted to rest on the interior bottom of the drug accommodating space so as to be vibrated while carrying an accommodated drug, and the front end portion of the top face of the inner plate is formed as an ascending slope and the remaining portion is formed as a descending slope so that the inner plate when vibrated advances an accommodated drug. That is, the vibration-assisted ejection cassette is for aligning PTP-packaged or equivalently packaged drugs for storage and sequentially ejecting the drugs, and comprises: outer plates which bound at least the sides of a drug accommodating space, the top of the space being open so as to facilitate replenishment of a drug and the front of the space being open so as to facilitate ejection of a drug; a top frame which is provided above the front of the space and which prevents a drug at the head of a queue of drugs accommodated from falling forward by interfering with the top end of the drug; an inner plate which is movably inserted to rest on the interior bottom of the drug accommodating space so as to be vibratably supported, the front end portion of the top face of the inner plate being formed as an ascending slope and the remaining portion being formed as a descending slope; a vibrating member which vibrates the inner plate; a retention member which is provided in front of the open front and which retains the accommodated drug ejected from the open front; and a controller which detects whether or not a drug is retained so as to activate the vibrating member when a drug is not retained and stop activating the vibrating member when a drug is retained, wherein the retention member is movable and adapted to be positioned to discharge a drug as well as being positioned to retain one.

The first drug dispensing apparatus according to the third embodiment is configured such that an array of one of the first or second vibration-assisted ejection cassettes mentioned above is arranged in a housing.

A second drug dispensing apparatus according to the third embodiment is a modification to the second drug dispensing apparatus mentioned above, wherein an actuator mechanism is provided which selects a desired vibration-assisted ejection cassette and activates the retention member of the selected cassette.

According to the first vibration-assisted ejection cassette, a large number of drugs can be aligned for storage without falling down, by accommodating PTP-packaged drugs etc. in the drug accommodating space bounded by the outer plates, by arranging the drugs above the vibrating member in an upright position, and by allowing the accommodated drug at the head of the queue to lean against the top frame. When the inner plate is vibrated by the vibrating member, the accommodated drugs advance. Since the drug at the head of the queue is prevented from advancing by the top frame, the accommodated drugs are closely arranged. When the lower end of the drug at the head is thrust forward so as to be removed from the inner plate, the drug at the head is let fall and ejected from the open front. In association with this, the top end of the drug that replaces the ejected drug and brought to a position at the head is slightly inclined forward and caught by the top frame. When the lower end of the replacing drug is thrust forward so as to be removed from the inner plate, the drug is similarly let fall and ejected.

In this way, PTP-packaged drugs etc. are aligned for storage and ejected one by one by vibration. The cassette is implemented such that the top frame is provided above the open front so as to prevent the accommodated drug from falling forward, and the accommodated drugs are advanced as a result of vibrating the inner plate carrying the accommodated drugs and are let fall and ejected one by one from the open front. Thus, vibration operates to maintain the PTP-packaged drugs in alignment, advance the drugs while maintaining alignment thereof and sequentially eject the drugs. Since there is no need to provide a weighing member or a biasing member, the mechanism is simplified. Thus, the first vibration-assisted ejection cassette is configured for simple vibration-assisted ejection, in which PTP-packaged drugs etc. are aligned for storage and are ejected sequentially and properly.

According to the third vibration-assisted ejection cassette, the drug ejected from the open front is retained in the retention member in front. When the drug is retained, ejection of the next drug is prevented. When the drug is no longer retained in the retention member, the next drug is ejected by vibration and retained in the retention member.

By ensuring that one of the drugs is detached from the queue and retained in the retention member, the drugs can be taken out one by one far more easily and reliably than when the drug is directly taken out from the head of the queue either manually or automatically, while keeping the mechanism simple.

By ensuring that the retention member is movable and is capable of discharging a drug as well as retaining one in the vibration-assisted ejection cassette, drugs can be taken out one by one by positioning the retention member to discharge a drug as well as by picking up the drug retained. Discharging of a drug can be performed more easily than picking up one.

Thus, the first vibration-assisted ejection cassette is configured for simple vibration-assisted ejection, in which PTP-packaged drugs etc. are aligned for storage and are ejected one by one properly.

In the second vibration-assisted ejection cassette, not only the front of the drug accommodating space bounded by the outer plates is open for drug ejection but also the top of the space is open for drug replenishment. Therefore, drugs can be aligned for storage easily at the time of replenishment. The inner plate is movably inserted to rest on the interior bottom of the drug accommodating space so as to be vibratable while carrying an accommodated drug. A major portion of the top face of the inner plate is formed as a descending slope so that the inner plate when vibrated advances the accommodated drug, and the front end portion of the top face of the inner plate is formed as an ascending slope so that the drug is prevented from being accelerated unnecessarily and advanced substantially at a regular speed. Accordingly, vibration of the inner plate properly operates to maintain the PTP-packaged drugs in alignment, advance the drugs while maintaining alignment thereof and sequentially eject the drugs without a weighing member or a biasing member.

Thus, the second vibration-assisted ejection cassette is configured for simple vibration-assisted ejection, in which PTP-packaged drugs etc. are easily aligned for storage when replenishing the drugs and ejected one by one in a reliable and stable manner.

By arranging simple vibration-assisted ejection cassettes capable of aligning PTP-packaged drugs etc. for storage and ejecting the drugs one by one properly, a simple and inexpensive drug dispensing apparatus (first drug dispensing apparatus) suitable for storing various PTP-packaged drugs etc. and dispensing a desired drug results.

By providing an actuator mechanism for selecting a desired vibration-assisted ejection cassette and causing the cassette to discharge a drug, the second drug dispensing apparatus is capable of automatically dispensing a necessary drug. The actuator, for actuating the retention member, has only to let the retention member to assume one of only two states. Consequently, the resultant apparatus is simplified in structure, while providing the necessary advantage of automation.

Thus, the second drug dispensing apparatus embodies a simple and inexpensive drug dispensing apparatus suitable for aligning PTP-packaged drugs etc. for storage and sequentially dispensing a desired drug.

Specific embodiments of the vibration-assisted ejection cassette and the drug dispensing apparatus provided with the same according to the third embodiment will be described using illustrative embodiments 3-1 through 3-5.

The illustrative embodiment 3-1 shown in FIGS. 17A-19F is an embodiment of the first and second vibration-assisted ejection cassettes mentioned above. The illustrative embodiment 3-2 shown in FIGS. 20A-20B and the illustrative embodiment 3-3 shown in FIGS. 21A-21B are variations to the illustrative embodiment 3-1.

Figure 23:
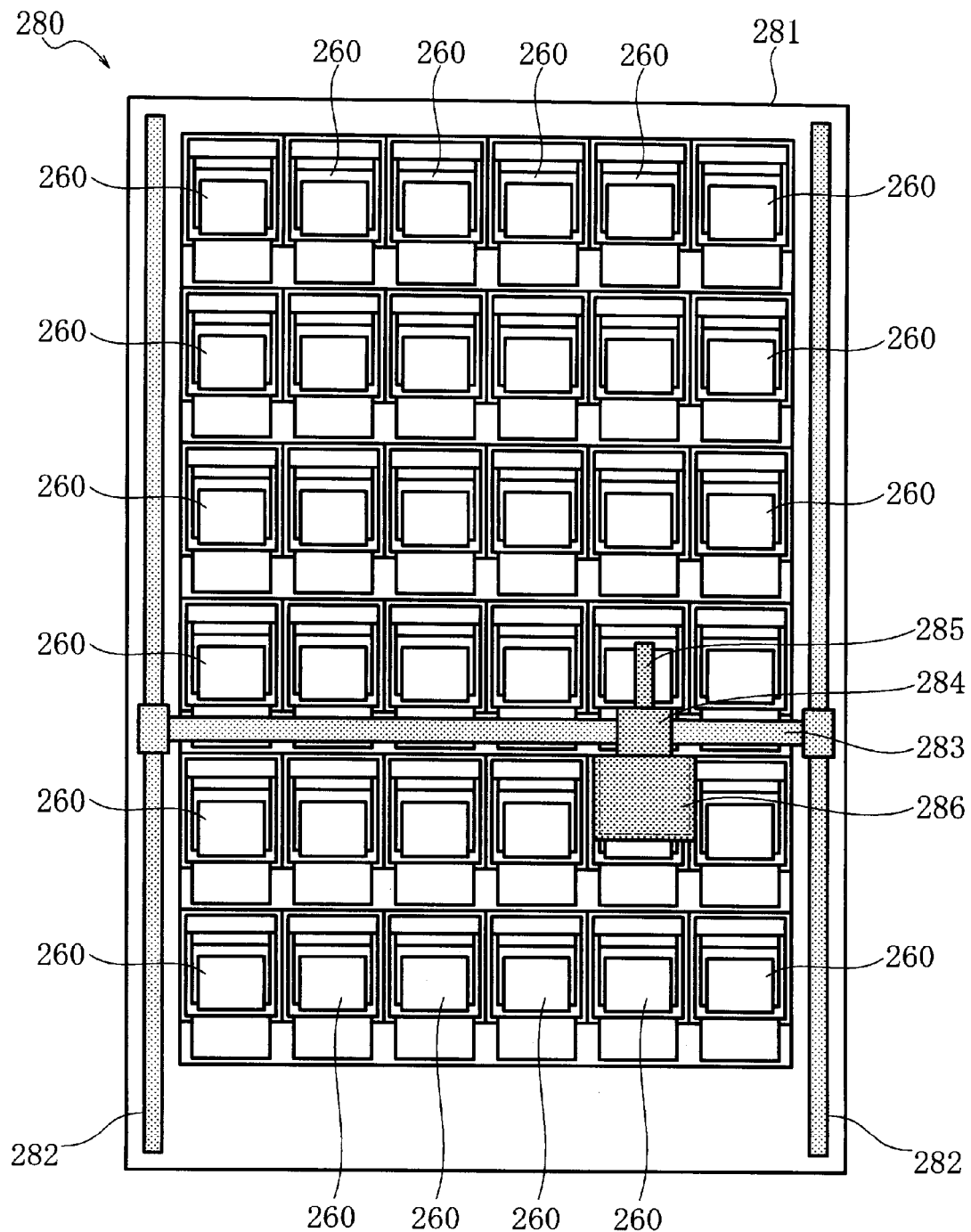
FIG. 23 is a front view of a drug dispensing apparatus according to an illustrative embodiment 3-5 of the third embodiment.

The illustrative embodiment 3-4 shown in FIGS. 22A-22B is an embodiment of the first drug dispensing apparatus mentioned above. The illustrative embodiment 3-5 shown in FIG. 23 is an embodiment of the second drug dispensing apparatus mentioned above.

In the illustration, fasteners such as bolts, connectors such as hinges, detailed electric and electronic circuits are omitted for brevity, highlighting those elements necessary to explain the embodiment and related elements.

Illustrative Embodiment 3-1

Figure 17A:
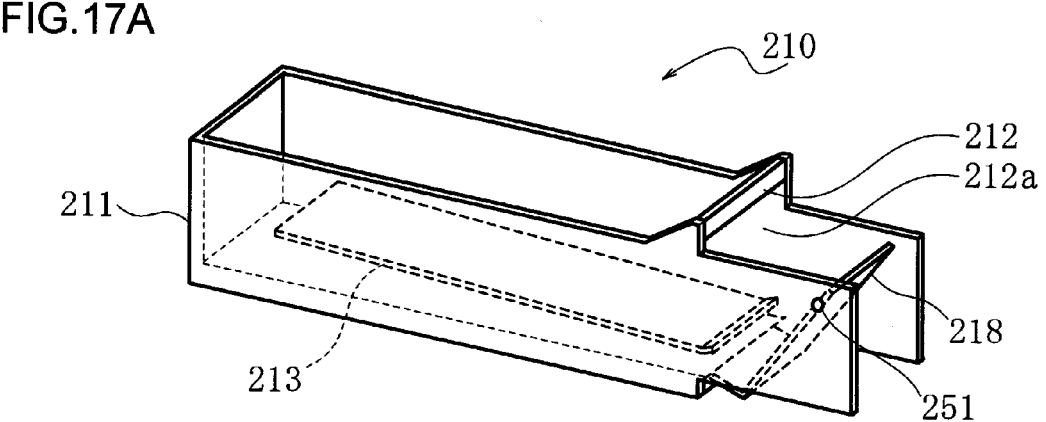
FIGS. 17A-17D show the structure of a vibration-assisted ejection cassette according to an illustrative embodiment 3-1 of a third embodiment.
Figure 17B:
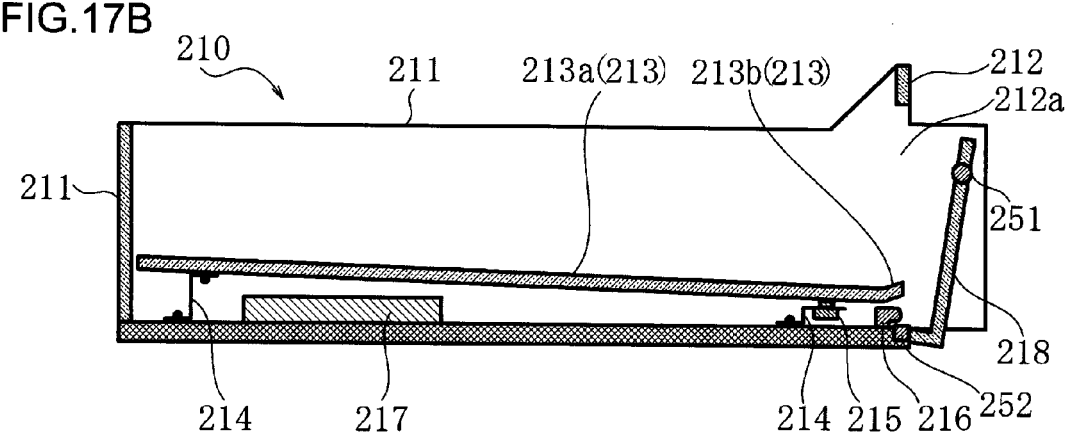
Figure 17C:
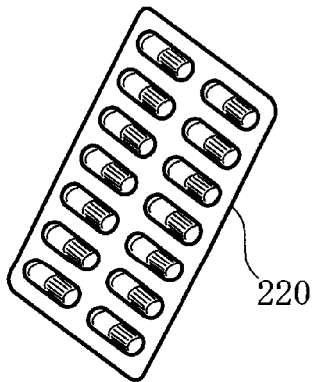
Figure 17D:
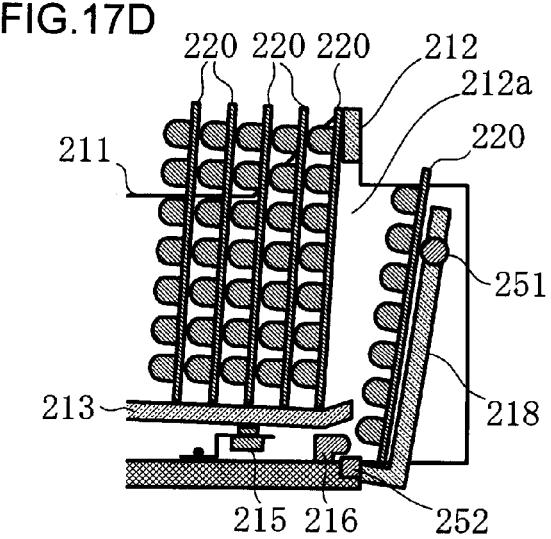
Figure 19A:
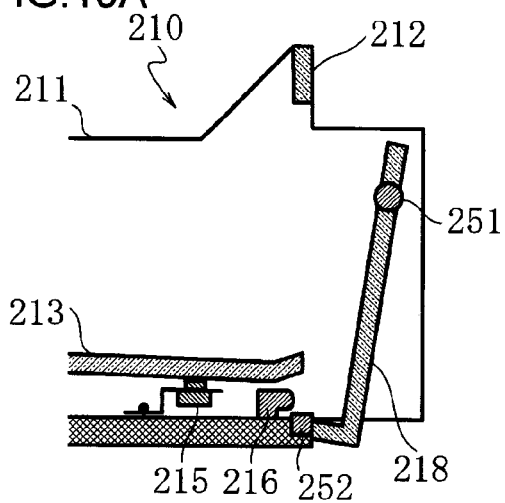
FIGS. 19A-19F show how the vibration-assisted ejection cassette according to the illustrative embodiment 3-1 operates.
Figure 19B:
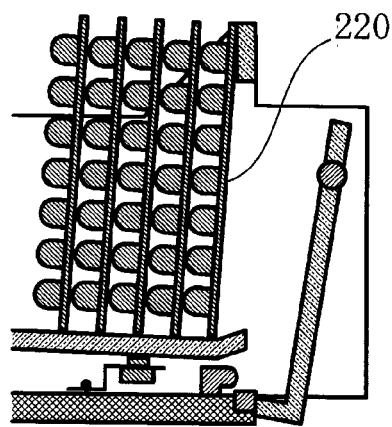
Figure 19C:
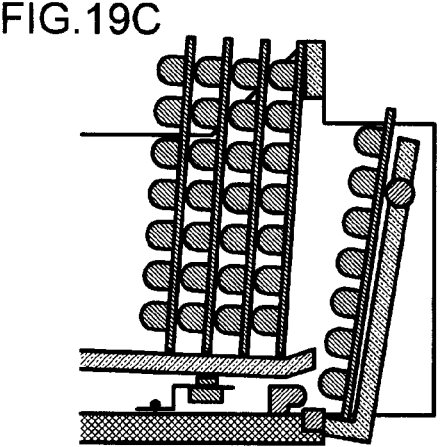
Figure 19D:
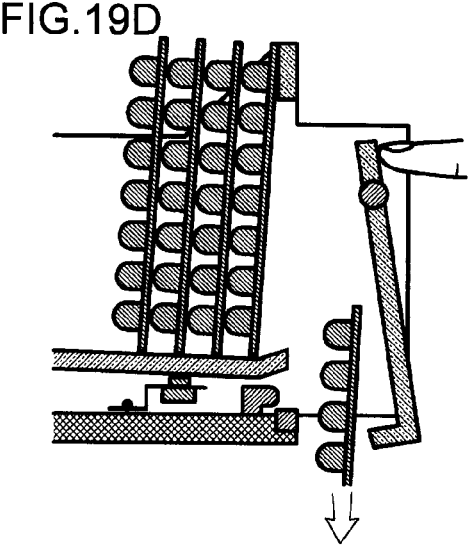
Figure 19E:
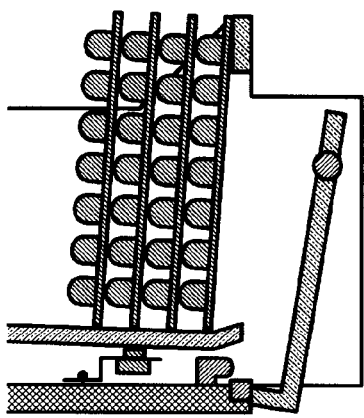
Figure 19F:
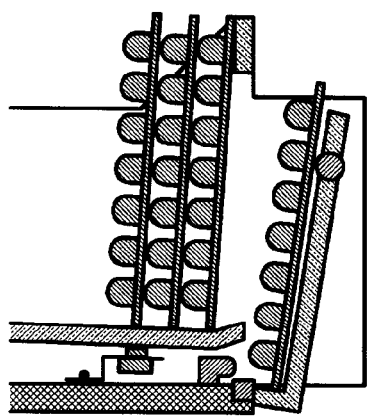

The specific structure of the vibration-assisted ejection cassette according to the illustrative embodiment 3-1 and its operation will be described with reference to the drawings. FIG. 17A is a perspective view showing the appearance of a vibration-assisted ejection cassette 210; FIG. 17B is a sectional left side view of the cassette 210; FIG. 17C is a perspective view showing the appearance of a PTP-packaged drug 220; and FIG. 17D is a sectional left side view of an essential part of the cassette 210 aligning the drugs 220 for storage.

The vibration-assisted ejection cassette 210 comprises outer plates 211, a top frame 212, an inner plate 213, elastic support members 214, a vibrating member 215, an ejection detecting member 216, a control circuit 217, a retention member 218, a pivot shaft 251 and a retention detecting member 252 (see FIGS. 17A and 17B). The cassette 210 is designed to align the PTP-packaged drugs 220 for storage in an upright position in a horizontal queue, and to eject the drugs 220 one by one in the order of arrangement (see FIGS. 17C and 17D).

To describe the cassette in further detail, the outer plates 211 (see FIGS. 17A and 17B) form a box in which is secured a drug accommodating space for aligning the drugs 220 for storage. The outer plates 211 bound at least the sides of the space. In the illustrated example, the back (read face; in the figure, left end face) and the bottom (underside) are also bounded by the outer plates 211. The outer plates 211 may be integrally formed of transparent resin. Alternatively, plates may be formed individually and built to form a box by being adhesively attached to each other. The drug accommodating space inside is substantially cuboid in shape and longitudinally (in the figure, sideways) elongated. Substantially the entirety of the top of the space is open to facilitate replenishment of drugs. The front 212a (in the figure, right end face) is wide open to facilitate ejection of drugs. The width of the open front 212a is greater than the width of the drug 220. For example, the open front 212a has a width of 10-100 mm. The height of the open front 212a is slightly less than the length of the drug 220. For example, the open front 212a has a height of 100-200 mm.

The top frame 212 is provided above the open front 212a of the drug accommodating space defined by the outer plates 211 and is a horizontal-bridging member extending horizontally (see FIGS. 17A and 17B). The top frame 212 operates to interfere with the top end of the drug 220 at the head of the queue to prevent the drug from falling forward (see FIG. 17D).

The inner plate 213 (see FIGS. 17A, 17B and 17D) carries the drug 220 and advances the same when vibrated. The inner plate 213 comprises a descending slope 213a and an ascending slope 213b in order to stabilize the advance, the descending slope 213a occupying the majority of the plate 213 and the ascending slope 213b occupying a small portion of the plate 213 toward the front end thereof. For example, the ascending slope 213b has a length of several mm longitudinally (in the figure, sideways), and the inclination to the horizon is approximately 15°-30°. The descending slope 213a has a length of 10-1000 mm longitudinally, and the inclination to the horizon is approximately 5°-10°. Typically, the inner plate 213 has a width of 10-100 mm.

The inner plate 213 in the stated condition of inclination (see FIG. 17B) is movably inserted to rest on the interior bottom of the drug accommodating space. The plate 213 is connected to the bottom plate of the outer plates 211 via the multiple (in the figure, two) elastic support members 214 in order to maintain the inclined condition. The elastic support member 214 is implemented by, for example, a thin metal plate or a piano wire. The member 214 is easily elastically deformable to support the inner plate 213 vibratably.

The vibrating member 215 (see FIGS. 17B and 17D) is implemented by an inexpensive, mass-produced vibration motor with an eccentric rotor built in, for example, a cell phone. The member 215 is provided closer to the inner plate 213 than the elastic support member 214 or provided on the underside of the inner plate 213 so as to vibrate the inner plate 213.

The retention member 218 (see FIGS. 17A, 17B and 17D) is provided in front of the open front 212a of the drug accommodating space defined by the outer plates 211. The retention member 218 is designed to catch and retain the accommodated drug 220 at the head of the queue ejected from the open front 212a. For this purpose, the retention member 218 is implemented by, for example, a transparent resin plate slightly bent at the lower end thereof. The retention member 218 is a movable member and is pivotally supported by a horizontally extending (in the figure, in a direction perpendicular to the paper) pivot shaft 251. The pivot shaft 251 is supported in horizontal position by the sides etc. of the outer plates 211 extended forward. The pivotal shaft 251 is connected to the retention member 218 toward the top end of the retention member 218. The retention member 218 may pivotally move together with the pivot shaft 251 or independently thereof. Absent an external force exerted thereon, the retention member is biased by a spring or a weight (not shown) so that the lower end thereof comes into contact with the front end of the bottom plate of the outer plates 211.

In this state, the main part and top end of the retention member 218 are tilted forward. The length of the retention member 218 is slightly less than the length of the drug 220 so that the top end of the drug 220 retained is projected outside, allowing the drug 220 to be grasped easily (see FIG. 17D). The distance between the lower end of the retention member 218 and the lower end of the top frame 212 is greater than the length of the drug 220 so that the drug 220 thus inclined is allowed to pass through the open front 212a and to fall. Further, the distance between the front end of the inner plate 213 and the opposite face of the retention member 218 is slightly greater than the thickness of the drug 220 so as to properly limit the number of drugs 220 retained in the retention member 218 to one.

The ejection detecting member 216 (see FIGS. 17B and 17D) is implemented by, for example, a reflective photosensor. In the illustrated example, the member 216 is provided on the bottom plate of the outer plates 211 and below the inner plate 213 so as to output a signal which turns on and off according to whether the drug 220 is located in the retention member 218, allowing detection of reflected light, or the drug 220 is not located in the retention member 218, not allowing detection of reflected light.

The retention detecting member 252 (see FIGS. 17B and 17D) is for detecting whether the retention member 218 is positioned to retain a drug or to discharge one. The retention detecting member 252 may be a non-contact photosensor similar to the ejection detecting member 216. Alternatively, the retention detecting member 252 may be implemented by an inexpensive contact push switch. In any case, the member 252 is provided in a portion of the bottom plate of the outer plates 211 coming into contact with the retention member 218 or in the neighborhood thereof. When in contact, the member 252 outputs a detection signal indicating that the retention member 218 is positioned to retain a drug. When the retention member 218 is detached from the outer plates 211, the member 252 outputs a signal indicating that the retention member 218 is positioned to discharge a drug.

The control circuit 217 is implemented by a one-chip microcomputer and/or a logic circuit. The control circuit 217 receives a detection signal from the ejection detecting member 216 and a detection signal from the retention detecting member 252 so as to control the operation of the vibrating member 215. For operation, the circuit 217 is supplied with power from a power supply circuit or a battery (not shown). The control circuit 217 operates to activate the vibrating member 215 only when the retention member 218 is detected as being in a position to retain a drug and when the ejection detecting member 216 does not detect a drug. In other words, the inner plate 213 is not vibrated when the retention member 218 is positioned to discharge a drug. Even when the retention member 218 is positioned to retain a drug, the inner plate 213 is not vibrated if the ejection detecting member 216 detects a drug. The inner plate 213 is vibrated only when the retention member 218 is detected as being in a position to retain a drug and when the ejection detecting member 216 does not detect a drug.

The mode of using the vibration-assisted ejection cassette 210 according to the illustrative embodiment 3-1 and its operation will be described with reference to the drawings. FIGS. 18A-18F are sectional left side views of an essential part of the cassette. FIGS. 19A-19F are also sectional left side views of an essential part of the cassette. FIG. 17C is a perspective view showing the appearance of the PTP-packaged drug 220.

A typical shape of the PTP-packaged drug 220 (see FIG. 17C) is a rectangular sheet which is flat on one side and which is provided with an array of pockets for accommodating drugs on the other side. Typically, the width of the PTP-packaged drug 220 is 10-100 mm, the length thereof is 100-200 mm, and the thickness thereof is several mm. The weight of the PTP-packaged drug 220 is typically 10-200 mg.

The mode of use, in which the PTP-packaged drug 220 is taken out by picking it up one by one, will be described with reference to FIGS. 18A-18F and then the mode of use, in which the PTP-packaged drug 220 is dropped and discharged from the cassette 210 one by one, will be described with reference to FIGS. 19A-19F.

The drugs 220 are manually replenished from above the open top of the empty cassette 210 (see FIG. 18A). While the replenishment is proceeding, the cassette 210 is prevented from being activated, i.e., the vibration of the vibrating member 215 is prevented. The drugs 220 are serially arranged in the longitudinal direction, ensuring that the head and tail of the drugs 220 are identically oriented in the drug accommodating space. More specifically, the drugs 220 are aligned for storage in the drug accommodating space in the outer plates 211, starting at the head of the queue. In this process, each drug 220 is provided above the vibrating member 215 in an upright position inside the drug accommodating space. The drug at the head of the queue is accommodated such that the top end leans against the top frame 212 to prevent the drug from falling down. The other drugs 220 in the queue are made to lean against each other. The drugs 220 may lean at different angles or may be spaced apart from each other, forming different gaps, so long as the drugs 220 are prevented from falling down.

Once the drugs 220 are replenished, the cassette 210 is activated. More specifically, vibration control of the vibrating member 215 in accordance with detection by the ejection detecting member 216 and the retention detecting member 252 is initiated by, for example, feeding power to the cassette control circuit 217. Initially, the retention member 218 is positioned to retain a drug but does not retain a drug 220 (see FIG. 18B) so that the inner plate 213 is vibrated. This reduces friction and the thrust derived from gravitation force commensurate with the slope exceeds the friction. The drug 220 above the descending slope 213a of the inner plate 213 advances little by little. The drug 220 at the head of the queue advances to a boundary between the descending slope 213a and the ascending slope 213b and the drugs 220 that follow are moved closer to each other so that the accommodated drugs 220 are neatly aligned inside the drug accommodating space.

In this condition, vibration still continues and the drugs 220 are thrust forward. The drug 220 at the head of the queue continues to be prevented from advancing since the top end thereof is caught by the top frame 212, but the lower end thereof gets over the ascending slope 213b and leaves the inner plate 213 so as to enter the space in front of the open front 212a (see FIG. 18C). The drug 220 at the head is detached from the outer plates 211 and the top frame 212 under its own weight, caught by the retention member 218 and retained there (see FIG. 18D). Concurrently, the top end of the drug 220, next in line and located on the inner plate 213 without the ejected drug 220, leans against the top frame 212, and the lower end of the drug 220 advances to the boundary between the descending slope 213a and the ascending slope 213b. The drug 220 transferred to the retention member 218 enters a range of detection by the ejection detecting member 216. The detection output of the ejection detecting member 216 changes to indicate that the drug is retained. In response to this, the control circuit 217 stops activating the vibrating member 215 so that the inner plate 213 comes to rest and is maintained in the current condition.

The drug 220 retained in the retention member 218 is removed from the queue, and the top end is exposed to allow easy grasping. By grasping and lifting the top end, one PTP-packaged drug 220 can be easily taken out (see FIG. 18E). As the drug is taken out, no drugs 220 remain retained on the retention member 218. The cassette is now in a condition that occurred when the drugs are replenished except that the number of accommodated drugs 220 is reduced by one. Vibration of the inner plate 213 is resumed so that the next drug 220 in line is ejected out of the open front 212a of the outer plates 211 and then retained in the retention member 218 (see FIG. 18F). The operation described above is repeated each time the drug 220 is picked up from the retention member 218. Thus, the vibration-assisted ejection cassette 210 enables easily and properly grasping and taking out the PTP-packaged drug 220 one by one.

A description will now be given of a case where the PTP-packaged drugs 220 are not taken out by picking them up but are dropped and discharged from the cassette 210 one by one. Also in this case, as the drugs 220 are aligned for storage (see FIG. 19B) in the empty cassette 210 (see FIG. 19A), the inner plate 213 is vibrated because the retention member 218 is positioned to retain a drug but the drug 220 is not there yet. As the accommodated drug 220 at the head of the queue is ejected from its position on the inner plate 213 and transferred to the retention member 218 (see FIG. 19C), vibration of the inner plate 213 is halted and one drug 220 is retained in the retention member 218. The process so far is the same as the one described above. The drug 220 may be taken out by picking it up. For easier retrieval, the drug is dropped and discharged.

That is, the top end of the retention member 218 is pressed lightly by, for example, a finger. The retention member 218 is then pivotally moved and the lower end thereof is detached from the outer plates 211, thereby positioning the retention member 218 to discharge the drug. This causes the drug 220 retained in the retention member 218 to be dropped and discharged from a gap created between the lower end of the retention member 218 and the outer plates 211. Thus, the desired drug 220 can easily be taken out from below. As the finger is removed from the retention member 218 afterward, the retention member 218 is pivotally moved in a reverse direction and is positioned again to retain a drug (see FIG. 19E).

The inner plate 213 is vibrated as previously except that the number of accommodated drugs 220 is reduced by one. The next drug 220 in line is ejected out of the open front 212a of the outer plates 211 and then retained in the retention member 218 (see FIG. 19F). The operation described above is repeated each time the drug 220 is picked up or dropped and discharged from the retention member 218. Thus, the cassette enables the user to take out the PTP-packaged drug 220 one by one easily and properly. In this mode of use, the drug 220 is dropped and discharged efficiently by the simple action of lightly pressing the top end of the retention member 218. Thus, the manual operation of taking out drugs is more facilitated in a manner suitable for automated retrieval.

Illustrative Embodiment 3-2

Figure 20A:
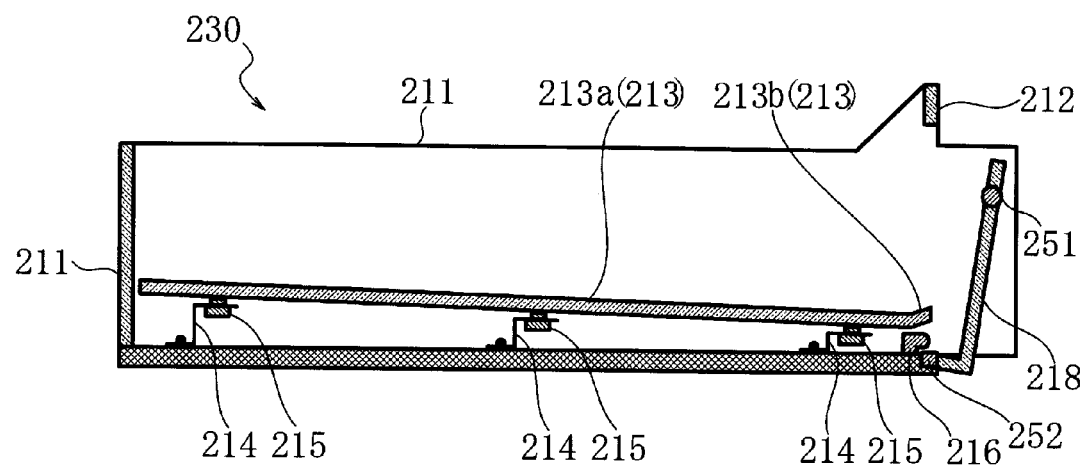
FIGS. 20A-20B show the structure of the vibration-assisted ejection cassette according to an illustrative embodiment 3-2 of the third embodiment.
Figure 21A:
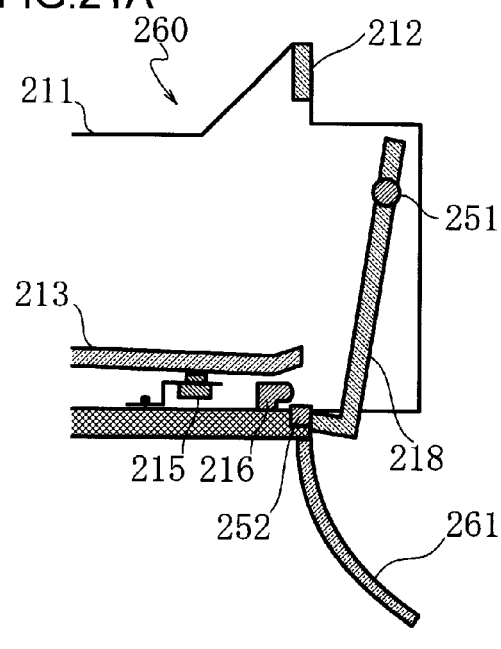
FIGS. 21A-21B show the structure of a vibration-assisted ejection cassette according to an illustrative embodiment 3-3 of the third embodiment.
Figure 21B:
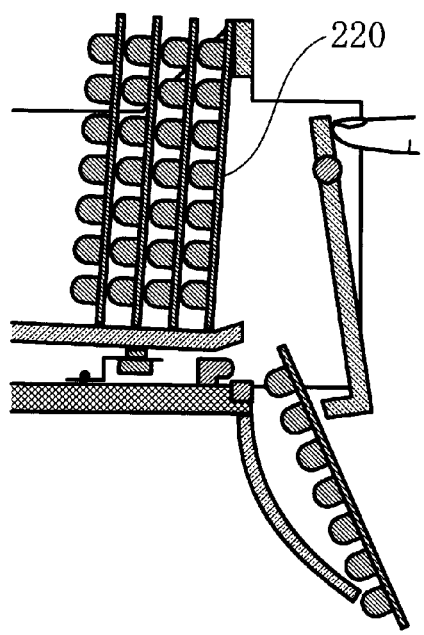

A vibration-assisted ejection cassette 230 according to the illustrative embodiment 3-2, shown in the longitudinal sectional left side view of FIG. 20A, differs from the cassette 210 according to the illustrative embodiment 3-1 in that multiple (in the illustrated example, three) vibrating members 215 are provided.

Figure 20B:
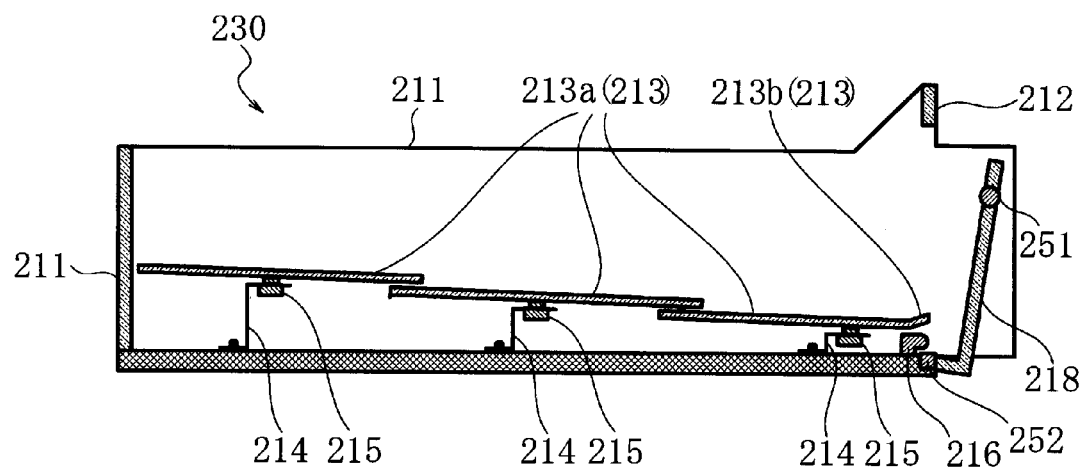

The vibration-assisted ejection cassette 230 according to the illustrative embodiment 3-2 shown in the longitudinal sectional left side view of FIG. 20B is configured such that the descending slope 213a of the inner plate 213 is segmented (in the illustrated example, into three segments) so as to correspond to the vibrating members 215.

The single vibrating member 215 may be replaced by a large one to enhance capability to vibrate. In this case, however, increase in cost is minimized by using a desired number of inexpensive mass-produced products. Another advantage is that, by distributing multiple vibrating members 215 in the longitudinal direction of the inner plate 213, the entire inner plate 213 is vibrated uniformly.

Illustrative Embodiment 3-3

A vibration-assisted ejection cassette 260 according to the illustrative embodiment 3-3, an essential part of which is shown in the longitudinal sectional left side view of FIGS. 21A and 21B, differs from the cassette 210 according to the illustrative embodiment 3-1 in that a descent guidance member 261 is provided below the retention member 218.

The descent guidance member 261 (see FIG. 21A) is formed as a gently curved plate. The top end of the member 261 is connected and secured to the underside of the bottom plate constituting the outer plates 211 toward the front of the bottom plate. The concave face of the member 261 faces in a forward and obliquely upward direction. The lower end of the member 261 extends forward to a space below the cassette.

In this embodiment (see FIG. 21B), the drug 220 is dropped and discharged from the retention member 218 and then guided toward a user by sliding on the concave face of the descent guidance member 261.

Illustrative Embodiment 3-4

A drug dispensing apparatus 270 according to the illustrative embodiment 3-4 shown in the front view and the left side view of FIGS. 22A and 22B is configured such that an array of the vibration-assisted ejection cassettes 260 described above is provided inside a housing 271. In the illustrated example, nine cassettes 260 are arranged in a 3×3 matrix.

In this drug dispensing apparatus 270, the drug 220, dropped and discharged from the retention member 218 of the cassette 260, is guided toward a user by the descent guidance member 261 while descending the slope.

Thus, the drug 220 dropped and discharged from the cassette 260 above successfully drops without being entangled by the retention member 218 of the cassette 260 below.

The desired drug 220 can be dispensed and collected easily and efficiently by, for example, placing a receiving box 272 of an appropriate size in front of the housing 271.

Illustrative Embodiment 3-5

A drug dispensing apparatus 280 according to the illustrative embodiment 3-5 shown in the front view of FIG. 23 is configured such that the drug dispensing apparatus 270 is upgraded to provide automatic dispensing capabilities. The number of cassettes 260 is increased to 36 to form a 6×6 matrix. Dispensing and collecting mechanism 282-286 for X-Y translation are also introduced.

The dispensing and collecting mechanisms 282-286 are for automatic retrieval and automatic collection of drugs by selecting a desired one of a large number of cassettes 260 in an array and then activating the retention member 218 of the selected cassette. For this purpose, the Y-shaft 282 guides the perpendicular Y-direction translation, and the X-shaft 283 guides the horizontal X-direction translation. The X-Y translation unit 284 is supported by the shafts so as to be translatable. An electric motor and a drive circuit (not shown) drive the translation unit 284 to a desired location. An actuator 285 is provided on top of the translation unit 284 and includes an advancing and receding member for pressing the top end of the retention member 218. A collecting box 286 is provided below the X-Y translation unit 84 and accepts the drug 220 that comes sliding down the descent guidance member 261.

In this case, the control 217 is upgraded by, for example, a programmable microprocessor so as to be adapted to download prescription data from a prescription input device or a prescription order entry system (not shown). By causing the X-Y translation unit 284 to make the rounds of cassettes 260 accommodating the desired drugs 220 for storage in accordance with the prescription data, and causing the actuator 285 to pivotally move the retention member 218 accordingly, the necessary drugs 220 are collected one after another in the collecting box 286.

The dispensing and collecting mechanism for automation is not necessarily based on X-Y translation. For example, a combination of vertical transportation and horizontal transportation may be used as in the dispensing/transporting mechanism of patent document No. 1.

The cassettes 260 may be cylindrically arranged as in the storage of patent document No. 2 instead of being rectangularly arranged.

[Other Points of Note]

In the above-described illustrative embodiments, it is ensured that the head and tail of the PTP-packaged drugs are identically oriented when the drugs are aligned in the drug accommodating space of the cassette. However, this is not an essential requirement. The orientation of the head and tail of the PTP-packaged drugs may only be given secondary consideration so long as the aligned condition is not impaired.

In the above-described illustrative embodiments, the drugs are taken out one by one from the cassette. Alternatively, multiple (e.g. two or three) drugs may be taken out at a time. More specifically, this can easily be achieved by extending the distance between the front end of the inner plate and the opposite face of the retention member.

Fourth Embodiment

A fourth embodiment of the present invention relates to a PTP dispensing apparatus which stores various PTP-packaged or equivalently packaged drugs so as to take out necessary drugs in accordance with prescription etc. More particularly, the embodiment relates to a drug dispensing apparatus which holds a large number of vibration-assisted ejection cassettes for aligning drugs for storage and sequentially ejecting the drugs. In the vibration-assisted ejection cassette, vibration is used to advance and eject drugs.

The term "PTP-packaged or equivalently packaged drugs" refers to drugs accommodated in a thin paper case or a plastic case and, more particularly, to those that can be aligned for storage in an upright position, such as the PTP-packaged drug.

PTP-packaged drugs, even as they are individually packaged, are thinly packaged and irregular in cross section. As such, it is not necessarily easy even for an experienced operator to manually and properly grasp the one at the head of the queue of drugs aligned for storage. Attempts for automatization by a mechanism for grasping or absorbing drugs would not help since it would inevitably result in a complex mechanism, and the ejection mechanism can be simplified only in a limited way. The same thing is true of a biasing means for advancing accommodated drugs. For elimination thereof, there would be required, for example, a mechanism for translating the absorbing mechanism instead. Since a PTP dispensing apparatus is provided with a large number of drug cassettes, even minor simplification of a cassette is of a great help in simplifying the dispensing apparatus as a whole.

In this background, it is desirable to simplify the cassette mechanism by putting the vibration-assisted method, which is used in a powder medicine feeder, to the use of dispensing PTP-packaged drugs and, in this process, eliminating the need for a weighting member for measuring weight or a biasing member for advancing drugs. That is, a technical task to be achieved is to turn a drug cassette for PTP-packaged drugs into a vibration-assisted ejection cassette capable of maintaining PTP-packaged drugs in alignment with each other, advancing the drugs while maintaining the drugs in alignment and ejecting them one by one. A further technical task in a PTP dispensing apparatus holding a large number of vibration-assisted ejection cassettes is to implement the mechanism necessary for automatization of the operation of discharging and ejecting drugs from the cassettes in a simplified and inexpensive manner.

A first PTP dispensing apparatus according to the fourth embodiment comprises: a large number of cassettes which align PTP-packaged or equivalently packaged drugs for storage so that the drugs are sequentially ejectable; a support which accommodates and holds the cassettes; a descent guidance member which guide the drugs discharged (finally ejected) from the cassettes downward; and a collecting mechanism which collect the drugs, wherein each of the cassettes comprises: outer plates which accommodate drugs; a top frame which is provided above an open front and which prevents accommodated drugs from being falling forward; an inner plate which carries the accommodated drugs and advances the drugs when vibrated; a vibrating member which vibrates the inner plate; and a retention member which is provided in front of the open front and which retains the accommodated drug ejected (ejected in preparation for discharge) from the open front, wherein an activating mechanism, which acts on the retention member so as to discharge (finally eject) a retained drug toward the descent guidance member, is provided for each cassette so as to detect whether or not a drug is retained in the retention member and activate the vibrating member when a drug is not retained and stop activating the vibrating member when a drug is retained.

A second PTP dispensing apparatus according to the fourth embodiment is a modification to the first PTP dispensing apparatus mentioned above, wherein in the top frame are formed: a first contact surface interfering with the top end of the drug at the head of a queue on the inner plate; and a second contact surface located in front of and below the first contact surface and interfering with the top end of the drug retained on the retention member, and wherein the activating mechanism axially rotates the retention member so that the retention member assumes one of two positions, i.e., a position to retain a drug the accommodated drug ejected (ejected in preparation for discharge) from the open front, and a position to discharge (finally eject) the retained drug toward the descent guidance member.

In the first PTP dispensing apparatus, a large number of drugs can be aligned for storage without falling down, by storing PTP-packaged drugs etc. in the cassettes so that the drugs are accommodated in the drug accommodating space bounded by the outer plates, by arranging the drugs above the vibrating member in an upright position, and by allowing the accommodated drug at the head of the queue to lean against the top frame. When the inner plate is vibrated by the vibrating member, the accommodated drugs advance. Since the drug at the head of the queue is prevented from advancing by the top frame, the accommodated drugs are closely arranged. When the lower end of the drug at the head is thrust forward so as to be removed from the inner plate, the drug at the head is let fall and ejected from the open front. In association with this, the top end of the drug that replaces the ejected drug and brought to a position at the head is slightly inclined forward and caught by the top frame. When the lower end of the replacing drug is thrust forward so as to be removed from the inner plate, the drug is similarly let fall and ejected.

In this way, PTP-packaged drugs etc. are aligned for storage and ejected one by one by vibration. The cassette is implemented such that the top frame is provided above the open front so as to prevent the accommodated drug from falling forward, and the accommodated drugs are advanced as a result of vibrating the inner plate carrying the accommodated drugs and are let fall and ejected one by one from the open front. Thus, vibration operates to maintain the PTP-packaged drugs in alignment, advance the drugs while maintaining alignment thereof and sequentially eject the drugs. Since there is no need to provide a weighing member or a biasing member, the mechanism is simplified. Thus, the first vibration-assisted ejection cassette is configured for simple vibration-assisted ejection, in which PTP-packaged drugs etc. are aligned for storage and are ejected sequentially and properly.

According to this vibration-assisted ejection cassette, the drug ejected from the open front is retained in the retention member in front. When the drug is retained, ejection of the next drug is prevented. When the drug is no longer retained in the retention member, the next drug is ejected by vibration and retained in the retention member. By ensuring that one of the drugs is detached from the queue and retained in the retention member, the drugs can be taken out one by one far more easily and reliably than when the drug is directly taken out from the head of the queue.

By arranging, in the support, simple vibration-assisted ejection cassettes capable of aligning PTP-packaged drugs etc. for storage and ejecting the drugs one by one properly, by providing an activating mechanism which acts on the retention member of the cassette so as to discharge and finally eject the retained drug thereby dispensing a necessary drug automatically, and by ensuring that the drugs ejected from the cassettes are collected by using free fall, a simple and inexpensive drug dispensing apparatus suitable for storing various PTP-packaged drugs and automatically dispensing a desired drug results.

In the second PTP dispensing apparatus mentioned above, the retention member needs only to support the lower end of the retained drug because the first and second contact surfaces are formed on the top frame so that the frame is assigned the task of preventing the retained drug from falling forward as well as preventing the drugs aligned for storage from falling forward. This allows the retention member to be provided in a space in front of the open front and only in a space therebelow. For this reason, the retention member can be made compact while being capable of axial rotation. The activating mechanism, which acts on the retention member so as to cause it to assume two positions, may be of a simple structure.

Suitable embodiments for implementing the PTP dispensing apparatus according to the fourth embodiment and an array of the vibration-assisted ejection cassettes provided in the apparatus will be described.

A third PTP dispensing apparatus according to the fourth embodiment is a modification to the first or second PTP dispensing apparatus mentioned above, wherein each cassette is detachable to facilitate the job of replenishing drugs and replacing cassettes. For simplification of cassettes and prevention of failure, the apparatus is configured as follows. Specifically, the apparatus meets one of two requirements, one of the requirements being that the activating mechanism is provided in the support and not in the cassette, the other being that a vibration control circuit, for activating the vibrating member when a drug is not retained and stopping activating the vibrating member when a drug is retained, is provided in the support and not in the cassette.

Thus, a fourth PTP dispensing apparatus according to the fourth embodiment is a modification to any one of the first through third PTP dispensing apparatuses mentioned above, wherein each cassette is configured as follows so that PTP-packaged drugs etc. are easily aligned for storage when replenishing the drugs and sequentially ejected in a reliable and stable manner.

That is, the outer plates bound at least the sides of a drug accommodating space, the top of the space is open so as to facilitate replenishment of a drug, the front of the drug accommodating space is open so as to facilitate ejection of a drug, the inner plate is movably inserted to rest on the interior bottom of the drug accommodating space so as to be vibratably supported, the front end portion of the top face of the inner plate being formed as an ascending slope and the remaining portion being formed as a descending slope.

In this case, not only the front of the drug accommodating space bounded by the outer plates is open for drug ejection but also the top of the space is open for drug replenishment. Therefore, drugs can be aligned for storage easily at the time of replenishment.

The inner plate is movably inserted to rest on the interior bottom of the drug accommodating space so as to be vibratable while carrying an accommodated drug. A major portion of the top face of the inner plate is formed as a descending slope so that the inner plate when vibrated advances the accommodated drug, and the front end portion of the top face of the inner plate is formed as an ascending slope so that the drug is prevented from being accelerated unnecessarily and advanced substantially at a regular speed. Accordingly, vibration of the inner plate properly operates to maintain the PTP-packaged drugs in alignment, advance the drugs while maintaining alignment thereof and sequentially eject the drugs without a weighing member or a biasing member.

Specific embodiments of the PTP dispensing apparatus according to the fourth embodiment will be described using illustrative embodiments 4-1 through 4-2.

Figure 29:
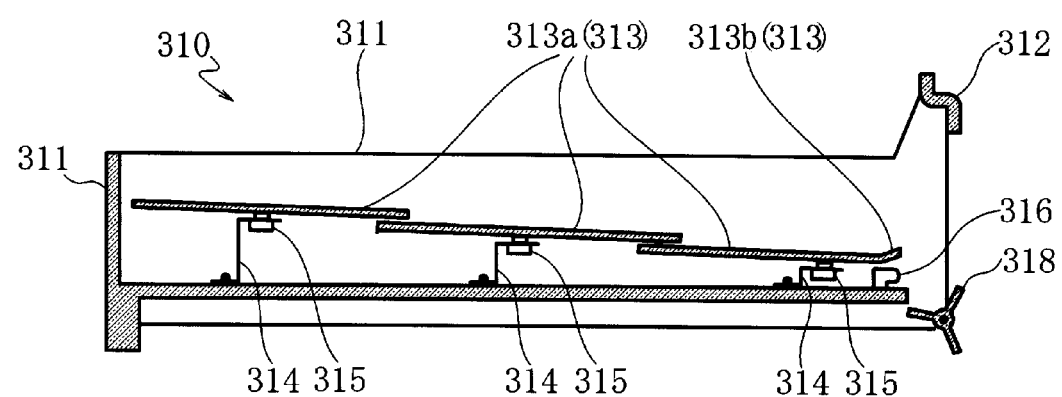
FIG. 29 is a sectional left side view of a cassette according to an illustrative embodiment 4-2 of the fourth embodiment.

The illustrative embodiment 4-1 shown in FIGS. 24A-28B is an embodiment of the first through fourth PTP dispensing apparatus mentioned above. The illustrative embodiment 4-2 shown in FIG. 29 is a variation to the illustrative embodiment 4-1.

In the illustration, fasteners such as bolts, connectors such as hinges, detailed electric and electronic circuits are omitted for brevity, highlighting those elements necessary to explain the embodiment and related elements.

Illustrative Embodiment 4-1

Figures 24A, 24B, 24C:
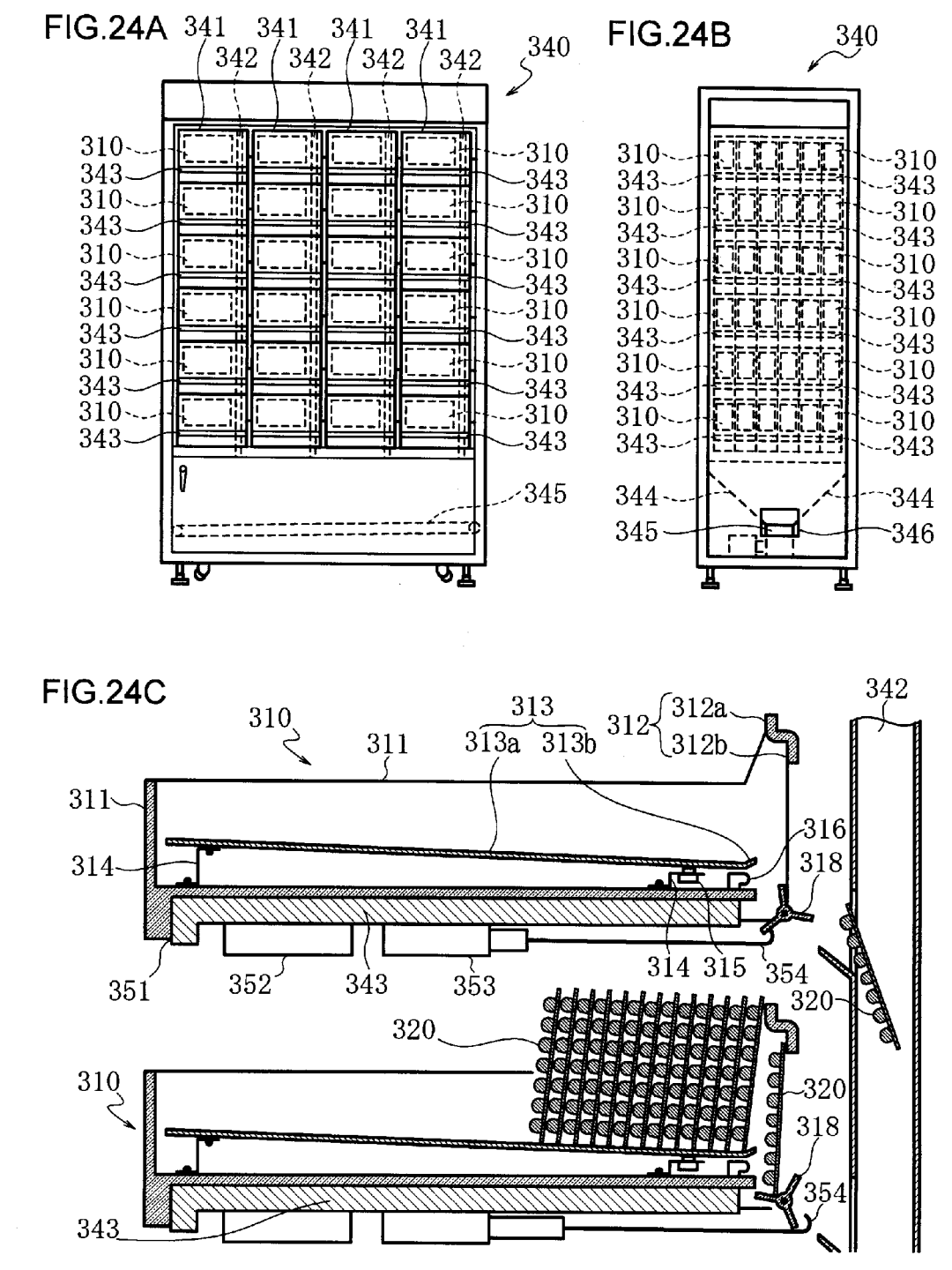
Figure 25:
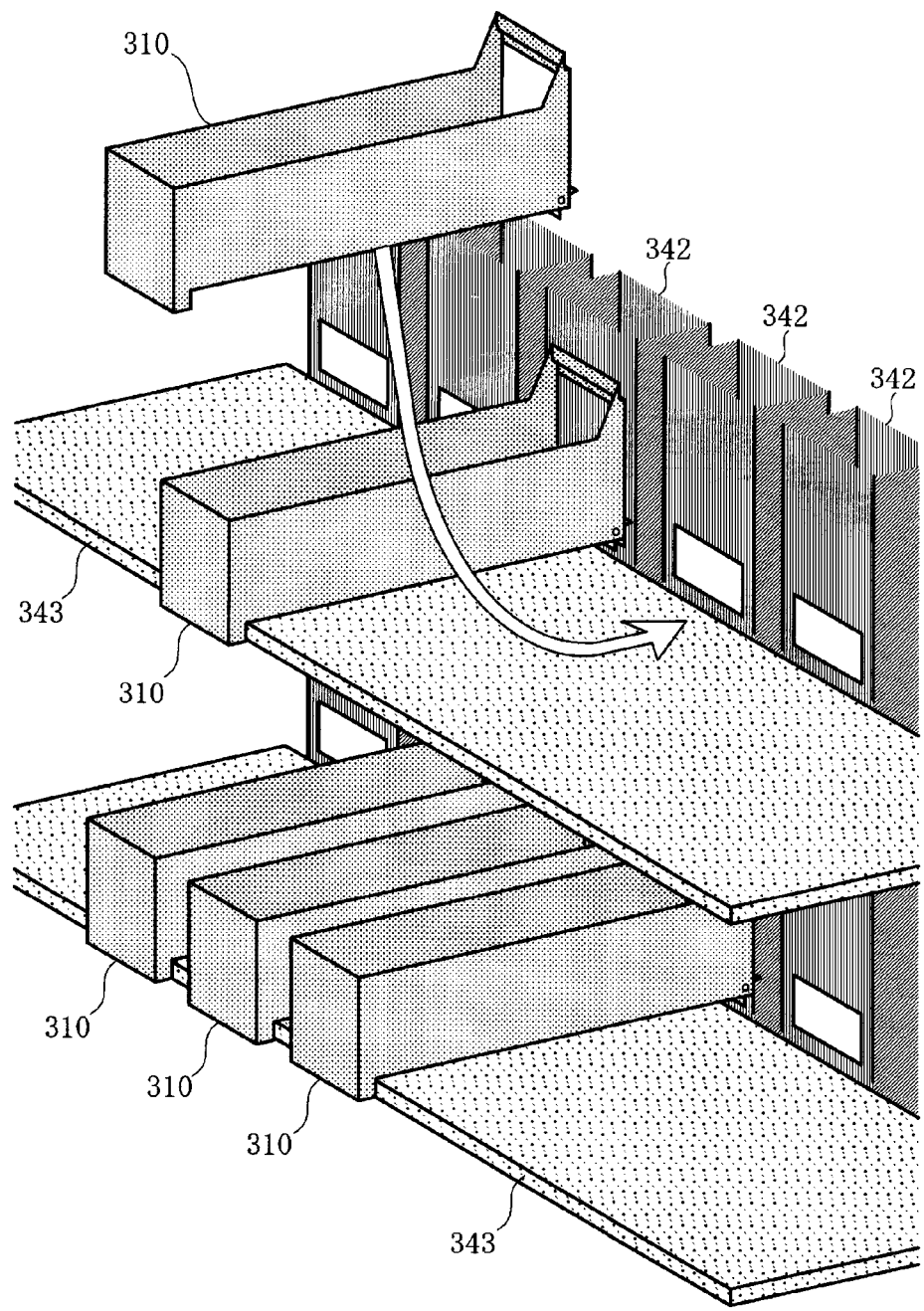
FIG. 25 is a perspective view of an essential part including several cassettes according to the illustrative embodiment 4-1.

The specific structure of the illustrative embodiment 4-1 of the PTP dispensing apparatus according to the fourth embodiment will be described with reference to the associated drawings. FIGS. 24A-24C show the structure of a PTP dispensing apparatus 340. FIG. 24A is a front view showing the whole apparatus; FIG. 24B is a right side view; and FIG. 24C is a sectional front view showing an essential part including two cassettes 310 (longitudinal sectional left side views of the cassettes). FIG. 25 is a perspective view of an essential part including several cassettes 310.

The PTP dispensing apparatus 340 (see FIGS. 24A and 24B) generally comprises three tiers and is provided with: electric equipment on the top tier accommodating a main controller and a power supply unit (not shown); a drug storage on the middle tier accommodating a large number of cassettes 310; and a collecting and transporting unit on the bottom tier accommodating a collecting mechanism 344 for collecting drugs 320 ejected from the cassettes 310 and a transporting mechanism 345 for transporting the drugs 320 thus collected to a dispensing outlet 346.

The main controller is implemented by, for example, a microprocessor system and is connected to a prescription input apparatus or a prescription order entry system (not shown). The main controller is adapted to control the selection of the drug 320 and the dispensing operation in accordance with the prescription thus obtained or information on drug preparation instruction derived from the prescription.

The collecting mechanism 344 is implemented by a tilted plate or a hopper member wide open at the top part and narrowed toward the lower part. The transporting mechanism 345 is implemented by a belt conveyor etc. and lies below the collecting mechanism 344. The transporting mechanism 345, like the cassette 310 described below, is operated in accordance with automatic control by the main controller.

A total of 144 cassettes are provided in the drug storage of the PTP dispensing apparatus 340 with six, four and six cassettes arranged in vertical, horizontal and depth directions, respectively. The drug storage is divided into four parts horizontally and the cassettes are fitted to respective drawer racks 341. The drawer racks 341 are fitted to the housing via appropriate drawer rails etc. Each of the drawer racks 341 is adapted to be drawn forward (in FIG. 24A, in a direction facing a viewer of the figure; and in FIG. 24B, leftward) for attachment and detachment of a total of 36 cassettes 310, 6 arranged vertically and 6 in the depth direction. Each drawer rack 341 is provided with six tiers of rack-like support members 343. Each support member 343 is adapted to accommodate 6 cassettes 310 arranged from front to back. Each drawer rack 341 has a built-in, vertically extending descent guidance duct 342 to guide the drug 320 ejected from the cassette 310 downward.

The portion of the support member 343 (see FIG. 24C and FIG. 25) where the cassette 310 is fitted is provided with a connector 351, a control circuit 352, a solenoid 353 and a hook member 354 to enable control by the main controller when the cassette 310 is fitted. An appropriate cassette engaging means and a means for releasing the cassette (not shown) are also provided to attach or detach the drug 320 as desired.

The cassette 310 (see FIG. 24C) is a vibration-assisted ejection cassette comprising outer plates 311, a top frame 312, an inner plate 313, elastic support members 314, a vibrating member 315, an ejection detecting member 316 and a retention member 318. The cassette 310 is designed to align the PTP-packaged drugs 320 for storage in an upright position in a horizontal queue, and to eject the drugs 320 one by one in the order of arrangement.

To describe the cassette in further detail, the outer plates 311 form a box in which is secured a drug accommodating space for aligning the drugs 320 for storage. The outer plates 311 bound at least the sides of the space. In the illustrated example, the back (read face; in the figure, left end face) and the bottom (underside) are also bounded by the outer plates 311. The outer plates 311 may be integrally formed of transparent resin. Alternatively, plates may be formed individually and built to form a box by being adhesively attached to each other. The drug accommodating space inside is substantially cuboid in shape and longitudinally (in the figure, sideways) elongated. Substantially the entirety of the top of the space is open to facilitate replenishment of drugs. The front of the cassette (in the figure, right end face) is wide open to facilitate ejection of drugs. The width of the open front is greater than the width of the drug 320. For example, the open front has a width of 10-100 mm. The height of the open front is slightly less than the length of the drug 320. For example, the open front has a height of 100-200 mm.

The top frame 312 is provided above the open front of the drug accommodating space defined by the outer plates 311 and is a horizontal-bridging member extending horizontally. The top frame 312 operates to interfere with the top end of the drug 320 at the head of the queue to prevent the drug from falling forward. A first contact surface 312a and a second contact surface 312b are formed on the rear surface (in the figure, left surface) of the top frame 312. The first contact surface 312a interferes with the top end of the drug at the head of the queue of drugs aligned for storage on the inner plate 313. The second contact surface 312b is located in front of and below (in the figure, to the right of and diagonally below) the surface 312a and interferes with the top end of the drug retained on the retention member 318. The step between the contact surfaces 312a and 312b is slightly larger than the thickness of the drug 320. For example, the step is about 1 mm-20 mm.

The inner plate 313 carries the drug 320 and advances the same when vibrated. The inner plate 313 comprises a descending slope 313a and an ascending slope 313b in order to stabilize the advance, the descending slope 313a occupying the majority of the plate 313 and the ascending slope 313b occupying a small portion of the plate 313 toward the front end thereof. For example, the ascending slope 313b has a length of several mm in the longitudinal direction of the cassette (in the figure, sideways) and upward sloping (in the figure, left-to-right upward sloping) at an angle of approximately 15°-30° with respect to the horizon. The descending slope 313a has a length of 10-1000 mm longitudinally and is downward sloping (in the figure, left-to-right downward sloping) at an angle of approximately 5°-10° with respect to the horizon. Typically, the inner plate 313 has a width of 10-100 mm.

The inner plate 313 in the stated condition of inclination is movably inserted to rest on the interior bottom of the drug accommodating space. The plate 313 is connected to the bottom plate of the outer plates 311 via the multiple (in the figure, two) elastic support members 314 in order to maintain the inclined condition. The elastic support member 314 is implemented by, for example, a thin metal plate or a piano wire. The member 314 is easily elastically deformable to support the inner plate 313 vibratably.

The vibrating member 315 is implemented by an inexpensive, mass-produced vibration motor with an eccentric rotor built in, for example, a cell phone. The member 315 is provided closer to the inner plate 313 than the elastic support member 314 or provided on the underside of the inner plate 313 so as to vibrate the inner plate 313.

The retention member 318 is provided in front of and below (in the figure, to the lower right of) the open front of the drug accommodating space defined by the outer plates 311. The retention member 318 is designed to catch and retain the drug 320 at the head of the queue of drugs aligned for storage ejected from the open front. For this purpose, the retention member 318 and the top frame 312 retain a drug in cooperation with each other such that the member 318 supports the lower end of the drug 320, and the second contact surface 312b of the top frame 312 catches the top end of the retained drug. The retention member 318 is secured to the outer plates 311 such that the member lies horizontally and is axially rotatable (in the figure, the rotation shaft lies in a direction perpendicular to the paper). The member 318 is allowed to rotate bidirectionally by a predetermined angle so as to be positioned to retain a drug or discharge one.

When the member 318 assumes a position to retain a drug (see the cassette of the lower diagram of FIG. 24C), a concave part of the member 318 for supporting the lower end of a drug is made to face upward in order to retain an accommodated drug ejected from the open front of the cassette in preparation for discharge. When the member 318 assumes a position to discharge a drug (see the cassette of the upper diagram of FIG. 24C), the concave part of the member 318 is tilted toward the descent guidance duct 342 until the lower end of the drug slides down, in order to discharge the retained drug toward the descent guidance duct 342. Further, the distance between the front end of the inner plate 313 and the opposite face of the retention member 318 is slightly greater than the thickness of the drug 320 so as to properly limit the number of drugs 320 retained in the retention member 318 to one.

The ejection detecting member 316 is implemented by, for example, a reflective photosensor. In the illustrated example, the member 316 is provided on the bottom plate of the outer plates 311 and below the inner plate 313 so as to output a signal which turns on and off according to whether the drug 320 is located in the retention member 318, allowing detection of reflected light, or the drug 320 is not located in the retention member 318, not allowing detection of reflected light.

The control circuit 352 is implemented by a one-chip microcomputer and/or a logic circuit. The control circuit 352 receives a detection signal from the ejection detecting member 316 via the connector 351 so as to control the operation of the vibrating member 315. When the detection result from the ejection detecting member 316 indicates that the drug is not retained, the control circuit 352 activates the vibrating member 315. When the detection result from the ejection detecting member 316 indicates that the drug is retained, the control circuit 352 stops activating the vibrating member 315.

The solenoid 353 and the hook member 354 form an actuator mechanism. One end of the hook member 354 is fitted to the advancing and receding member of the solenoid 353 and the other end of the hook member 354 is bent into a hook and extends below the retention member 318, so as to operate on the retention member 318 and discharge the retained drug toward the descent guidance duct 342. As the solenoid 353 is driven and the advancing and receding member recedes (in the figure, moved leftward) accordingly, the hooked end of the hook member 354 is engaged with the lower part of the retention member 318 so as to axially rotate the retention member 318, bringing the retention member 318 from a position for drug retention to a position for drug discharge. When the solenoid 353 is no longer driven, the advancing and receding member advances (in the figure, moved rightward) due to snapping force of a spring etc. (not shown), bringing the retention member 318 from a position for drug discharge to a position for drug retention and disengaging the retention member 318 from the hook member 354.

Figure 26A:
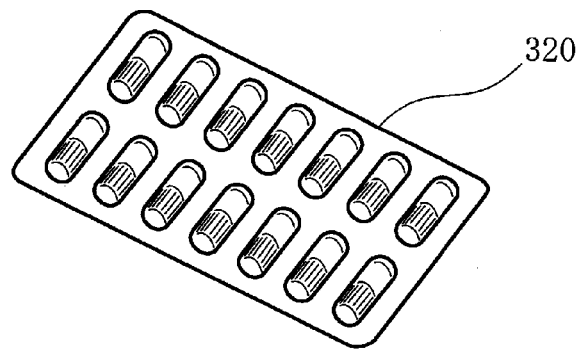
FIG. 26A is a perspective view showing the appearance of a PTP-packaged drug.
Figure 26B:
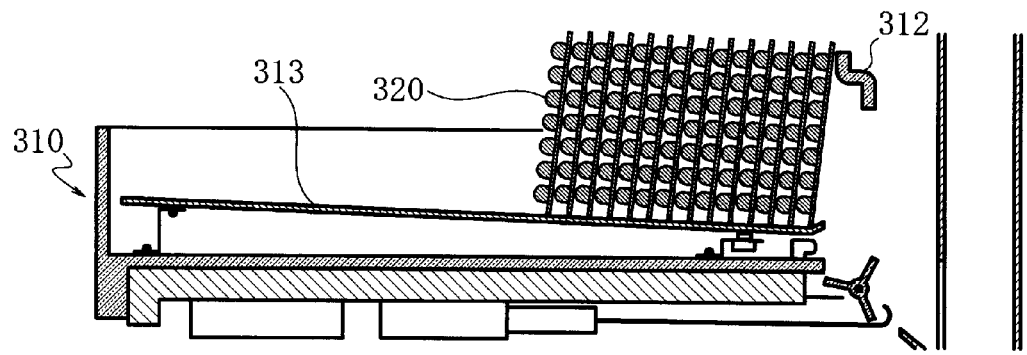
FIGS. 26B-26C are sectional front views of an essential part including one cassette.
Figure 26C:
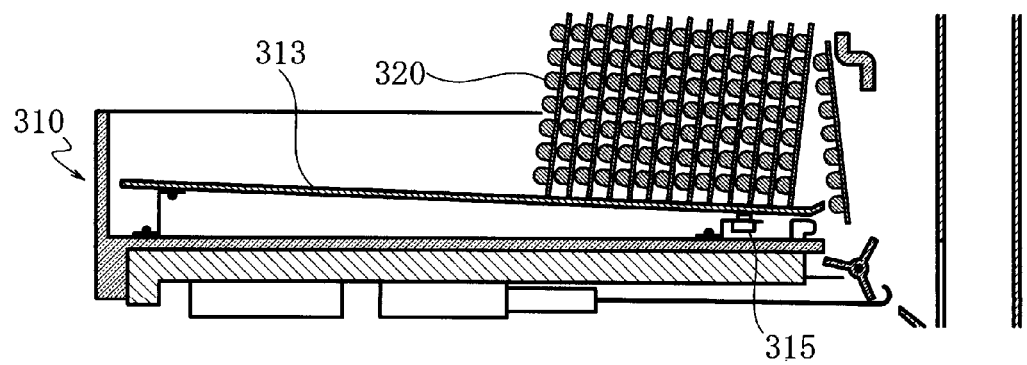
Figure 27A:
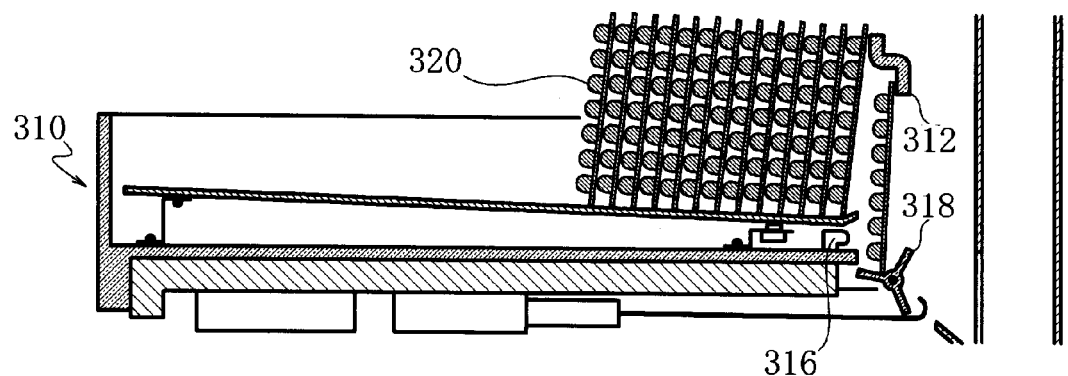
FIGS. 27A-27C are sectional front views of an essential part including one cassette.
Figure 27B:
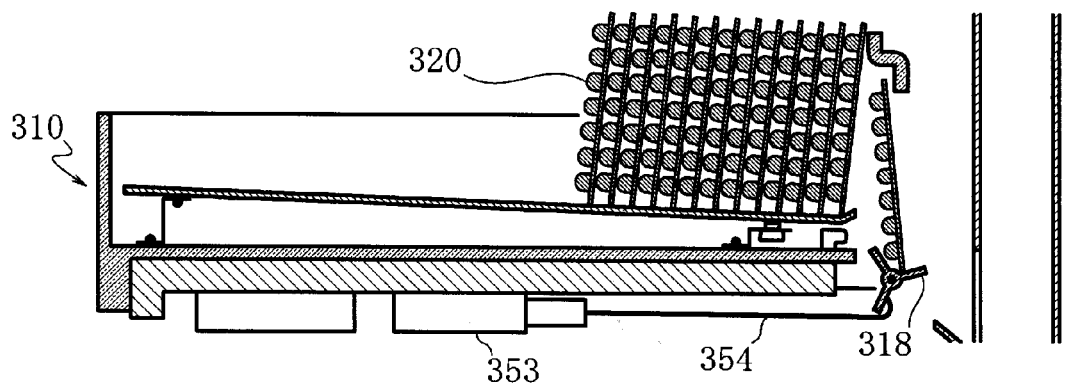
Figure 27C:
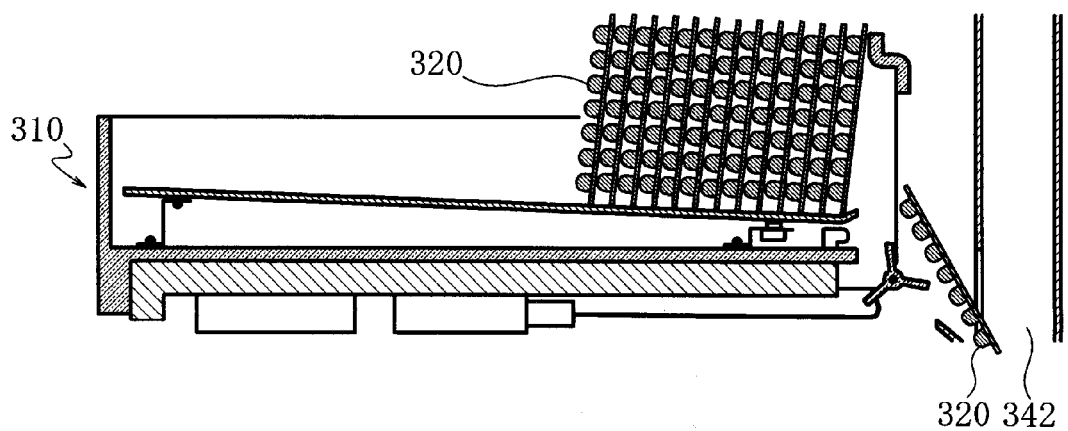
Figure 28A:
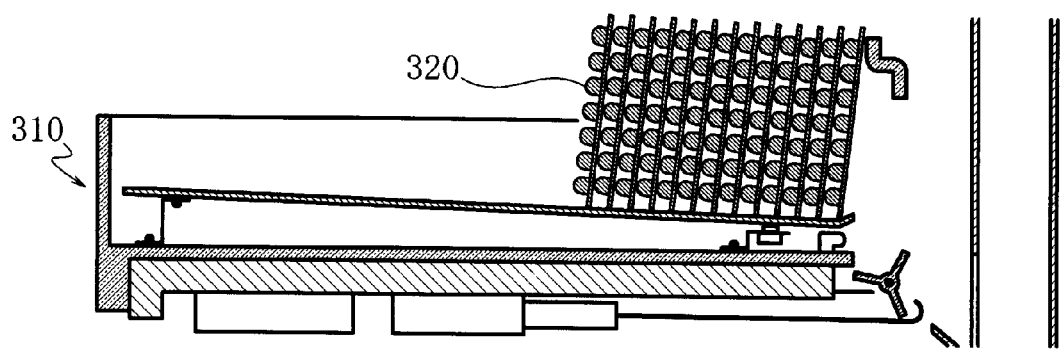
FIGS. 28A-28B are sectional front views of an essential part including one cassette.
Figure 28B:
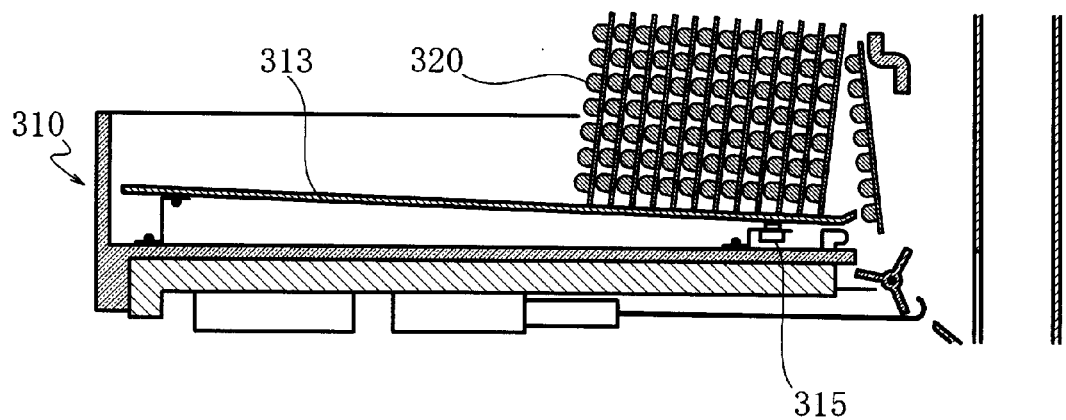

The mode of using the PTP dispensing apparatus 340 according to the illustrative embodiment 4-1 and its operation will be described with reference to the drawings. FIGS. 26A-26C are perspective views showing the appearance of the PTP-packaged drug 320. FIGS. 26B, 26C, 27A, 27B, 27C, 28A and 28B are sectional front views showing an essential part including two cassettes 310 (longitudinal sectional left side views of the cassettes).

A typical shape of the PTP-packaged drug 320 (see FIG. 26A) is a rectangular sheet which is flat on one side and which is provided with an array of pockets for accommodating drugs on the other side. Typically, the width of the PTP-packaged drug 320 is 10-100 mm, the length thereof is 100-200 mm, and the thickness thereof is several mm. The weight of the PTP-packaged drug 320 is typically 10-200 mg.

The empty cassette 310 is removed from the support member 343 before manually replenishing the drugs 320 from above the open top of the cassette. When the replenishment is completed, the cassette is placed on the support member 343 again (see FIG. 25).

The drugs 320 replenished are serially arranged in the longitudinal direction of the cassette (see FIG. 26B), ensuring that the head and tail of the drugs 320 are identically oriented in the drug accommodating space of the cassette 310. More specifically, the drugs 320 are aligned for storage in the drug accommodating space in the outer plates 311, starting at the head of the queue. In this process, each drug 320 is provided above the vibrating member 315 in an upright position inside the drug accommodating space. The drug at the head of the queue is accommodated such that the top end leans against the first contact surface 312a of the top frame 312 to prevent the drug from falling down. The other drugs 320 in the queue are made to lean against each other. The drugs 320 may lean at different angles or may be spaced apart from each other, forming different gaps, so long as the drugs 320 are prevented from falling down.

Once the cassette 310 is fitted to the support member 343, the cassette 310 is operated locally. More specifically, the control circuit 352, the vibrating member 315 and the ejection detecting member 316 are connected via the connector 351. Vibration control of the vibrating member 315 in accordance with detection by the ejection detecting member 316 is initiated by the control circuit 352. Since the drug 320 is not located in the retention member 318 yet, the inner plate 313 is vibrated. This reduces friction so that the thrust derived from gravitation force commensurate with the slope exceeds the friction. The drug 320 above the descending slope 313a of the inner plate 313 advances little by little. The drug 320 at the head of the queue advances to a boundary between the descending slope 313a and the ascending slope 313b and the drugs 320 that follow are moved closer to each other so that the accommodated drugs 320 are neatly aligned inside the drug accommodating space.

In this condition, vibration still continues and the drugs 320 are thrust forward. The drug 320 at the head of the queue continues to be prevented from advancing since the top end thereof is caught by the top frame 312, but the lower end thereof gets over the ascending slope 313b and leaves the inner plate 313 so as to enter the space in front of the open front (see FIG. 26C). The drug is then detached from the outer plates 311 and the top frame 312 under its own weight and retained in the retention member 318 such that the lower end of the drug rests on the upward facing concave part of the retention member 318, and the top end of the drug is caught by the second contact surface 312b of the top frame 312 and is retained there (see FIG. 27A). Concurrently, the top end of the drug 320, next in line and located on the inner plate 313 without the ejected drug 320, leans against the first contact surface 312a of the top frame 312, and the lower end of the drug 320 advances to the boundary between the descending slope 313a and the ascending slope 313b.

The drug 320 brought onto the retention member 318 enters a range of detection by the ejection detecting member 316. The detection output of the ejection detecting member 316 changes to indicate that the drug is retained. In response to this, the control circuit 352 stops activating the vibrating member 315 so that the inner plate 313 comes to rest and is maintained in the current condition.

The drug 320 retained on the retention member 318 is separated from the queue and temporarily held on the retention member 318 in an isolated state. In this state, the drug 320 is free from pressure from the drugs 320 aligned with each other on the inner plate 313 or from friction derived from the pressure. Therefore, the drugs 320 can be discharged one by one in an efficient and stable manner.

When the cassette 310 is selected by the main controller for drug ejection and the main controller directs the control circuit 352 to eject the drug, the solenoid 353 is operated under the control of the control circuit 352. The hook member 354 recedes along with the advancing and receding member. In association with this, the hooked part of the hook member 354 axially rotates the retention member 318 (see FIG. 27B). When the axial rotation brings the retention member 318 from a position to retain a drug to a position to discharge one (see FIG. 27C), the drug 320 retained hitherto slides down from the retention member 318 and is discharged into the descent guidance duct 342.

The drug 320 discharged from the cassette 310 (see FIGS. 24A and 24B) drops in free fall through the descent guidance duct 342, collected by the collecting mechanism 344 and transported to the dispensing outlet 346 by the transporting mechanism 345.

Thus, the drug 320 ejected from the target cassette 310 to the descent guidance duct 342 are automatically dispensed.

As the drug 320 is taken out from the cassette 310, no drugs 320 remain retained on the retention member 318. The cassette is now in a condition that occurred when the drugs are replenished except that the number of accommodated drugs 320 is reduced by one (see FIG. 28A). Vibration of the inner plate 313 is resumed so that the next drug 320 in line is ejected out of the open front of the outer plates 311 and then retained in the retention member 318 (see FIG. 28B). The operation described above is repeated each time the drug 320 is discharged and finally ejected from the retention member 318. Thus, the vibration-assisted ejection cassette 310 enables efficient and reliable piece-by-piece automatic ejection of the PTP-packaged drugs 320. The PTP dispensing apparatus 340 is capable of storing various PTP-packaged drugs 320 and automatically dispensing a desired one.

Illustrative Embodiment 4-2

The specific structure of the PTP dispensing apparatus according to the illustrative embodiment 4-2 will be described with reference to the associated drawings. FIG. 29 is a sectional left side view of the cassette 310.

The PTP dispensing apparatus differs from that of the illustrative embodiment 4-1 in the specific structure of the inner plate 313 and the vibrating member 315 of the cassette 310.

The difference is that the cassette 310 is that multiple (in the illustrated example, three) vibrating members 315 are provided in the cassette 310 and the descending slope 313a of the inner plate 313 is segmented (in the illustrated example, into three segments) so as to correspond to the vibrating members 315.

The single vibrating member 315 may be replaced by a large one to enhance capability to vibrate. In this case, however, increase in cost is minimized by using a desired number of inexpensive mass-produced products. Another advantage is that, by distributing multiple vibrating members 315 in the longitudinal direction of the inner plate 313, the entire inner plate 313 is vibrated uniformly.

[Other Points of Note]

The cassettes 310 may be cylindrically arranged as in the storage of patent document No. 2 instead of being arranged in a mutually orthogonal matrix.

In the illustrated examples described above, the control circuit 352 and the actuator mechanism comprising the solenoid 353 and the hook member 354 are fitted to the support member 343. Alternatively, these elements may be fitted to the cassette 310. For example, the circuit 352 and the actuator mechanism may be fitted to the bottom plate of the outer plates 311 and be fed power via the connector 351.

In the above-described illustrative embodiments, it is ensured that the head and tail of the PTP-packaged drugs are identically oriented when the drugs are aligned in the drug accommodating space of the cassette. However, this is not an essential requirement. The orientation of the head and tail of the PTP-packaged drugs may only be given secondary consideration so long as the aligned condition is not impaired.

In the above-described illustrative embodiments, the drugs are taken out one by one from the cassette. Alternatively, multiple (e.g. two or three) drugs may be taken out at a time. More specifically, this can easily be achieved by extending the distance between the front end of the inner plate and the opposite face of the retention member.

Fifth Embodiment

A fifth embodiment of the present invention relates to a pharmaceutical product storage apparatus such as a medicine storage apparatus, a medicine rack, a drug preparation table, a medical tool stock repository and, more particularly, to a pharmaceutical product storage apparatus which is provided with a large number of drawable containers where pharmaceutical products such as medicines and medical resources are manually stored and retrieved, and which enables selective retrieval of pharmaceutical products therefrom in accordance with pharmaceutical product dispensing information.

If the items stored are not limited to pharmaceutical products, a typical example of stock repository provided with categorized stock function will be a supply table at a facility or a general-purpose locker in which a storage area is partitioned into a large number of compartments each provided with a door.

If the case of storage of pharmaceutical products, there is known a medicine storage apparatus capable of aligning medicines such as ampouled drugs for storage so that the medicines can be stored or taken out in a single action (see, for example, patent document No. 6). The apparatus is designed to display guidance by LED's etc. to guide a user to the location of cassette for storage or retrieval.

There is also known a medicine rack designed to display guidance to guide a user to the location of retrieval, by illuminating a bottle that stores powder medicine (see, for example, patent document No. 7).

There is also known a pharmaceutical product storage apparatus in which doors and drawers can be so wide open or completely drawn forward that no such location guidance display is necessary (see, for example, patent document No. 5). In this apparatus, the opening operation is automated in addition to the selection of a pharmaceutical product stocked according to the category. As such, the apparatus is favorably used in that the location of a desired pharmaceutical product is immediately known and the product is brought to a retrievable state concurrently.

As the convenience—convenience derived from categorized stock of a large number of pharmaceutical products, and capabilities for automatic target selection and opening operation in spite of its manual retrieval arrangement—has been appreciated. Demands have thus arisen for extension of application of the apparatus. For example, demands have arisen for handling a large number of pharmaceutical products including less frequently used products as well as frequently used products.

However, the pharmaceutical product storage apparatus currently in use uses a special mechanism comprising a combination of a permanent magnet and a magnet coil in order to open the drawer to the extent that the drawer thus opened is immediately known. Therefore, it is difficult to reduce the cost of the opening mechanism.

Increasing the number of containers by arranging a larger number of small drawers in a two-dimensional array would result in a commensurate increase in the number of opening mechanisms, leading to a high price of the apparatus. Even if the unit price of the container is reduced as a result of size reduction, the cost of the opening mechanism is not reduced so much given that the distance in which the container is driven forward in the direction of drawing, i.e., the distance in driving, remains unchanged.

This means that reducing the distance in which the opening mechanism drives is a shortcut for reducing the cost. By reducing the distance, the opening mechanism can be built by, for example, an inexpensive, mass-produced electric motor, cam, etc.

A down side of reducing the distance in which the opening mechanism drives is that the container would not be sufficiently noticeable as the target container is automatically opened, i.e., as the container accommodating the target pharmaceutical product is advanced automatically. This creates a desire for using guidance display to guide a user to the location of retrieval. Increase in cost due to provision for guidance display would then result in the advantage of reduced cost of the opening mechanism being lost.

Attempts to reduce the cost of guidance display for guiding a user to the location of retrieval may be possible by commonly using a light-emitting member in one location and in locations below, above, to the right or to the left thereof, so that the number of light-emitting members required is smaller than the number of containers (see, for example, FIG. 11 of patent document No. 6). Such an approach, however, does no ensure that each container is illuminated.

If the same number of light-emitting members as the containers are provided and arranged so as to be respectively associated with the containers (see, for example, FIG. 5 of patent document No. 6 or patent document No. 7), excellent visibility is ensured since each container is illuminated. However, the approach presents a problem with cost reduction.

Accordingly, a technical challenge is to modify the pharmaceutical product storage apparatus for the purpose of reducing the cost thereof. This can be achieved by ensuring that the distance in which the opening mechanism drives is reduced, the light-emitting members are fewer than the containers, and the containers are illuminated despite the small number of light-emitting members by exploiting the fact that automatic advancement of containers is maintained even if the distance in driving is reduced.

A first pharmaceutical product storage apparatus according to the fifth embodiment comprises: a large number of containers which accommodates pharmaceutical products; a storing unit which holds the containers in a two-dimensional array so that the containers are drawable in a forward direction; and a large number of container opening mechanisms, each of the mechanisms being provided behind the associated container and advancing the associated container, wherein the mechanism is of a type with reduced distance in driving, and a light projecting member (light emitting member) for projecting light passing through a space in front of at least some of the containers in a pushed-back state is provided, and a visualizing means for directing the projected light forward is formed in or attached to the front end of each of the containers.

The phrase "with reduced distance in driving" means that the distance in which the container opening mechanism advances the container is shorter than the depth (i.e., the longitudinal size) of the container. Preferably, the distance in driving is less than half of the depth. More preferably, the distance is as long as the longitudinal length of the part of the container identified as being the front end.

A second pharmaceutical product storage apparatus according to the fifth embodiment is a modification to the first pharmaceutical product storage apparatus mentioned above, wherein the container opening mechanism is provided with an eccentric cam fitted to a motor and the rotation shaft thereof.

A third pharmaceutical product storage apparatus according to the fifth embodiment is a modification to the first or second pharmaceutical product storage apparatus mentioned above, wherein a front plate of the container is transparent, a slope is formed immediately behind the front plate, and the visualizing means is a name plate placed on the slope.

A fourth pharmaceutical product storage apparatus according to the fifth embodiment is a modification to any one of the first through third pharmaceutical product storage apparatuses, wherein a bottom plate of the container is transparent, and a light receiving member is provided at the destination of projection of light from the light projecting member so that the pulled-out or pushed-back state of the container is determined by referring to light reception state.

In the first pharmaceutical product storage apparatus, as the container selected for retrieval of a pharmaceutical product is automatically advanced by the container opening mechanism, the front end of the container is projected out of the storing unit. The light projected by the light projecting member impinges upon the front end so that the light is directed forward by the visualizing mean. Thus, the container selected for retrieval is illuminated. The same is true of the other containers selected for retrieval. It is ensured that each one of the containers is illuminated. The containers placed to face the same line of projected light share one light projecting member and therefore cannot be illuminated at the same time. As long as applications requiring simultaneous illumination are avoided, no inconvenience is presented if the number of light projecting members is smaller than the number of containers.

The visualizing means for improving visibility by changing the direction of light is implemented at a lower cost than the light projecting member, by introducing a known light guiding member (see patent document No. 7), an appropriate reflective member or a diffusing member, or by treating the surface to form a reflective surface or a diffusing surface.

Thus, according to the first pharmaceutical product storage apparatus, the cost is reduced while maintaining convenience, by reducing the distance in driving by the container opening mechanism and ensuring at the same time that the containers are illuminated by the light projecting members fewer in number.

The second pharmaceutical product storage apparatus mentioned above is configured such that the container opening mechanism is provided with a motor and an eccentric cam fitted to the rotation shaft thereof.

The cost is reduced satisfactorily by using mass-produced products available on the market to implement container opening mechanisms with reduced distance in driving.

In the third pharmaceutical product storage apparatus mentioned above, the visualizing means is implemented by placing a name plate on the slope inside the container.

In this case, a plate body capable of reflecting and diffusing light at its surface is employed as the name plate, which also serves as the visualizing member. Since ordinary white paper serves the purpose, the name plate can be implemented conveniently and inexpensively. If inexpensive, high-intensity light emitting devices are available, simultaneous illumination of multiple containers aligned to share the projected light will be realized by modifying the apparatus such that the reflectance of the visualizing means is lowered, and that part of the light is transmitted therethrough and travels straight ahead.

In the fourth pharmaceutical product storage apparatus mentioned above, the projected light is blocked if the container is projected from the storing unit but is not blocked if the container recedes into the storing unit.

Since the light reception state varies depending on whether the container is projected or not, it is possible to automatically determine whether the container is automatically or manually pushed back, by referring to the light reception state of the light receiving member. Like the light projecting members, the light receiving members are shared by multiple containers. Therefore, the number of light receiving members may be smaller than the containers.

Specific embodiments of the pharmaceutical product storage apparatus according to the fifth embodiment will be described using illustrative embodiments 5-1 through 5-3.

Figure 30A:
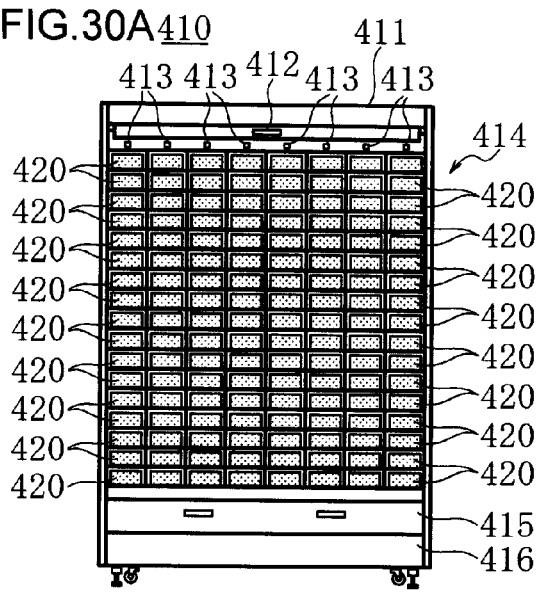
FIGS. 30A-30F show the mechanical structure of a pharmaceutical product storage apparatus according to an illustrative embodiment 5-1 of a fifth embodiment.
Figure 30B:
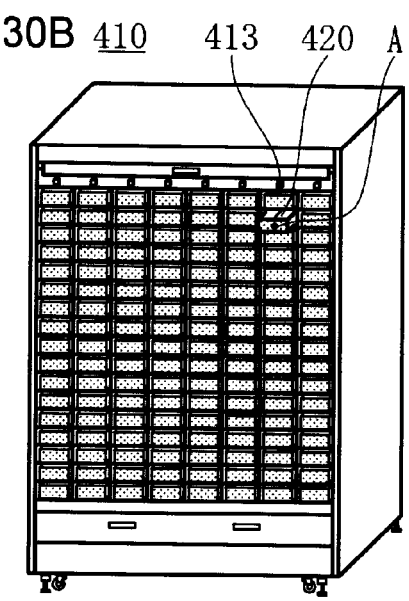
Figure 30C:
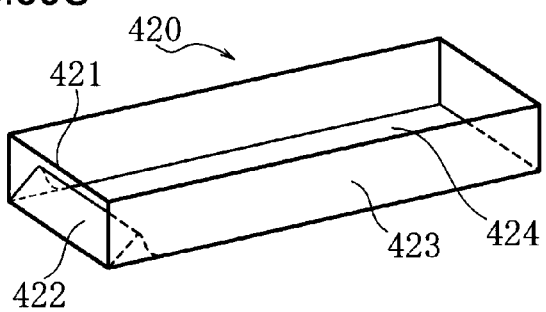
Figure 30D:
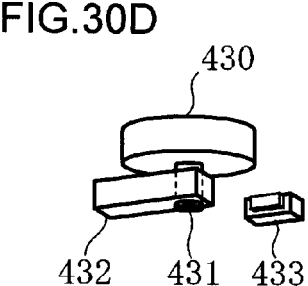
Figure 30E:
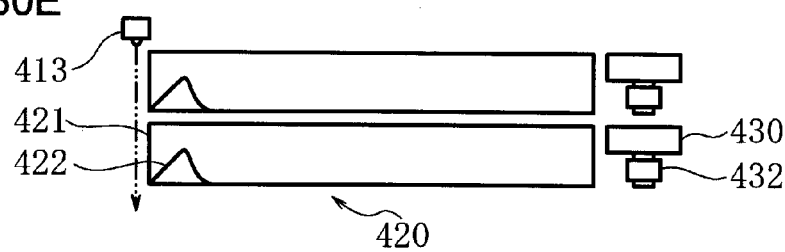
Figure 30F:
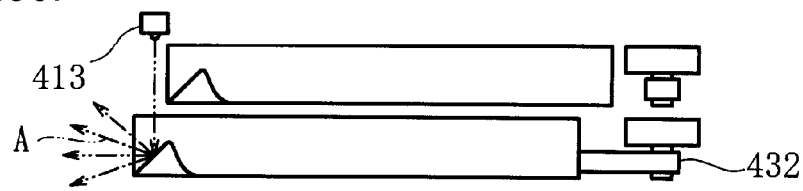
Figure 31:
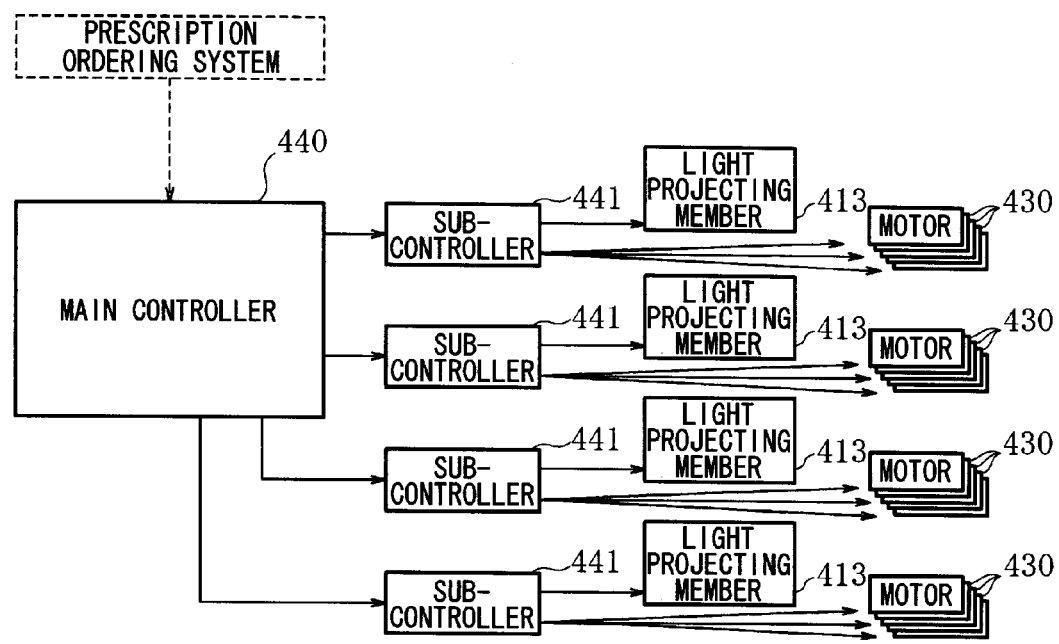
FIG. 31 is a schematic block diagram showing a controller according to the illustrative embodiment 5-1.
Figure 32A:
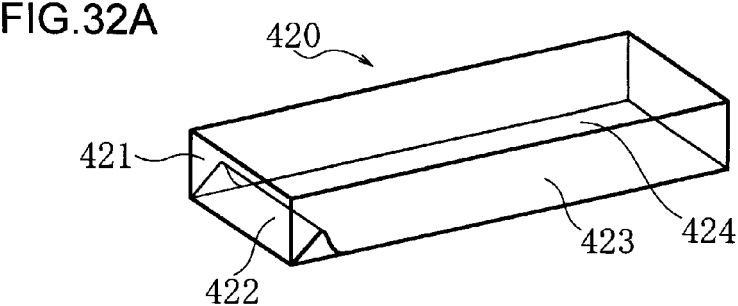
FIGS. 32A-32C show the structure of a pharmaceutical product storage apparatus according to an illustrative embodiment 5-2 of the fifth embodiment.
Figure 32B:
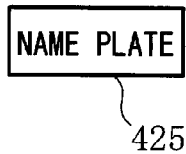
Figure 32C:
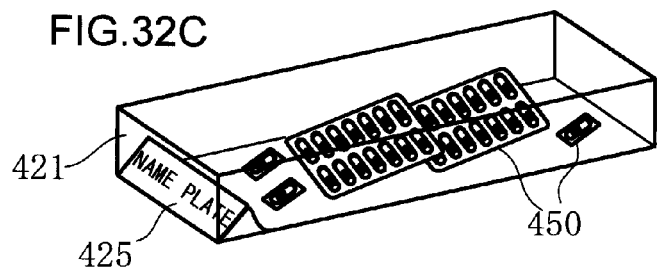
Figure 33A:
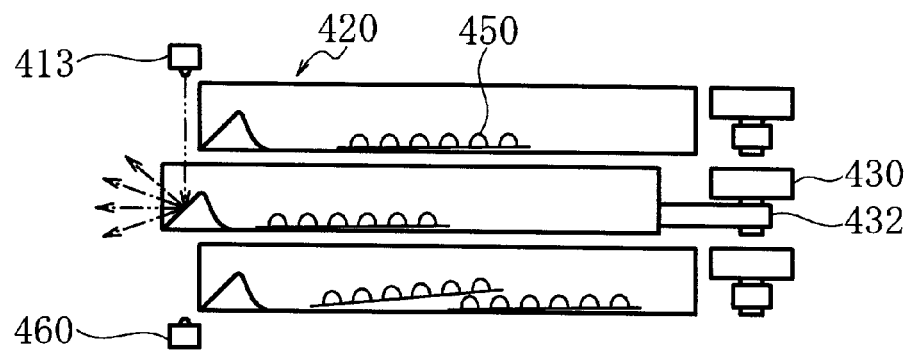
FIGS. 33A-33C show the structure of a pharmaceutical product storage apparatus according to an illustrative embodiment 5-3 of the fifth embodiment.
Figure 33B:
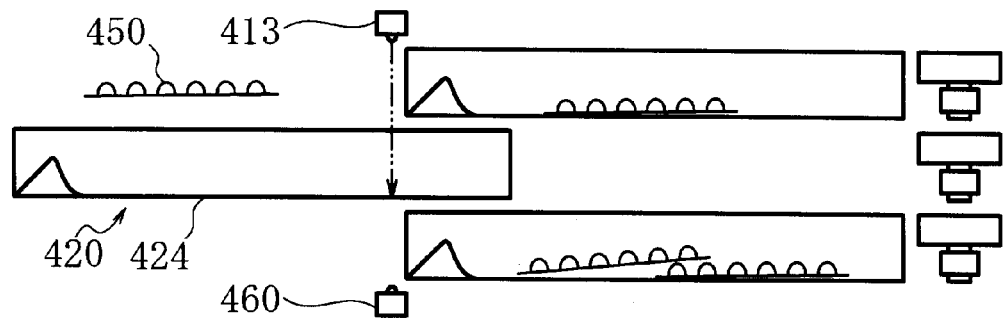
Figure 33C:
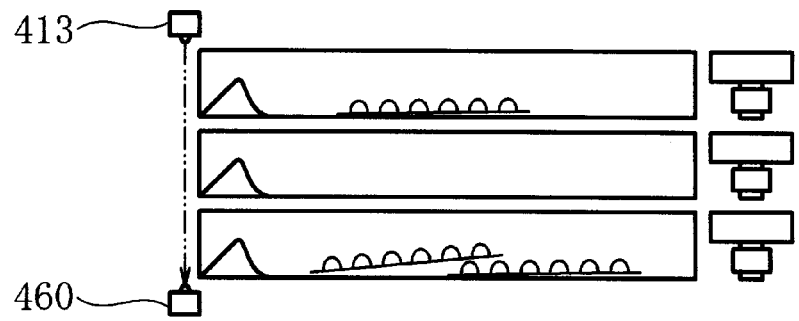

The illustrative embodiment 5-1 shown in FIGS. 30A-31 is an embodiment of the first and second pharmaceutical product storage apparatuses mentioned above. The illustrative embodiment 5-2 shown in FIGS. 32A-32C is an embodiment of the third pharmaceutical product storage apparatus mentioned above. The illustrative embodiment 5-3 shown in FIGS. 33A-33C is an embodiment of the fourth pharmaceutical product storage apparatus mentioned above.

In the illustration, the details of support members such as frames, fasteners such as bolts, connectors such as hinges, detailed electric and electronic circuits such as motor drivers are omitted for brevity, highlighting those elements necessary to explain the embodiment and related elements.

Illustrative Embodiment 5-1

The specific structure of the pharmaceutical product storage apparatus according to the illustrative embodiment 5-1 will be described with reference to the associated drawings. FIGS. 30A-30F show the mechanical structure of a pharmaceutical product storage apparatus 410. FIG. 30A is a front view of the whole apparatus; FIG. 30B is a perspective view of the whole apparatus; FIG. 30C is a perspective view of a container; and FIG. 30D is a perspective view of a container opening mechanism. FIG. 31 is a schematic block diagram showing a controller.

A pharmaceutical product storage apparatus 410 (see FIGS. 30A and 30B) is configured such that a shutter 412 is provided in the top part of a housing 411, and a drawer 415 and electric equipment 416 are provided in the lower part of the housing 411. The greater part of the housing 411 that can be easily reached by hand, i.e., the middle part thereof, is occupied by a storing unit 414.

The storing unit 414 is partitioned into grids so as to form a multiple-tier and multiple-column array (in the figure, 17 tiers and 8 columns) of drawer frames. The interior surfaces of the drawer frames are finished to smooth surfaces with low friction so that the frames are capable of holding a two-dimensional array of containers 420 so that the containers can be pulled or pushed forward. Each of the drawer frames is provided with a container opening mechanism 430-433. The container opening mechanism 430-433 is placed behind the container 420 and cannot be viewed from the front. A series of light projecting members 413 are provided at the top end of the front of the storing unit 414.

The container 420 (see FIG. 30C) is a longitudinally elongated box with an open top so that the container can accommodate pharmaceutical products and can be drawn. A front plate 421 is transparent. In the illustrated example, a side plate 423 and a bottom plate 424 are non-transparent. At the front end of the container 420 (more specifically, in a space inside the container 420 immediately behind the front plate 421) is formed a slope 422 by forming a bank on the bottom plate 424 or by fitting a triangle pole member on its side to the bottom plate 424. The slope 422 is finished to a diffusely reflecting surface such as that of frosted glass and faces diagonally upward an angle of inclination of about 30°-60° (in FIGS. 30E and 30F, about 45°) with respect to the horizon. Therefore, the slope serves as a visualizing means for receiving the light projected vertically downward (see FIG. 30F) and directing the light forward as reflected and diffused light A.

The container opening mechanism 430-433 (see FIG. 30D) is provided with a commercially available electric motor 430 of a flat type, an eccentric cam 432 fitted to its rotation shaft 431, and a origin sensor 433 such as a push switch. When the large-diameter portion of the eccentric cam 432 is in contact with the origin sensor 433 and is at rest (see FIG. 30E), the container 420 can fully recede into and is accommodated in the storing unit 414. When the rotation shaft 431 of the motor 430 is rotated halfway (see FIG. 30F), the large-diameter portion of the eccentric cam 432 presses the rear end of the container 420 so as to advance the container 420. The amount of advance, i.e., the distance in which the container is driven forward, is 2-3 cm, which is sufficient to project the slope 422 from the drawer frame and allow a user to grip the front plate 421. As such, the distance is many times smaller than the depth of the container 420.

The light projecting member 413 is implemented by, for example, a narrow-directivity red light-emitting diode (LED) emitting a beam of light. The member 413 is provided for each column of drawer frames of the storing part 414 so as to project light vertically downward. Light is projected through a space in front of those multiple containers 420 in a column that are in a pushed-back state (see the chain double-dashed line of FIG. 30E), and the front end of the container 420 advanced by the eccentric cam 432 of the container opening mechanism 430-433 is projected (see FIG. 30B and 30F). Due to this arrangement and the fact that the containers 420 are arranged as described above, the light receiving portion of the slope 422 is illuminated by the reflected and diffused light A.

A main controller 440 is stored in the electric equipment 416 along with a power supply (not shown) (see FIG. 31). The main controller 440 is a control device for selecting one or a plurality of a large number of containers 420 in accordance with pharmaceutical product dispensing information and activating one of a large number of container opening mechanisms 430-433 corresponding to the selection. The main controller 440 is implemented by, for example, a programmable personal computer or a microprocessor system. In order to obtain pharmaceutical product dispensing information designating pharmaceutical products to be dispensed, the main controller 440 is adapted to receive, from a host computer such as a prescription order entry system, prescription data or drug preparation instruction data derived therefrom, or to receive an instruction for dispensing from an input device (not shown).

The motors 430 are connected to the main controller 440 to control the operation of the container opening mechanisms 430-433. Since there are a large number of motors 430, sub-controllers 441 are interposed for respective columns in the illustrated example. The light projecting member 413 may project light on a continuous basis and need not be controlled. In this case, the light projecting member 413 is also connected to the main controller 440 via the subcontroller 441 so as to project light only when any of the containers 420 at the destination of projection of light is selected.

The mode of using the pharmaceutical product storage apparatus 410 according to the illustrative embodiment 5-1 and its operation will be described with reference to the drawings. FIG. 30A is a front view of the whole apparatus; FIG. 30B is a perspective view of the whole apparatus; FIGS. 30E and 30F are right side views of an essential part. FIGS. 30A and 30E show the containers 420 are pushed back and recede into the storing unit 414. FIGS. 30B and 30F show that the container 420 in the second tier and the second column from top right is selected and automatically advanced.

Prior to use, pharmaceutical products such as medicines and medical resources are accommodated in the containers 420 according to the category. Typical examples of medicines (see patent document No. 5) include PTP-packaged drugs, ampoules and medicines dissolved before use. Typical examples medical resources include bone prothesis and medical operation tools. The containers 420 accommodating these pharmaceutical products according to the category are pushed and inserted into the drawers of the storing unit 414. The positions of the containers 420 are entered manually or otherwise in the main controller 440 and stored in a medicine master file etc. This completes preparation. At this stage (see FIGS. 30A and 30E), none of the containers 420 is not illuminated since the containers 420 are in a pushed-back state and are closed.

When prescription data or drug preparation instruction data is delivered to the main controller 440 via communication or manual operation, medicine codes are extracted from the data to formulate pharmaceutical product dispensing information. The main controller 440 searches the medicine master file by referring to the pharmaceutical product dispensing information. The container accommodating the pharmaceutical product to be taken out is selected and the container opening mechanism 430-433 behind is activated. The target container 420 is then pushed forward by the eccentric cam 432 and opened. The light projecting member 413 above projects light.

In this state (see FIGS. 30B and 30F), the front end of the target container 420 is projected so that the light projected by the light projecting member 413 impinges upon the slope 422 of the container 420, thereby directing the projected and diffused light A forward. As a result, the container 420 is seen illuminated. In this way, the container 420 for retrieval of a pharmaceutical product is highlighted and opened. An operator places his or her finger on the front plate 421 through the opening so as to pull out the container 420. The operator takes out a desired pharmaceutical product, closes the container 420 by pushing it back and indicates to the main controller 440 that the job is completed in order to save a job record. In response to this, the light projecting member 413 stops projecting light.

In this way, manual dispensing of pharmaceutical products, stored in the pharmaceutical product storage apparatus 410 according to the category in a closed status, can be performed easily and efficiently.

As mentioned above, the container opening mechanism 430-433 is of a simple structure comprised of a combination of the motor 430 and the eccentric cam 432. The number of light projecting members 413 is small in that it is equal to the number of columns of the containers 420. Thus, the pharmaceutical product storage apparatus 410 can be fabricated at a low cost.

Illustrative Embodiment 5-2

The specific structure of the pharmaceutical product storage apparatus according to the illustrative embodiment 5-2 will be described with reference to the associated drawings. FIG. 32A is a perspective view of the container 420; FIG. 32B is a front view of a name plate 425; and FIG. 32C is a perspective view of the container 420. A complete PTP-packaged drug and a piece cut off from the package are shown in FIG. 32C as examples of pharmaceutical products 450.

The pharmaceutical product storage apparatus differs from that of the illustrative embodiment 5-1 in that the container 420 is integrally formed of transparent plastic and the visualizing means attached is implemented by the name plate 425 placed on the slope 422.

The container 420 can be integrally fabricated at a low cost, using the same material for the slope 422, the side plate 423, the bottom plate 424 and the front plate 421.

The name plate 425 is non-transparent paper or a plastic sheet and is formed with substantially the same size as the slope 422. At least one side thereof is formed as a coarse surface reflecting and diffusing impinging light. The name and/or code of a medicine is handwritten or printed on the name plate 425.

In this case, the visualizing means is easily and inexpensively provided in the container 420 by placing the name plate 425 on the slope 422 with the printed or handwritten surface facing upward.

Illustrative Embodiment 5-3

The pharmaceutical product storage apparatus according to the illustrative embodiment 5-3, an essential part of which is shown in the right side view of FIGS. 33A-33C differs from those of the illustrative embodiments 5-1 and 5-2 in that the bottom plate 424 of the container 420 is non-transparent and that a light receiving member 460 is provided at the destination of projection of light from the light projecting member 413. The main controller 440 is configured (not shown) to determine whether the container 420 is drawn by referring to the light reception state of the light receiving member 460.

In this case, as the container opening mechanism 430-433 projects the container 420 for retrieval out of the storing unit 414 (see FIG. 33A), the light projected from the light projecting member 413 to the light receiving member 460 is blocked by the front end of the container 420, preventing the light receiving member 460 from receiving the light.

When the container 420 is drawn further forward for retrieval of the pharmaceutical product 450 (see FIG. 33B), the light receiving member 460 continue to fail to receive the light because the light projected from the light receiving member 413 to the light receiving member 460 is blocked by the bottom plate 424 of the container 424 unless the container 420 is completely pulled out.

Meanwhile, when the container 420 is pushed back upon completion of the retrieval of the pharmaceutical products 450, causing the container 420 to recede into the storing unit 414 (see FIG. 33C), nothing blocks the light projected from the light projecting member 413 to the light receiving member 460 so that the light receiving member 460 receives the light.

A signal indicating change in the light reception status of the light receiving member 460 that depends on whether the container 420 is projected is input to the main controller 440. A time stamp is included in log data.

If the failure of the light receiving member 460 to receive the light cannot be detected even if the motor 430 is activated, the main controller 440 determines that automatic advancement of the container 420 is not completed and issues an appropriate alarm.

If there is an input indicating the completion of a dispensing operation while resumption of reception of light by the light receiving member 460 is not detected, the main controller 440 determines that the dispensing operation is not completed and issues a guidance message prompting the operator to close the container 420.

[Other Points of Note]

In the illustrative embodiments described above, it is assumed that the containers 420 have the same size and shape. Alternatively, the containers may come in different sizes or shapes. In that case, the height of the eccentric cam 432 may be varied so as to be compatible with the height of the container 420. The motor 430 may not be at substantially the same height as the associated container 420 so long as the eccentric cam 432 is capable of pressing the rear end of the container 420.

The light projecting member 413 may be provided in front, or to the left or right of the front space, instead of above thereof. The direction of projection of light by the light projecting member 413 may be upward, horizontal or diagonal instead of vertically downward.

Sixth Embodiment

A sixth embodiment of the present invention relates to a PTP dispensing apparatus which stores various PTP-packaged, equivalently packaged drugs or other pharmaceutical products so as to take out necessary drugs in accordance with prescription etc. More particularly, the embodiment relates to a PTP dispensing system in which an automatic PTP dispensing apparatus and a semi-automatic pharmaceutical product storage apparatus are arranged side by side. The PTP dispensing apparatus holds a large number of cassettes which aligns drugs for storage and sequentially ejecting the drugs. The semi-automatic pharmaceutical product storage apparatus is provided with a large number of drawable containers where pharmaceutical products are manually stored and retrieved.

The term "PTP-packaged or equivalently packaged drugs" refers to drugs accommodated in a thin paper case or a plastic case and, more particularly, to those that can be aligned for storage in an upright position, such as the PTP-packaged drug. The term "pharmaceutical product" encompasses the drugs defined above and other medicines and medical resources.

PTP-packaged drugs, even as they are individually packaged, are thinly packaged and irregular in cross section. As such, it is not necessarily easy even for an experienced operator to manually and properly grasp the one at the head of the queue of drugs aligned for storage. Attempts for automatization by a mechanism for grasping or absorbing drugs would not help since it would inevitably result in a complex mechanism, and the ejection mechanism can be simplified only in a limited way. The same thing is true of a biasing means for advancing accommodated drugs. For elimination thereof, there would be required, for example, a mechanism for translating the absorbing mechanism instead. Since a PTP dispensing apparatus is provided with a large number of drug cassettes, even minor simplification of a cassette is of a great help in simplifying the dispensing apparatus as a whole.

In this background, it is desirable to simplify the cassette mechanism and reduce the cost by putting the vibration-assisted method, which is used in a powder medicine feeder, to the use of dispensing PTP-packaged drugs and, in this process, eliminating the need for a weighting member for measuring weight or a biasing member for advancing drugs. That is, a basic technical task to be achieved in a PTP dispensing apparatus is to turn a drug cassette for PTP-packaged drugs into a vibration-assisted ejection cassette capable of maintaining PTP-packaged drugs in alignment with each other, advancing the drugs while maintaining the drugs in alignment and ejecting them one by one. A further technical task in an automatic PTP dispensing apparatus holding a large number of vibration-assisted ejection cassettes is to implement the mechanism necessary for automatization of the operation of discharging and ejecting drugs from the cassettes in a simplified and inexpensive manner.

With regard to semi-automatic pharmaceutical product storage apparatus, the convenience—convenience derived from categorized stock of a large number of pharmaceutical products, and capabilities for automatic target selection and opening operation in spite of its manual retrieval arrangement—has been appreciated. Demands have arisen for extension of application of the apparatus. For example, there are demands for handling a large number of pharmaceutical products including less frequently used products as well as frequently used products.

However, the pharmaceutical product storage apparatus currently in use uses a special mechanism comprising a combination of a permanent magnet and a magnet coil in order to open the drawer to the extent that the drawer thus opened is immediately known. Therefore, it is difficult to reduce the cost of the opening mechanism.

Increasing the number of containers by arranging a larger number of small drawers in a two-dimensional array would result in a commensurate increase in the number of opening mechanisms, leading to a high price of the apparatus. Even if the unit price of the container is reduced as a result of size reduction, the cost of the mechanism is not reduced so much given that the distance in which the container is driven forward in the direction of drawing, i.e., the distance in driving, remains unchanged.

This means that reducing the distance in which the opening mechanism drives is a shortcut for reducing the cost. By reducing the distance, the opening mechanism can be built by, for example, an inexpensive, mass-produced electric motor, cam, etc.

A down side of reducing the distance in which the opening mechanism drives is that the container would not be sufficiently noticeable as the target container is automatically opened, i.e., as the container accommodating the target pharmaceutical product is advanced automatically. This creates a desire for using guidance display to guide a user to the location of retrieval. Increase in cost due to provision for guidance display would then result in the advantage of reduced cost of the opening mechanism being lost.

Attempts to reduce the cost of guidance display for guiding a user to the location of retrieval may be possible by commonly using a light-emitting member in one location and in locations below, above, to the right or to the left thereof, so that the number of light-emitting members required is smaller than the number of containers (see, for example, FIG. 11 of patent document No. 6). Such an approach, however, does no ensure that each container is illuminated.

If the same number of light-emitting members as the containers are provided and arranged so as to be respectively associated with the containers (see, for example, FIG. 5 of patent document No. 6 or patent document No. 7), excellent visibility is ensured since each container is illuminated. However, the approach presents a problem with cost reduction.

Accordingly, a technical challenge is to modify the pharmaceutical product storage apparatus for the purpose of reducing the cost thereof. This can be achieved by ensuring that the distance in which the opening mechanism drives is reduced, the light-emitting members are fewer than the containers, and the containers are illuminated despite the small number of light-emitting members by exploiting the fact that automatic advancement of containers is maintained even if the distance in driving is reduced.

In large hospitals and dispensaries, a drug preparation system is built by, for example, providing various drug preparation machines side by side, manually collecting desired drugs and connecting transporting mechanisms together.

Meanwhile, the variety of drugs (tablets, etc.) is enormous. There are as many as several thousand types, counting only PTP-packaged drugs. The cost that should be borne would be extraordinary if the whole variety of PTP-packaged drugs is accommodated in an automatic PTP dispensing apparatus. For this reason, numerous non-accommodated PTP-packaged drugs not accommodated in an automatic apparatus are usually stored in a manually-operated medicine rack, etc, while frequently-used PTP-packaged drugs are accommodated in the automatic apparatus as described in patent document No. 2. The same is true if frequently-used PTP-packaged drugs are accommodated in a semi-automatic pharmaceutical product storage apparatus as described in patent document No. 5.

In this background, a first technical challenge in a PTP dispensing system is to allow an automatic PTP dispensing apparatus and a semi-automatic pharmaceutical product storage apparatus to share the task of accommodation so that as many PTP-packaged drugs as possible can be accommodated in a drug preparation machine within a limited budget. Another aspect of the challenge is to reduce the cost of the apparatuses.

A second technical challenge in a PTP dispensing system is to coordinate the automatic PTP dispensing apparatus and the semi-automatic pharmaceutical product storage apparatus sharing the task of accommodation and secure a convenient work place so that the job of discharging PTP-packaged drugs from the apparatuses and the job of monitoring can be performed conveniently.

A first PTP dispensing system according to the sixth embodiment comprises a PTP dispensing apparatus and a pharmaceutical product storage apparatus, the PTP dispensing apparatus holding an array of a large number of cassettes for aligning PTP-packaged or equivalently packaged drugs for storage so that the drugs are sequentially ejectable, the PTP dispensing apparatus automatically discharging the drugs from the cassettes and guiding the drugs downward for collection, the pharmaceutical product storage apparatus holding a two-dimensional array of a large number of containers accommodating pharmaceutical products so that the containers can be drawn forward, and the pharmaceutical product storage apparatus being configured to advance the containers by using container opening mechanisms provided behind the containers, wherein the PTP dispensing apparatus is configured such that vibration is used by the cassette to maintain the drugs in alignment, to advance the drugs while maintaining alignment thereof and to sequentially eject the drugs, and the pharmaceutical product storage apparatus is provided with a light projecting member for projecting light passing through a space in front of at least some of the containers in a pushed-back state, and wherein a visualizing means for directing the projected light forward is formed in or attached to the front end of each of the containers.

A second PTP dispensing system according to the sixth embodiment comprises a PTP dispensing apparatus and a pharmaceutical product storage apparatus, the PTP dispensing apparatus holding an array of a large number of cassettes for aligning PTP-packaged or equivalently packaged drugs for storage so that the drugs are sequentially ejectable, the PTP dispensing apparatus automatically discharging the drugs from the cassettes and guiding the drugs downward for collection, the pharmaceutical product storage apparatus holding a two-dimensional array of a large number of containers accommodating pharmaceutical products so that the containers can be drawn forward, and the pharmaceutical product storage apparatus being configured to advance the containers by using container opening mechanisms provided behind the containers, wherein a work table is attached to the pharmaceutical storage apparatus, a chute is formed by cutting a portion of the work table, a weighing scale is provided in the chute, the system being further provided with a transporting mechanism for feeding a drug ejected by the PTP dispensing apparatus to the chute.

In the first PTP dispensing system, the automatic PTP dispensing apparatus and the semi-automatic pharmaceutical product storage apparatus arranged side by side share the task of accommodating PTP-packaged drugs. An advantage with the cassettes of the PTP dispensing apparatus is that, by using vibration to maintain PTP-packaged drugs in alignment, to advance the drugs while maintaining alignment thereof and to sequentially eject the drugs, there is no need to provide a weighing member or a biasing member in individual cassettes, and, accordingly, the mechanism is simplified and the cost is reduced. An advantage with the pharmaceutical product storage apparatus is that, cost reduction is bolstered while maintaining convenience, by exploiting the automatic advancement of the containers to illuminate the containers by the light projecting members, which are fewer in number than the containers.

Thus, the first PTP dispensing system accomplishes the first technical challenge mentioned above.

In the second PTP dispensing system, the automatic PTP dispensing apparatus and the semi-automatic pharmaceutical product storage apparatus arranged side by side share the task of accommodating PTP-packaged drugs. Moreover, PTP-packaged drugs dispensed automatically from the PTP dispensing apparatus are transferred by the transporting mechanism to the chute also in an automatic fashion before being placed on the weighing scale. PTP-packaged drugs dispensed from the pharmaceutical product storage apparatus in a semi-automatic fashion are manually assembled on the worktable. After being inspected, the drugs are transferred to the chute by sliding on the work table before being placed on the weighing scale.

Thus, inspection by weighing is performed easily and efficiently. If drug preparation checkup by visual inspection is desired, the entire PTP-packaged drugs dispensed are returned to the work table before being checked.

Thus, according to the second PTP dispensing system, the automatic PTP dispensing apparatus and the semi-automatic pharmaceutical product storage apparatus sharing the task of accommodating PTP-packaged drugs are coordinated. A workplace for dispensing and inspecting PTP-packaged drugs is secured, and a weighing scale is provided exactly where the convenience of work is maximized. Accordingly, the second technical challenge mentioned above is accomplished.

Embodiments of the PTP dispensing apparatus and the pharmaceutical product storage apparatus for practicing the PTP dispensing system according to the sixth embodiment will be described.

A first PTP dispensing apparatus in the PTP dispensing system according to the sixth embodiment may employ the following specific structure. The PTP dispensing apparatus comprises: a large number of cassettes which align PTP-packaged or equivalently packaged drugs for storage so that the drugs are sequentially ejectable; a support which arranges and holds the cassettes; a descent guidance member which guides the drugs discharged (finally ejected) from the cassettes downward; and a collecting mechanism which collect the drugs, wherein each of the cassettes comprises: outer plates which accommodate drugs; a top frame which is provided above an open front and which prevents accommodated drugs from being falling forward; an inner plate which carries the accommodated drugs and advances the drugs when vibrated; a vibrating member which vibrates the inner plate; and a retention member which is provided in front of the open front and which retains the accommodated drug ejected (ejected in preparation for discharge) from the open front, wherein an activating mechanism, which acts on the retention member so as to discharge (finally eject) a retained drug toward the descent guidance member, is provided for each cassette so as to detect whether or not a drug is retained in the retention member and activate the vibrating member when a drug is not retained and stop activating the vibrating member when a drug is retained.

According to the first vibration-assisted ejection cassette, a large number of drugs such as PTP-packaged drugs can be aligned for storage in the cassette without falling down, by accommodating drugs in the drug accommodating space bounded by the outer plates, by arranging the drugs above the vibrating member in an upright position, and by allowing the accommodated drug at the head of the queue to lean against the top frame. When the inner plate is vibrated by the vibrating member, the accommodated drugs advance. Since the drug at the head of the queue is prevented from advancing by the top frame, the accommodated drugs are closely arranged. When the lower end of the drug at the head is thrust forward so as to be removed from the inner plate, the drug at the head is let fall and ejected from the open front. In association with this, the top end of the drug that replaces the ejected drug and brought to a position at the head is slightly inclined forward and caught by the top frame. When the lower end of the replacing drug is thrust forward so as to be removed from the inner plate, the drug is similarly let fall and ejected.

In this way, PTP-packaged drugs etc. are aligned for storage and ejected one by one by vibration. The cassette is implemented such that the top frame is provided above the open front so as to prevent the accommodated drug from falling forward, and the accommodated drugs are advanced as a result of vibrating the inner plate carrying the accommodated drugs and are let fall and ejected one by one from the open front. Thus, vibration operates to maintain the PTP-packaged drugs in alignment, advance the drugs while maintaining alignment thereof and sequentially eject the drugs. Since there is no need to provide a weighing member or a biasing member, the mechanism is simplified. Thus, the first vibration-assisted ejection cassette is configured for simple vibration-assisted ejection, in which PTP-packaged drugs etc. are aligned for storage, and the drugs are ejected sequentially and properly.

According to this vibration-assisted ejection cassette, the drug ejected from the open front is retained in the retention member in front. When the drug is retained, ejection of the next drug is prevented. When the drug is no longer retained in the retention member, the next drug is ejected by vibration and retained in the retention member. By ensuring that one of the drugs is detached from the queue and retained in the retention member, the drugs can be taken out one by one far more easily and reliably than when the drug is taken out from the head of the queue.

By arranging, in the support, simple vibration-assisted ejection cassettes capable of aligning PTP-packaged drugs etc. for storage and ejecting the drugs one by one properly, by providing an activating mechanism which acts on the retention member of the cassette so as to discharge and finally eject the retained drug thereby dispensing a necessary drug automatically, and by ensuring that the drugs ejected from the cassettes are collected by using free fall, a simple and inexpensive drug dispensing apparatus suitable for storing various PTP-packaged drugs and automatically dispensing a desired drug results.

A second PTP dispensing apparatus in the PTP dispensing system according to the sixth embodiment is a modification to the first PTP dispensing apparatus mentioned above, wherein in the top frame are formed: a first contact surface interfering with the top end of the drug at the head of a queue on the inner plate; and a second contact surface located in front of and below the first contact surface and interfering with the top end of the drug retained on the retention member, and wherein the activating mechanism axially rotates the retention member so that the retention member assumes one of two positions, i.e., a position to retain the accommodated drug ejected (ejected in preparation for discharge) from the open front, and a position to discharge (finally eject) the retained drug toward the descent guidance member.

In the second PTP dispensing apparatus, the retention member needs only to support the lower end of the retained drug because the first and second contact surfaces are formed on the top frame so that the frame is assigned the task of preventing the retained drug from falling forward as well as preventing the drugs aligned for storage from falling forward. This allows the retention member to be provided in a space in front of the open front and only in a space therebelow. For this reason, the retention member can be made compact while being capable of axial rotation. The activating mechanism, which acts on the retention member so as to cause it to assume two positions, may be of a simple structure.

A third PTP dispensing apparatus in the PTP dispensing system according to the sixth embodiment is a modification to the first or second PTP dispensing apparatus mentioned above, wherein each cassette is detachable to facilitate the job of replenishing drugs and replacing cassettes. For simplification of cassettes and prevention of failure, the apparatus is configured as follows. Specifically, the apparatus meets one of two requirements, one of the requirements being that the activating mechanism is provided in the support and not in the cassette, the other being that a vibration control circuit, for activating the vibrating member when a drug is not retained and stopping activating the vibrating member when a drug is retained, is provided in the support and not in the cassette.

A fourth PTP dispensing apparatus in the PTP dispensing system according to the sixth embodiment is a modification to any of the first through third PTP dispensing apparatuses mentioned above, wherein each cassette is configured as follows so that the PTP-packaged drugs etc. are easily aligned for storage when replenishing the drugs and sequentially ejected in a reliable and stable manner. That is, the outer plates bound at least the sides of a drug accommodating space, the top of the drug accommodating space being open so as to facilitate replenishment of a drug, and the front of the drug accommodating space being open so as to facilitate ejection of a drug. The inner plate is movably inserted to rest on the interior bottom of the drug accommodating space so as to be vibratably supported, the front end portion of the top face of the inner plate being formed as an ascending slope and the remaining portion being formed as a descending slope.

In this case, not only the front of the drug accommodating space bounded by the outer plates is open for drug ejection but also the top of the space is open for drug replenishment. Therefore, drugs can be aligned for storage easily at the time of replenishment. The inner plate is movably inserted to rest on the interior bottom of the drug accommodating space so as to be vibratable while carrying an accommodated drug. A major portion of the top face of the inner plate is formed as a descending slope so that the inner plate when vibrated advances the accommodated drug, and the front end portion of the top face of the inner plate is formed as an ascending slope so that the drug is prevented from being accelerated unnecessarily and advanced substantially at a regular speed. Accordingly, vibration of the inner plate properly operates to maintain the PTP-packaged drugs in alignment, advance the drugs while maintaining alignment thereof and sequentially eject the drugs without a weighing member or a biasing member.

A first pharmaceutical product storage apparatus in the PTP dispensing system according to the sixth embodiment may employ the following specific structure. That is, the apparatus may comprise: a large number of containers which accommodates pharmaceutical products; a storing unit which holds the containers in a two-dimensional array so that the containers are drawable in a forward direction; and a large number of container opening mechanisms, each of the mechanisms being provided behind the associated container so as to advance the associated container, wherein the mechanism is of a type with reduced distance in driving, and a light projecting member (light emitting member) for projecting light passing through a space in front of at least some of the containers in a pushed-back state are provided, and a visualizing means for directing the projected light forward is formed in or attached to the front end of each of the containers.

The phrase "with reduced distance in driving" means that the distance in which the opening mechanism advances the container is shorter than the depth (i.e., the longitudinal size) of the container. Preferably, the distance in driving is less than half of the depth. More preferably, the distance is as long as the longitudinal length of the part of the container identified as being the front end.

In the first pharmaceutical product storage apparatus, as the container selected for retrieval of a pharmaceutical product is automatically advanced by the container opening mechanism, the front end of the container is projected out of the storing unit. The light projected by the light projecting member impinges upon the front end so that the light is directed forward by the visualizing mean. Thus, the container selected for retrieval is illuminated. The same is true of the other containers selected for retrieval. It is ensured that each one of the containers is illuminated. The containers placed to face the same line of projected light share one light projecting member and therefore cannot be illuminated at the same time. As long as applications requiring simultaneous illumination are avoided, no inconvenience is presented if the number of light projecting members is smaller than the number of containers.

The visualizing means for improving visibility by changing the direction of light is implemented at a lower cost than the light projecting member, by introducing a known light guiding member (see patent document No. 7), an appropriate reflective member or a diffusing member, or by treating the surface to form a reflective surface or a diffusing surface.

Thus, according to the first pharmaceutical product storage apparatus, the cost is reduced while maintaining convenience, by reducing the distance in driving by the container opening mechanism and ensuring at the same time that the containers are illuminated by the light projecting members fewer in number.

A second pharmaceutical product storage apparatus in the PTP dispensing system according to the sixth embodiment is a modification to the first pharmaceutical product storage apparatus mentioned above, wherein the container opening mechanism is provided with an eccentric cam fitted to a motor and the rotation shaft thereof.

The cost is reduced satisfactorily by using mass-produced products available on the market to implement container opening mechanisms with reduced distance in driving.

A third pharmaceutical product storage apparatus in the PTP dispensing system according to the sixth embodiment is a modification to the first or second pharmaceutical product storage apparatus, wherein a front plate of the container is transparent, a slope is formed immediately behind the front plate, and the visualizing means is a name plate placed on the slope.

In this case, the visualizing means is implemented by placing the name plate on the slope inside the container. A plate body capable of reflecting and diffusing light at its surface is employed as the name plate, which also serves as the visualizing member. Since ordinary white paper serves the purpose, the name plate can be implemented conveniently and inexpensively. If inexpensive, high-intensity light emitting devices are available, simultaneous illumination of multiple containers aligned to share the projected light will be realized by modifying the apparatus such that the reflectance of the visualizing means is lowered, and that part of the light is transmitted therethrough and travels straight ahead.

A fourth pharmaceutical product storage apparatus in the PTP dispensing system according to the sixth embodiment is a modification to any one of the first through third pharmaceutical product storage apparatuses mentioned above, wherein a bottom plate of the container is transparent, and a light receiving member is provided at the destination of projection of light from the light projecting member so that the pulled-out or pushed-back condition of the container is determined by referring to light reception state.

In the fourth pharmaceutical product storage apparatus, the projected light is blocked if the container is projected from the storing unit but is not blocked if the container recedes into the storing unit. Since the light reception state varies depending on whether the container is projected or not, it is possible to automatically determine whether the container is automatically or manually pushed back, by referring to the light reception state of the light receiving member. Like the light projecting members, the light receiving members are shared by multiple containers. Therefore, the number of light receiving members may be smaller than the containers.

Specific embodiments of the PTP dispensing system according to the sixth embodiment will be described using illustrative embodiments 6-1 through 6-4.

Figure 42:
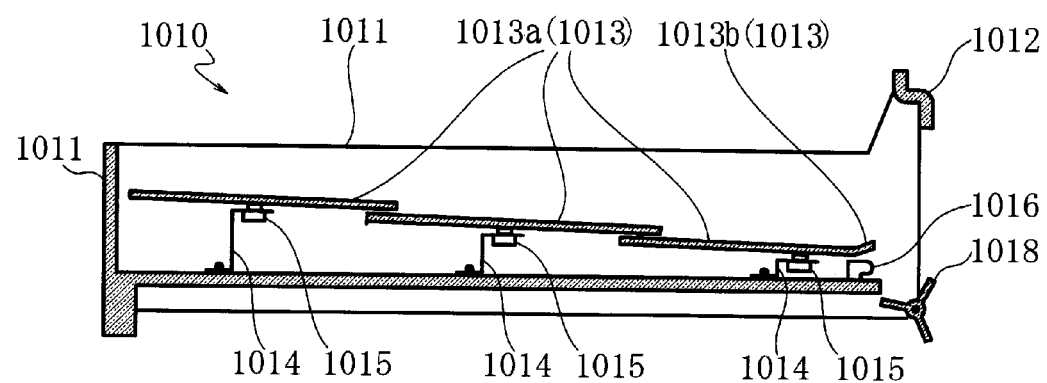
FIG. 42 is a sectional left side view of a cassette of a PTP dispensing apparatus according to an illustrative embodiment 6-2 of the sixth embodiment.
Figure 43A:
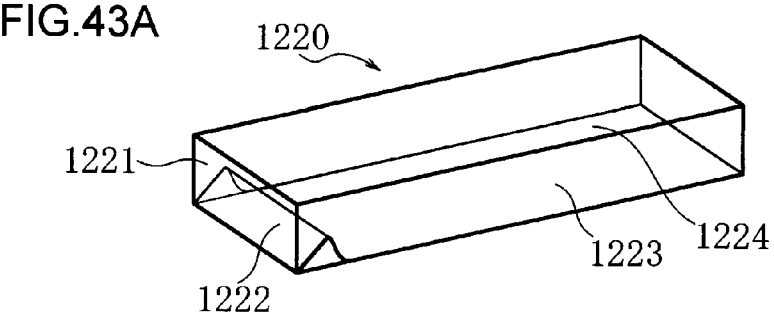
FIGS. 43A-43C show the structure of a pharmaceutical product storage apparatus according to an illustrative embodiment 6-3 of the sixth embodiment.
Figure 43B:
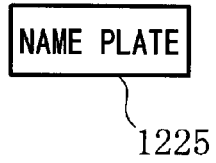
Figure 44A:
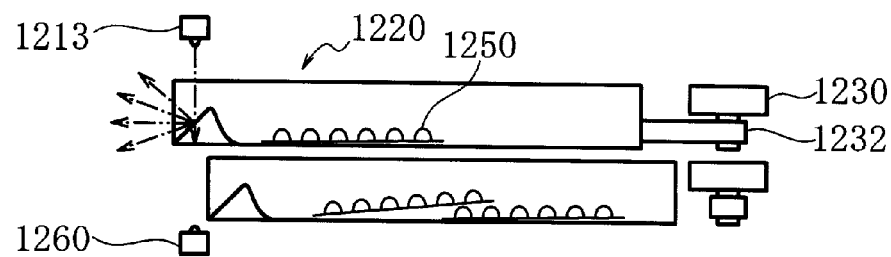
FIGS. 44A-44C show the structure of a pharmaceutical product storage apparatus according to an illustrative embodiment 6-4 of the sixth embodiment.
Figure 44B:
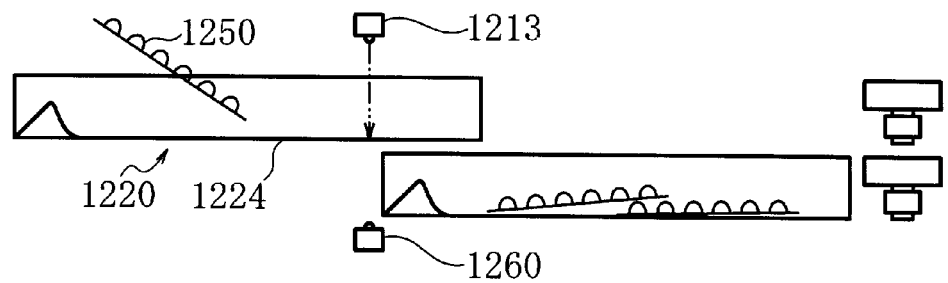
Figure 44C:
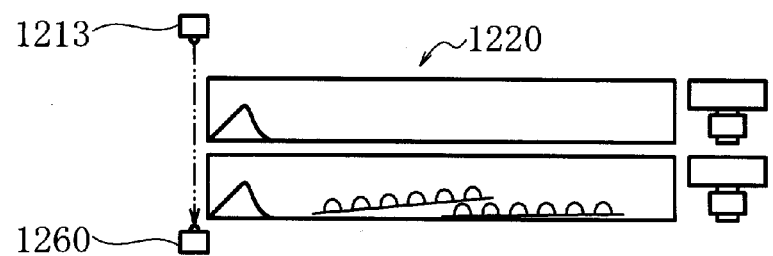

The illustrative embodiment 6-1 shown in FIGS. 34A-41B is an embodiment of the first and second PTP dispensing system, the first through fourth PTP dispensing apparatuses, and the first and second pharmaceutical product storage apparatuses mentioned above. The illustrative embodiment 6-2 shown in FIG. 42 is a variation to the illustrative embodiment 6-1. The illustrative embodiment 6-3 shown in FIGS. 43A-43B is an embodiment of the third pharmaceutical product storage apparatus mentioned above. The illustrative embodiment 6-4 shown in FIGS. 44A-44C is an embodiment of the fourth pharmaceutical product storage apparatus mentioned above.

In the illustration, the details of support members such as frames, fasteners such as bolts, connectors such as hinges, detailed electric and electronic circuits such as motor drivers are omitted for brevity, highlighting those elements necessary to explain the embodiment and related elements.

Illustrative Embodiment 6-1

Figure 34A:
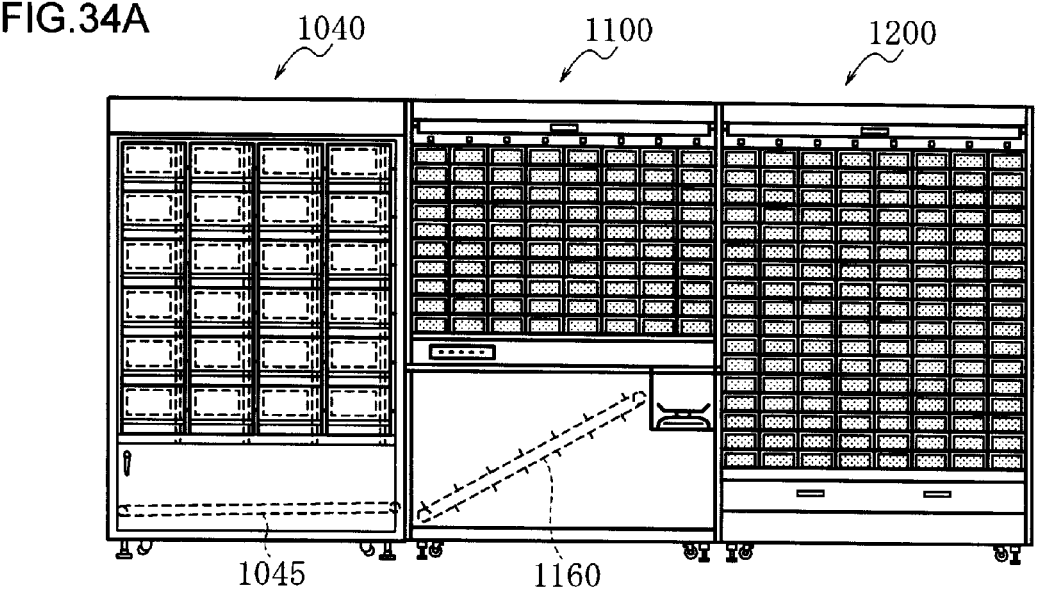
FIGS. 34A-34C show the structure of a PTP dispensing system according to an illustrative embodiment 6-1 of a sixth embodiment.
Figure 34B:
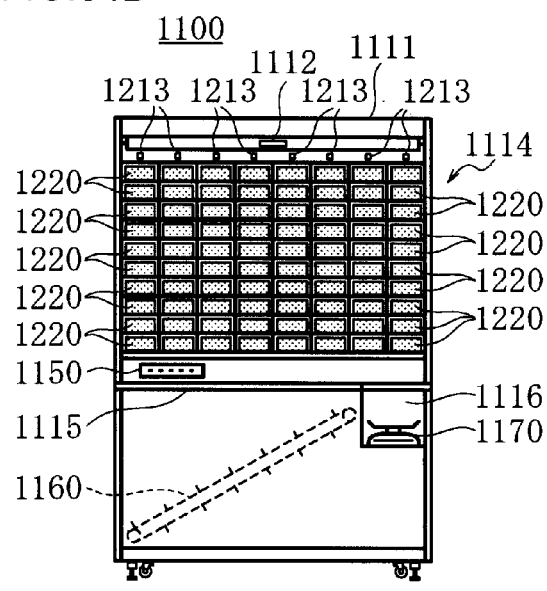
Figure 34C:
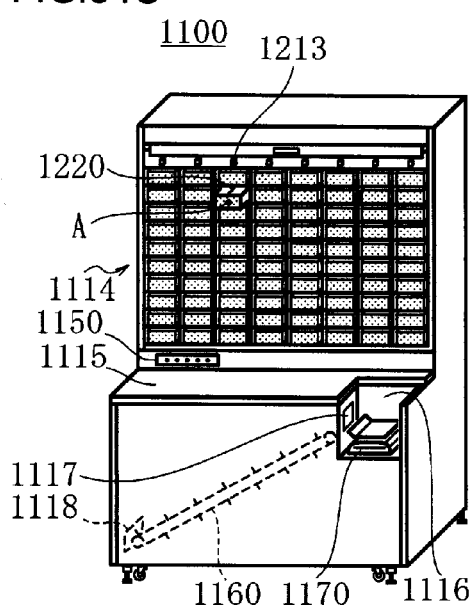
Figure 35A:
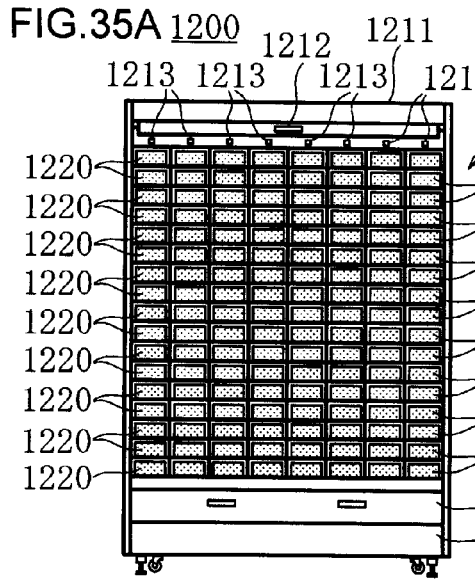
FIGS. 35A-35F show the mechanical structure of a pharmaceutical product storage apparatus according to the illustrative embodiment 6-1.
Figure 35B:
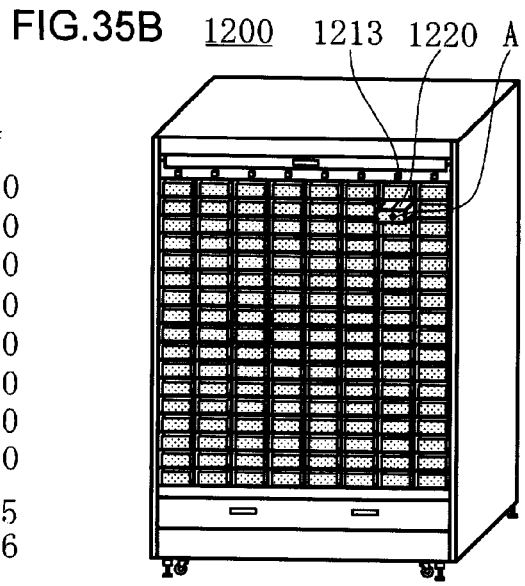
Figure 35C:
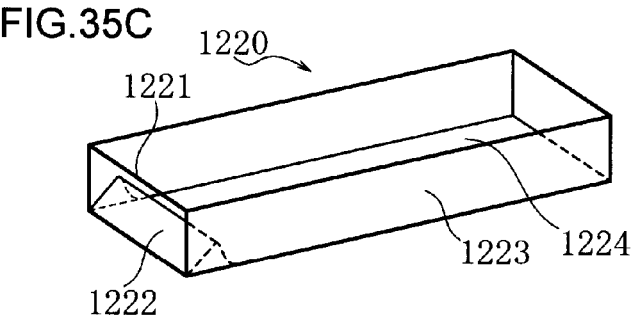
Figure 35D:
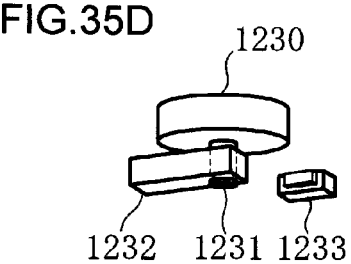
Figure 35E:
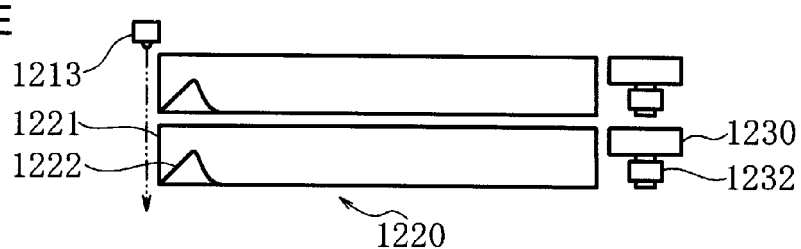
Figure 35F:
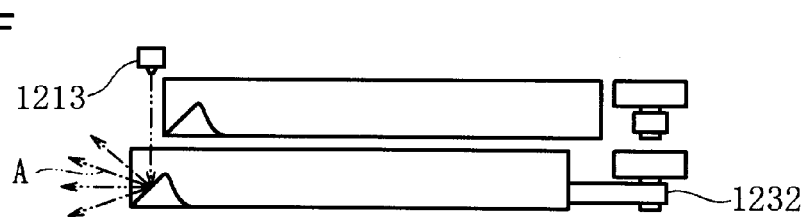
Figures 36A, 36B, 36C:
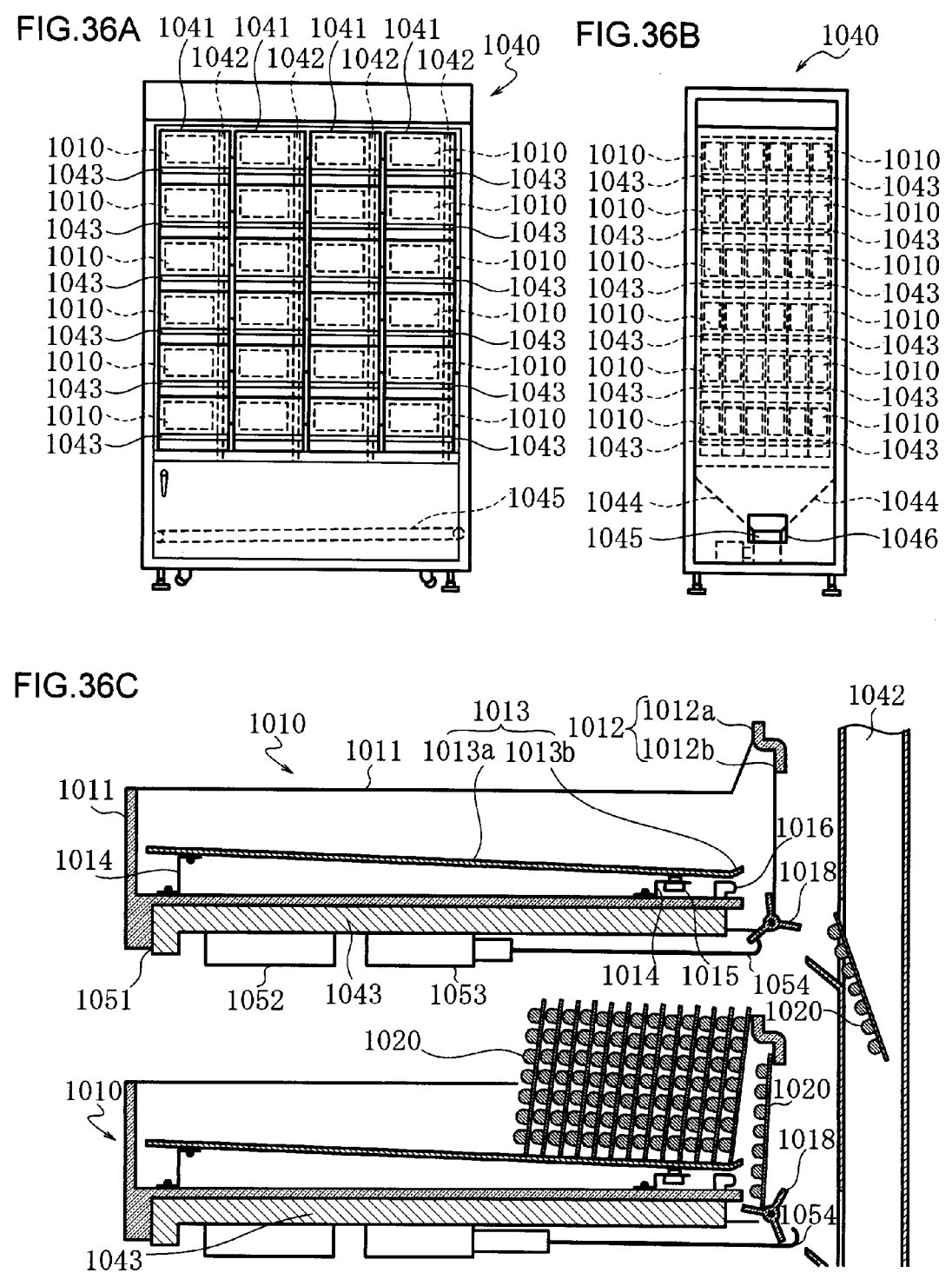
Figure 37:
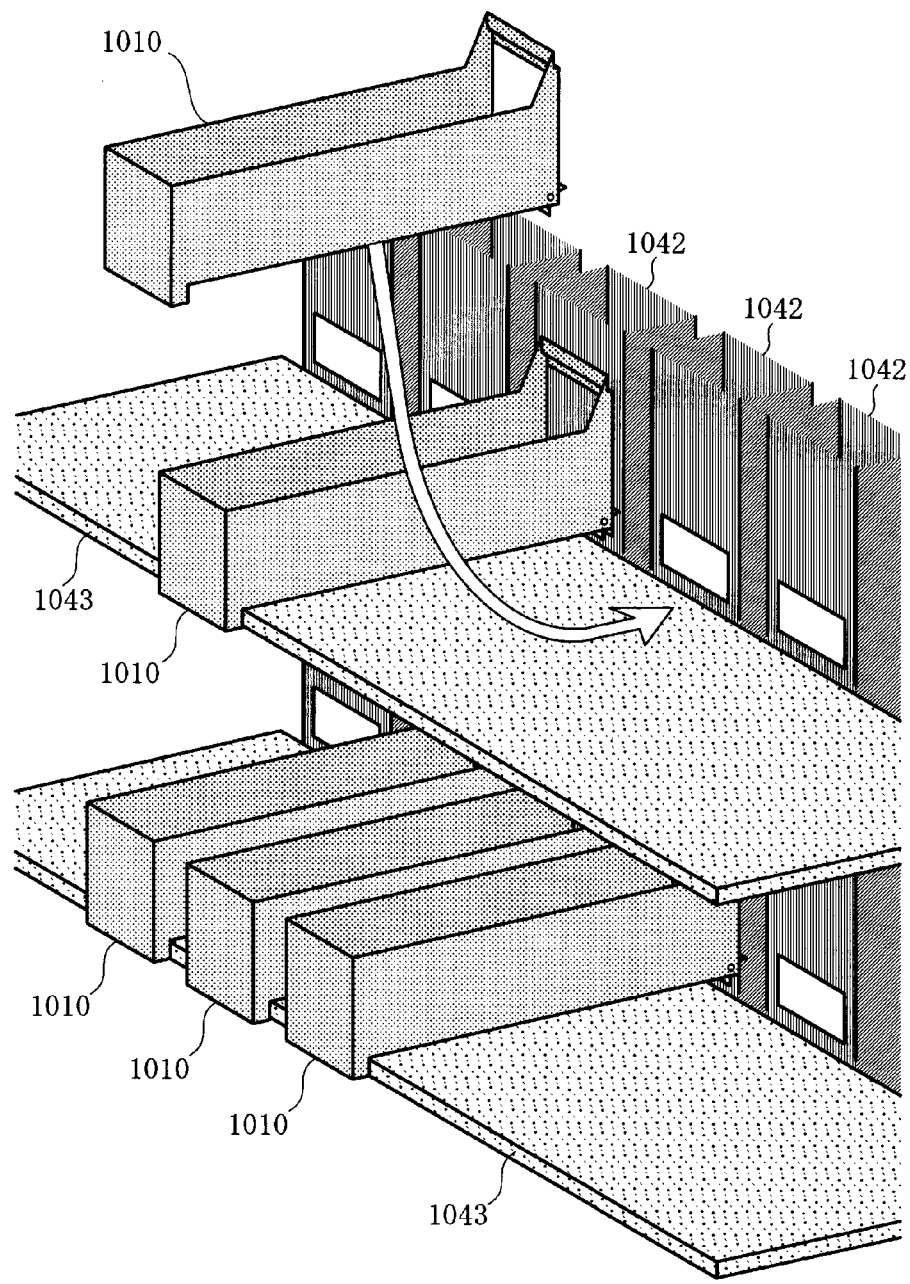
FIG. 37 is a perspective view of an essential part including several cassettes.
Figure 38:
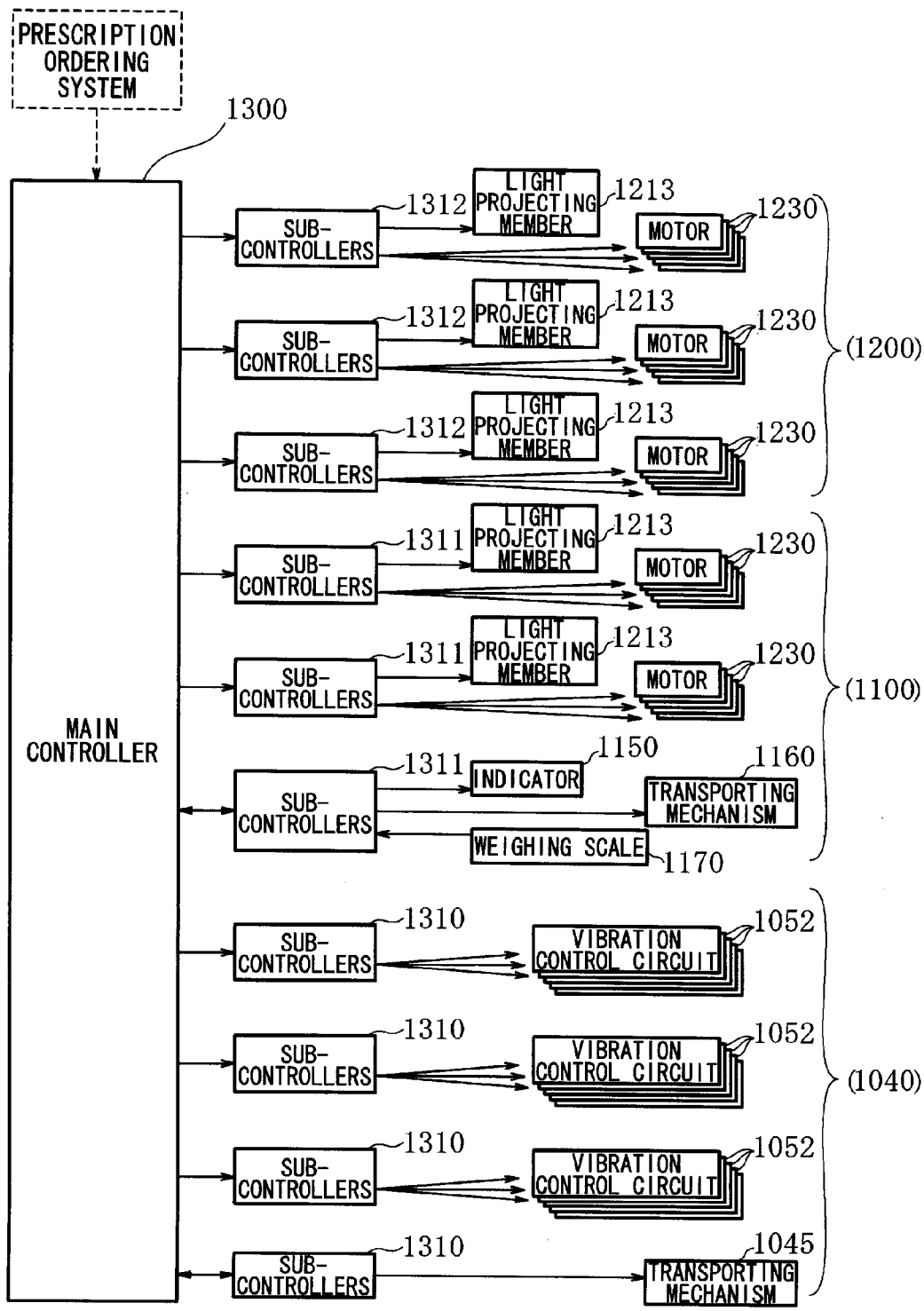
FIG. 38 is a schematic block diagram of a controller according to the illustrative embodiment 6-1.

The specific structure of the PTP dispensing system according to the illustrative embodiment 6-1 will be described with reference to the associated drawings. FIG. 34A is a front view showing the whole system. FIGS. 34B and 34C show the structure of a pharmaceutical product storage apparatus 1100, where FIG. 34B is a front view and FIG. 34C is a perspective view. Further, FIGS. 35A-35F show the mechanical structure of the pharmaceutical product storage apparatus 1200, where FIG. 35A is a front view showing the whole apparatus; FIG. 35B is a perspective view of the whole apparatus; FIG. 35C is a perspective view of the container 1220; FIG. 35D is a perspective view of a container opening mechanism 1230-1233; and FIGS. 35E and 35F are right side views of an essential part. FIGS. 36A-36C show the structure of the PTP dispensing apparatus 1040, where FIG. 36A is a front view of the whole apparatus; FIG. 36B is a right side view thereof; FIG. 36C is a sectional front view of an essential part including two cassettes 1010 (longitudinal sectional left side views of the cassettes); and FIG. 37 is a perspective view of an essential part including several cassettes 1010. FIG. 38 is a schematic block diagram of a controller.

The PTP dispensing system comprises a PTP dispensing apparatus 1040 and a pharmaceutical product storage apparatus 1100 and a pharmaceutical product storage apparatus 1200. The PTP dispensing apparatus holds an array of a large number of cassettes for aligning PTP-packaged or equivalently packaged drugs for storage so that the drugs are sequentially ejectable, the PTP dispensing apparatus automatically discharging the drugs from the cassettes and guiding the drugs downward for collection. The pharmaceutical product storage apparatus 1100 holds a two-dimensional array of a large number of containers accommodating pharmaceutical products so that the containers can be drawn forward, the pharmaceutical product storage apparatus 1100 being configured to advance the containers by using container opening mechanisms provided behind the containers. The pharmaceutical product storage apparatus 1200 holds a two-dimensional array of a large number of containers accommodating pharmaceutical products so that the containers can be drawn forward, the pharmaceutical product storage apparatus 1200 being configured to advance the containers by using container opening mechanisms provided behind the containers.

A transporting mechanism 1160 and a work table 1115 are provided in the pharmaceutical product storage apparatus 1100 but not in the pharmaceutical product storage apparatus 1200.

A transporting mechanism 1045 provided on the bottom of the housing interior of the PTP dispensing apparatus 1040, a transporting mechanism 1160 provided in the lower half of the housing interior of the pharmaceutical product storage apparatus 1100 constitute a continuous transporting channel that runs across the PTP dispensing apparatus 1040 and the pharmaceutical product storage apparatus 1100.

A description will now be given of the respective elements sequentially. More specifically, the structure of the pharmaceutical product storage apparatus 1100 will be described with reference to FIGS. 34A-34C, the structure of the pharmaceutical product storage apparatus 1200 will be described with reference to FIGS. 35A-35F, the structure of the PTP dispensing apparatus 1040 will be described with reference to FIGS. 36A-FIG. 37, and the structure of a control device will be described with reference to FIG. 38.

A pharmaceutical product storage apparatus 1100 (see FIGS. 34B and 34C) is configured such that a shutter 1112 is provided in the topmost part of a housing 1111. The upper half of the housing 1111 that can be easily reached by hand is occupied by a storing unit 1114. The storing unit 1114 is partitioned into grids so as to form a multiple-tier and multiple-column array (in the figure, 10 tiers and 8 columns) of drawer frames. The interior surfaces of the drawer frames are finished to smooth surfaces with low friction so as the frames are capable of holding a two-dimensional array of containers 1220 such that the containers can be pulled or pushed forward. Each of the drawer frames is provided with the container opening mechanism 1230-1233. The mechanism 1230-1233 is placed behind the container 1220 and cannot be viewed from the front. A series of light projecting members 1213 are provided at the top end of the front of the storing unit 1214. A detailed description of these elements will be omitted since they are also provided in the pharmaceutical product storage apparatus 1200.

The lower half of the housing 1111 of the pharmaceutical product storage apparatus 1100 is used as a work area for jobs that require operator attendance such as the job of dispensing PTP-packaged drugs etc. and the monitoring job. More specifically, a work table 1115 of a plate shape with a flat top is provided to extend horizontally halfway between the top and bottom of the housing 1111. Immediately above the work table 1115 and toward the rear end thereof is provided an indicator 1150 which is viewable. At the end of the work table 1115 farthest away from the PTP dispensing apparatus 1040 is formed a chute 1116 by cutting a portion of the work table 1115. A weighing scale 1170 is provided in the chute 1116, and a transporting mechanism 1160 is built in below the work table 1115.

The chute 1116 is sufficiently deeper than the height of the weighing scale 1170. A discharge opening 1117 is formed halfway between the work table 1115 and the weighing dish of the weighing scale 1170. At the side of the housing 1111 facing the PTP dispensing apparatus 1040 is formed an incoming port 1118. The transporting mechanism 1160 extends diagonally upward from the incoming port 1118 toward the discharge opening 1117. Drugs dispensed by the PTP dispensing apparatus 1040 are accepted by the incoming port 1118 and transported to the discharge opening 1117 before being fed to the chute 1116. The 1150 is implemented by, for example, a small liquid crystal panel capable of displaying the number of drugs to be dispensed, breaking it down to the number of PTP packages and the number of pieces cut from the package. A requirement for the weighing scale 1170 is that it provides sufficient precision and the weighing dish faces upward. In this example, an electronic weighing scale capable of transmitting a weight value is employed.

A pharmaceutical product storage apparatus 1210 (see FIGS. 35A and 35B) is configured such that a shutter 1212 is provided in the top part of a housing 1211, and a drawer 1215 and electric equipment 1216 are provided in the lower part of the housing 1211. The greater part of the housing 1211 that can be easily reached by hand, i.e., the middle part thereof, is occupied by a storing unit 1214. Like the storing unit 1114, the storing unit 1214 is partitioned into grids so as to form a multiple-tier and multiple-column array (in the figure, 17 tiers and 8 columns) of drawer frames. The interior surfaces of the drawer frames are finished to smooth surfaces with low friction so that the frames are capable of holding a two-dimensional array of containers 1220 such that the containers can be pulled or pushed forward. Each of the drawer frames is provided with the container opening mechanism 1230-1233. The mechanism 1230-1233 is placed behind the container 1220 and cannot be viewed from the front. A series of light projecting members 1213 are provided at the top end of the front of the storing unit 1214.

The container 1220 (see FIG. 35C) is a longitudinally elongated box with an open top so that the container can accommodate pharmaceutical products and can be drawn. A front plate 1221 is transparent. In the illustrated example, a side plate 1223 and a bottom plate 1224 are non-transparent. At the front end of the container 1220 (more specifically, in a space inside the container 1220 immediately behind the front plate 1221) is formed a slope 1222 by forming a bank on the bottom plate 1224 or by fitting a triangle pole member on its side to the bottom plate 1224. The slope 1222 is finished to a diffusely reflecting surface such as that of frosted glass and faces diagonally upward an angle of inclination of about 30°-60° (in FIGS. 35E and 35F, about 45°) with respect to the horizon. Therefore, the slope serves as a visualizing means for receiving the light projected vertically downward (see FIG. 35F) and directing the light forward as reflected and diffused light A.

The mechanism 1230-1233 (see FIG. 35D) is provided with a commercially available electric motor 1230 of a flat type, an eccentric cam 1232 fitted to its rotation shaft 1231, and a origin sensor 1233 such as a push switch. When the large-diameter portion of the eccentric cam 1232 is in contact with the origin sensor 1233 and is at rest (see FIG. 35E), the container 1220 can fully recede into and is accommodated in the storing unit 1214. When the rotation shaft 1231 of the motor 1230 is rotated halfway (see FIG. 35F), the large-diameter portion of the eccentric cam 1232 presses the rear end of the container 1220 so as to advance the container 1220. The amount of advance, i.e., the distance in which the container is driven forward, is 2-3 cm, which is sufficient to project the slope 1222 from the drawer frame and allow a user to grip the front plate 1221. As such, the distance is many times smaller than the depth of the container 1220.

The light projecting member 1213 is implemented by, for example, a narrow-directivity red light-emitting diode (LED) emitting a beam of light. The member 1213 is provided for each column of drawer frames of the storing part 1214 so as to project light vertically downward. Light is projected through a space in front of those multiple containers 1220 in a column that are in a pushed-back position (see the chain double-dashed line of FIG. 35E), and the front end of the container 1220 advanced by the eccentric cam 1232 of the mechanism 1230-1233 is projected (see FIGS. 35B and 35F). Due to this arrangement and the fact that the containers 1220 are arranged as described above, the light receiving portion of the slope 1222 is illuminated by the reflected and diffused light A. The light projecting member 1213 and the motor 1230 mentioned above are operated in accordance with automatic control by the main controller 1330.

The PTP dispensing apparatus 1240 (see FIGS. 36A and 36B) generally comprises three tiers and is provided with: drug storages on the top and middle tiers accommodating a large number of cassettes 1010; and a collecting and transporting unit on the bottom tier accommodating a collecting mechanism 1044 for collecting drugs 1020 ejected from the cassettes 1010 and a transporting mechanism 1045 for transporting the drugs 1020 thus collected to a dispensing outlet 1046.

The collecting mechanism 1044 is implemented by a tilted plate or a hopper member wide open at the top part and narrowed toward the lower part. The transporting mechanism 1045 is implemented by a belt conveyor etc. and lies below the collecting mechanism 1044. The transporting mechanism 1045, like the cassette 1010 described below, is operated in accordance with automatic control by the main controller 1330.

A total of 144 cassettes are provided in the drug storage of the PTP dispensing apparatus 1040 with six, four and six cassettes arranged in vertical, horizontal and depth directions, respectively. The drug storage is divided into four parts horizontally and the cassettes are fitted to respective drawer racks 1041. The drawer racks 1041 are fitted to the housing via appropriate drawer rails etc. Each of the drawer racks 1041 is adapted to be drawn forward (in FIG. 36A, in a direction facing a viewer of the figure; and in FIG. 36B, leftward) for attachment and detachment of a total of 36 cassettes 1010, 6 arranged vertically and 6 in the depth direction. Each drawer rack 1041 is provided with six tiers of rack-like support members 1043. Each support member 1043 is adapted to accommodate 6 cassettes 310 arranged from front to back. Each drawer rack 1041 has a built-in, vertically extending descent guidance duct 1042 to guide the drug 1020 ejected from the cassette 1010 downward.

The portion of the support member 1043 (see FIG. 36C and FIG. 37) where the cassette 1010 is fitted is provided with a connector 1051, a vibration control circuit 1052, a solenoid 1053 and a hook member 1054 to enable control by the main controller 1300 when the cassette 1010 is fitted. An appropriate cassette engaging means and a means for releasing the cassette (not shown) are also provided to attach or detach the drug 1020 as desired.

The cassette 1010 (see FIG. 36C) is a vibration-assisted ejection cassette comprising outer plates 1011, a top frame 1012, an inner plate 1013, elastic support members 1014, a vibrating member 1015, an ejection detecting member 1016 and a retention member 1018. The cassette 1010 is designed to align the PTP-packaged drugs 320 for storage in an upright position in a horizontal queue, and to eject the drugs 1020 one by one in the order of arrangement.

To describe the cassette in further detail, the outer plates 1011 form a box in which is secured a drug accommodating space for aligning the drugs 1020 for storage. The outer plates 1011 bound at least the sides of the space. In the illustrated example, the back (read face; in the figure, left end face) and the bottom (underside) are also bounded by the outer plates 1011. The outer plates 1011 may be integrally formed of transparent resin. Alternatively, plates may be formed individually and built to form a box by being adhesively attached to each other. The drug accommodating space inside is substantially cuboid in shape and longitudinally (in the figure, sideways) elongated. Substantially the entirety of the top of the space is open to facilitate replenishment of drugs. The front of the cassette (in the figure, right end face) is wide open to facilitate ejection of drugs. The width of the open front is greater than the width of the drug 1020. For example, the open front has a width of 10-100 mm. The height of the open front is slightly less than the length of the drug 1020. For example, the open front has a height of 100-200 mm.

The top frame 1012 is provided above the open front of the drug accommodating space defined by the outer plates 1011 and is a horizontal-bridging member extending horizontally. The top frame 1012 operates to interfere with the top end of the drug 1020 at the head of the queue to prevent the drug from falling forward. A first contact surface 1012a and a second contact surface 1012b are formed on the rear surface (in the figure, left surface) of the top frame 1012. The first contact surface 1012a interferes with the top end of the drug at the head of the queue of drugs aligned for storage on the inner plate 1013. The second contact surface 1012b is located in front of and below (in the figure, to the right of and diagonally below) the surface 1012a and interferes with the top end of the drug retained on the retention member 1018. The step between the contact surfaces 1012a and 1012b is slightly larger than the thickness of the drug 1020. For example, the step is about 1 mm-20 mm.

The inner plate 1013 carries the drug 1020 and advances the same when vibrated. The inner plate 1013 comprises a descending slope 1013a and an ascending slope 1013b in order to stabilize the advance, the descending slope 1013a occupying the majority of the plate 1013 and the ascending slope 1013b occupying a small portion of the plate 1013 toward the front end thereof. For example, the ascending slope 1013b has a length of several mm in the longitudinal direction of the cassette (in the figure, sideways) and upward sloping (in the figure, left-to-right upward sloping) at an angle of approximately 15°-3° with respect to the horizon. The descending slope 1013a has a length of 10-1000 mm longitudinally and is downward sloping (in the figure, left-to-right downward sloping) at an angle of approximately 5°-10° with respect to the horizon. Typically, the inner plate 1013 has a width of 10-100 mm.

The inner plate 1013 in the stated condition of inclination is movably inserted to rest on the interior bottom of the drug accommodating space. The plate 1013 is connected to the bottom plate of the outer plates 1011 via the multiple (in the figure, two) elastic support members 1014 in order to maintain the inclined condition. The elastic support member 1014 is implemented by, for example, a thin metal plate or a piano wire. The member 1014 is easily elastically deformable to support the inner plate 1013 vibratably.

The vibrating member 1015 is implemented by an inexpensive, mass-produced vibration motor with an eccentric rotor built in, for example, a cell phone. The member 1015 is provided closer to the inner plate 1013 than the elastic support member 1014 or provided on the underside of the inner plate 1013 so as to vibrate the inner plate 1013.

The retention member 1018 is provided in front of and below (in the figure, to the lower right of) the open front of the drug accommodating space defined by the outer plates 1011. The retention member 1018 is designed to catch and retain the drug 1020 at the head of the queue of drugs aligned for storage ejected from the open front. For this purpose, the retention member 1018 and the top frame 1012 retain a drug in cooperation with each other such that the member 1018 supports the lower end of the drug 1020, and the second contact surface 1012b of the top frame 1012 catches the top end of the retained drug. The retention member 1018 is secured to the outer plates 1011 such that the member lies horizontally and is axially rotatable (in the figure, the rotation shaft lies in a direction perpendicular to the paper). The member 1018 is allowed to rotate bidirectionally by a predetermined angle so as to be positioned to retain a drug or discharge one.

When the member 1018 assumes a position to retain a drug (see the cassette of the lower diagram of FIG. 36C), a concave part of the member 1018 for supporting the lower end of a drug is made to face upward in order to retain an accommodated drug ejected from the open front of the cassette in preparation for discharge. When the member 1018 assumes a position to discharge a drug (see the cassette of the upper diagram of FIG. 36C), the concave part of the member 1018 is tilted toward the descent guidance duct 1042 until the lower end of the drug slides down, in order to discharge the retained drug toward the descent guidance duct 1042. Further, the distance between the front end of the inner plate 1013 and the opposite face of the retention member 1018 is slightly greater than the thickness of the drug 1020 so as to properly limit the number of drugs 1020 retained in the retention member 1018 to one.

The ejection detecting member 316 is implemented by, for example, a reflective photosensor. In the illustrated example, the member 1016 is provided on the bottom plate of the outer plates 1011 and below the inner plate 1013 so as to output a signal which turns on and off according to whether the drug 1020 is located in the retention member 1018, allowing detection of reflected light, or the drug 1020 is not located in the retention member 1018, not allowing detection of reflected light.

The vibration control circuit 1052 is implemented by a one-chip microcomputer and/or a logic circuit. The circuit 1052 receives a detection signal from the ejection detecting member 1016 via the connector 10351 so as to control the operation of the vibrating member 1015. When the detection result from the ejection detecting member 1016 indicates that the drug is not retained, the control circuit 1052 activates the vibrating member 1015. When the detection result from the ejection detecting member 1016 indicates that the drug is retained, the control circuit 1052 stops activating the vibrating member 1015.

The solenoid 1053 and the hook member 1054 form an actuator mechanism. One end of the hook member 1054 is fitted to the advancing and receding member of the solenoid 1053 and the other end of the hook member 1054 is bent into a hook and extends below the retention member 1018, so as to operate on the retention member 1018 and discharge the retained drug toward the descent guidance duct 1042. As the solenoid 1053 is driven and the advancing and receding member recedes (in the figure, moved leftward) accordingly, the hooked end of the hook member 1054 is engaged with the lower part of the retention member 1018 so as to axially rotate the retention member 1018, bringing the retention member 1018 from a position for drug retention to a position for drug discharge. When the solenoid 1053 is no longer driven, the advancing and receding member advances (in the figure, moved rightward) due to snapping force of a spring etc. (not shown), bringing the retention member 1018 from a position for drug discharge to a position for drug retention and disengaging the retention member 1018 from the hook member 1054.

The control device (see FIG. 38) comprises a group of processors comprising: a main controller 1300 implemented by a programmable personal computer, a microprocessor system or the like; a large number of subcontrollers 1310, 1311 and 1312 implemented by, for example, one-chip microcomputers. The processors are in star connection or connected via LAN, with the main controller 1300 at the center. The main controller 1300 may be provided in an operation console. Alternatively, the controller 1300 may be stored in the lower part of the pharmaceutical product storage apparatus 1100 or in the upper part of the PTP dispensing apparatus 1040. In the illustrated example, the controller 1300 is stored in the electric equipment 1216 of the pharmaceutical product storage apparatus 1200 along with a power supply (not shown). The subcontroller 1310 is provided in the PTP dispensing apparatus 1040, the subcontroller 1311 is provided in the pharmaceutical product storage apparatus 1100, and the subcontroller 1312 is provided in the pharmaceutical product storage apparatus 1200.

The main controller 1300 controls the PTP dispensing apparatus 1040 to select and dispense a drug 1020 in accordance with pharmaceutical product dispensing information. The controller 1300 controls the pharmaceutical product storage apparatuses 1100 and 1200 to select one or a plurality of a large number of containers 1220 and activate one or a plurality of mechanisms 1230-1233 corresponding to the selection. In order to obtain pharmaceutical product dispensing information designating pharmaceutical products to be dispensed, the main controller 1300 is configured to receive, from a host computer such as a prescription order entry system indicated by broken lines, prescription data or drug preparation instruction data derived therefrom, or to receive an instruction for prescription from an input device (not shown).

A plurality of the motors 1230 and the light projecting members 1213 of the pharmaceutical product storage apparatus 1200 are connected to the main controller 1300 via the subcontroller 1312. A plurality of the motors 1230 and the light projecting members 1213 of the pharmaceutical product storage apparatus 1100 are connected to the main controller 1300 via the subcontroller 1311. Further, the indicator 1150, the transporting mechanism 1160 and the weighing scale 1170 are connected to the main controller 1300 via the subcontroller 1311. A plurality of the vibration control circuits 1052 of the PTP dispensing apparatus 1040 are connected to the main controller 1300 via the subcontroller 1310. Further, the transporting mechanism 1045 is connected to the main controller 1300 via the subcontroller 1310.

The mode of using the PTP dispensing system according to the illustrative embodiment 6-1 and its operation will be described with reference to the drawings.

Figure 39A:
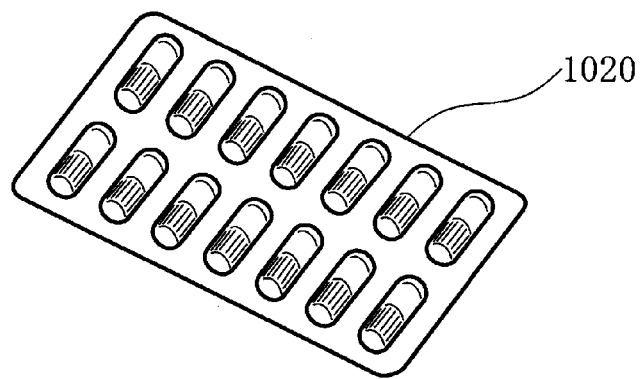
FIG. 39A is a perspective view showing the appearance of a PTP-packaged drug.
Figure 39B:
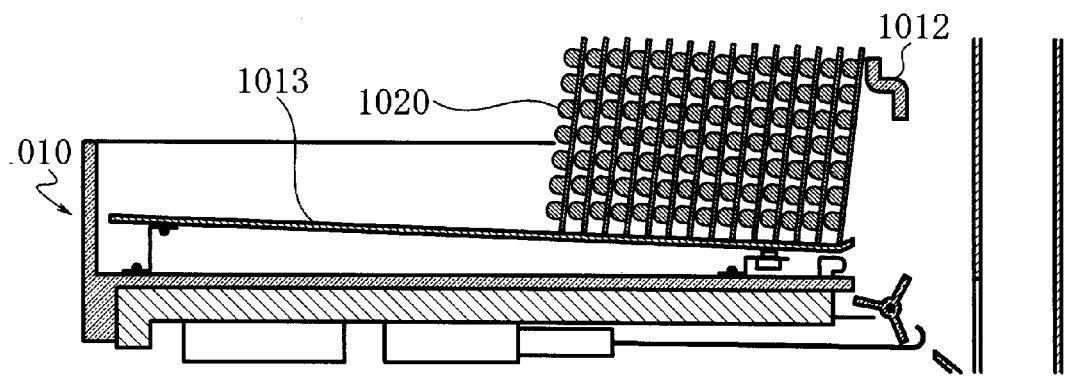
FIGS. 39B-39C are sectional front views of an essential part including one cassette.
Figure 39C:
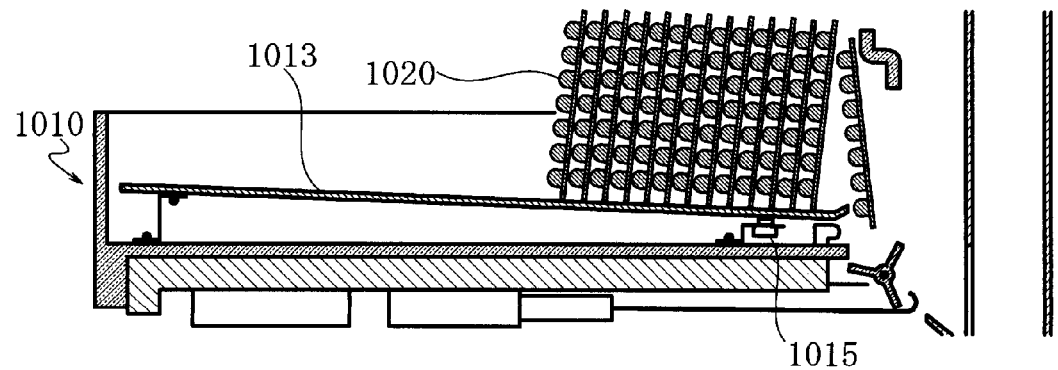
Figure 40A:
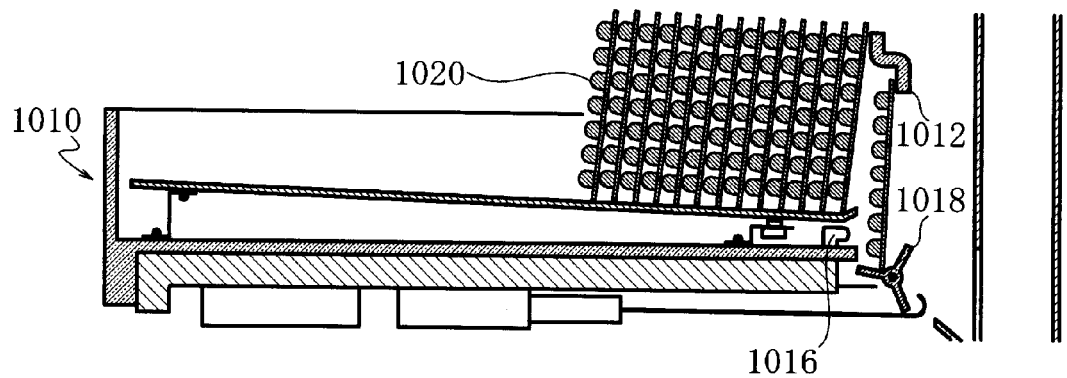
FIGS. 40A-40C are sectional front views of an essential part including one cassette.
Figure 40B:
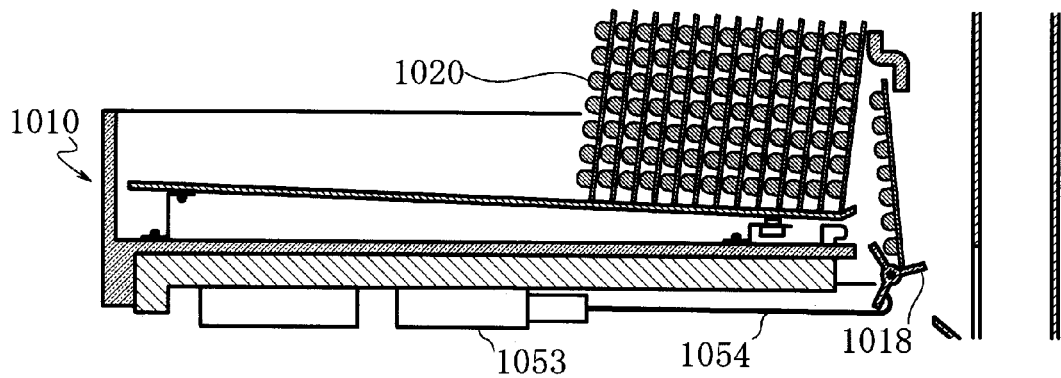
Figure 40C:
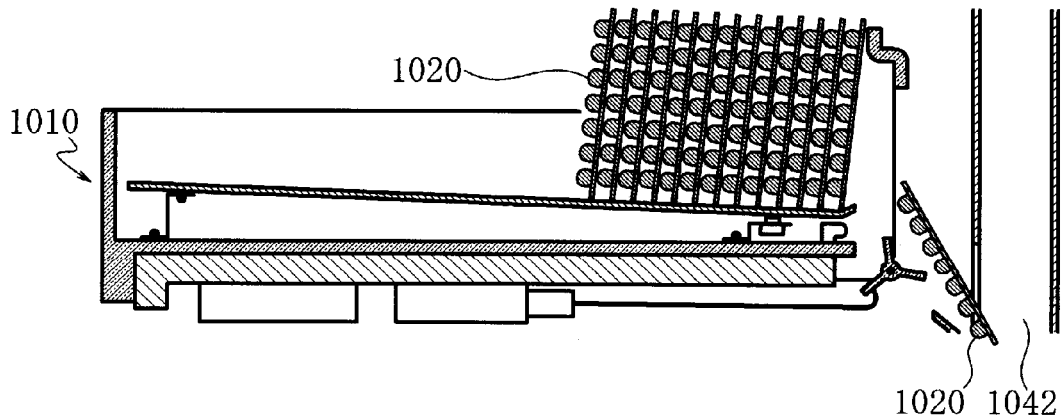
Figure 41A:
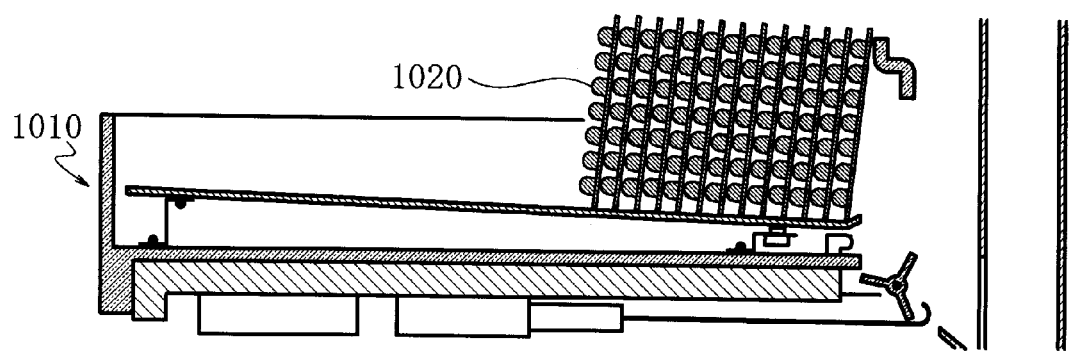
Figure 41B:
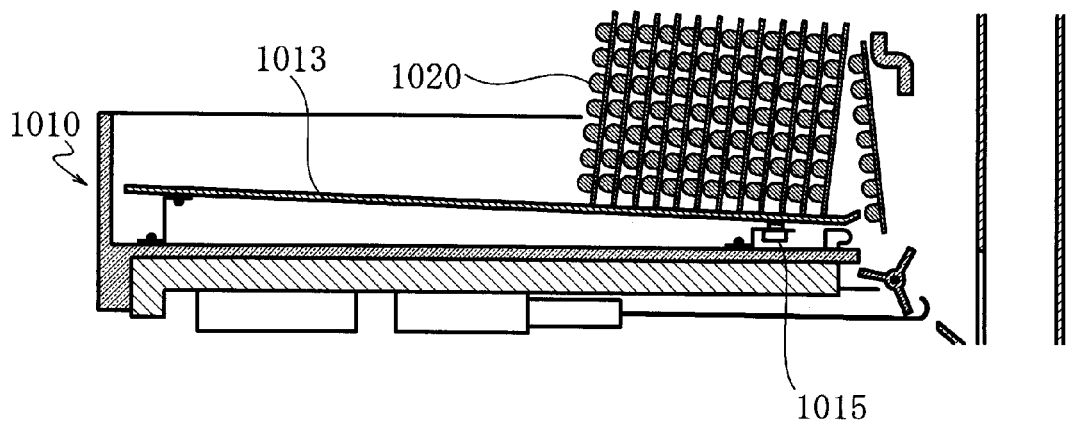

FIGS. 39A-41B show how the PTP dispensing apparatus 1040 operates, where FIG. 39A is a perspective view showing the appearance of a PTP-packaged drug (drug) 1020, and FIGS. 39B, 39C, 40A, 40B, 40C, 41A and 41B are sectional front views of an essential part including one cassette 1010 (longitudinal sectional left side views of the cassette).

FIGS. 35A-35F show how the pharmaceutical product storage apparatus 1200 operates, where FIG. 35A is a front view of the apparatus, FIG. 35B is a perspective view of the apparatus, and FIGS. 35E and 35F are right side views of an essential part. FIGS. 35A and 35E show the containers 1220 are pushed back and recede into the storing unit 1214. FIGS. 35B and 35F show that the container 1220 in the second tier and the second column from top right is selected and automatically advanced. The illustration of FIGS. 35E and 35F applies also to the storing unit 1114 of the pharmaceutical product storage apparatus 1100 shown in FIGS. 34B and 34C. FIG. 34B shows that the containers 1220 are pushed back and recede into the storing unit 1114. FIG. 34C shows that the container 1220 in the second tier and the third column from top right is selected and automatically advanced.

Prior to use, pharmaceutical products such as medicines and medical resources are accommodated in the containers 1220 of the pharmaceutical product storage apparatuses 1100 and 1200 according to the category. Typical examples of medicines (see patent document No. 5) include PTP-packaged drugs, ampoules and medicines dissolved before use. Typical examples medical resources include bone prothesis and medical operation tools. In this PTP dispensing system, as many individual pieces of PTP-packaged drugs as should be accommodated in the PTP dispensing apparatus 1040 are stocked according to the category in the containers 1220. Subsequently, PTP-packaged drugs not accommodated in the PTP dispensing apparatus 1040 are stocked according to the category in the containers 1220. Other pharmaceutical products are also stocked according to the category in the containers 1220 if space permits.

The containers 1220 accommodating these pharmaceutical products according to the category are pushed and inserted into the drawers of the storing units 1114 and 1214. The positions of the containers 1220 are entered manually or otherwise in the main controller 1300 and stored in a medicine master file etc. This completes preparation of the pharmaceutical product storage apparatuses 1100 and 1200. At this stage (see FIGS. 34B, 35A and 35E), none of the containers 1220 is not illuminated since the containers 1220 are in a pushed-back position and are closed.

A typical shape of the PTP-packaged drug (drug 1020) is a rectangular sheet which is flat on one side and which is provided with an array of pockets for accommodating drugs on the other side (see FIG. 39A). Typically, the width of the PTP-packaged drug 1020 is 10-100 mm, the length thereof is 100-200 mm, and the thickness thereof is several mm. The weight of the PTP-packaged drug 1020 is typically 10-200 mg.

The same preparation is undertaken for the PTP dispensing apparatus 1040 prior to use and automatic drug preparation. The difference is that the PTP-packaged drugs 1020 are accommodated in the PTP dispensing apparatus 1040 without cutting the packages into pieces. The drugs 1020 frequently used are accommodated in preference to other drugs. For accommodation of drugs, the empty cassette 1010 is removed from the support member 1043 before manually replenishing the drugs 1020 from above the open top of the cassette. When the replenishment is completed, the cassette is placed on the support member 1043 again (see FIG. 37).

The drugs 1020 replenished are serially arranged in the longitudinal direction of the cassette (see FIG. 39B), ensuring that the head and tail of the drugs 1020 are identically oriented in the drug accommodating space of the cassette 1010.

More specifically, the drugs 1020 are aligned for storage in the drug accommodating space in the outer plates 1011, starting at the head of the queue. In this process, each drug 1020 is provided above the vibrating member 1015 in an upright position inside the drug accommodating space. The drug at the head of the queue is accommodated such that the top end leans against the first contact surface 1012a of the top frame 1012 to prevent the drug from falling down. The other drugs 1020 in the queue are made to lean against each other. The drugs 1020 may lean at different angles or may be spaced apart from each other, forming different gaps, so long as the drugs 1020 are prevented from falling down.

Once the cassette 1010 is fitted to the support member 1043, the cassette 1010 is operated locally.

More specifically, the vibration control circuit 1052, the vibrating member 1015 and the ejection detecting member 1016 are connected via the connector 1051. Vibration control of the vibrating member 1015 in accordance with detection by the ejection detecting member 1016 is initiated by the vibration control circuit 1052. Since the drug 1020 is not located in the retention member 1018 yet, the inner plate 1013 is vibrated. This reduces friction so that the thrust derived from gravitation force commensurate with the slope exceeds the friction. The drug 1020 above the descending slope 1013a of the inner plate 1013 advances little by little. The drug 1020 at the head of the queue advances to a boundary between the descending slope 1013a and the ascending slope 1013b and the drugs 1020 that follow are moved closer to each other so that the accommodated drugs 1020 are neatly aligned inside the drug accommodating space.

In this condition, vibration still continues and the drugs 1020 are thrust forward. The drug 1020 at the head of the queue continues to be prevented from advancing since the top end thereof is blocked by the top frame 1012, but the lower end thereof gets over the ascending slope 1013b and leaves the inner plate 1013 so as to enter the space in front of the open front (see FIG. 39C). The drug is then detached from the outer plates 1011 and the top frame 1012 under its own weight and retained in the retention member 1018 such that the lower end of the drug rests on the upward facing concave part of the retention member 1018, and the top end of the drug is caught by the second contact surface 1012b of the top frame 1012 and is retained there (see FIG. 40A). Concurrently, the top end of the drug 1020, next in line and located on the inner plate 1013 without the ejected drug 1020, leans against the first contact surface 1012a of the top frame 1012, and the lower end of the drug 1020 advances to the boundary between the descending slope 1013a and the ascending slope 1013b.

The drug 1020 brought onto the retention member 1018 enters a range of detection by the ejection detecting member 1016. The detection output of the ejection detecting member 1016 changes to indicate that the drug is retained. In response to this, the vibration control circuit 1052 stops activating the vibrating member 1015 so that the inner plate 1013 comes to rest and is maintained in the current condition.

The drug 1020 retained on the retention member 1018 is separated from the queue and temporarily held on the retention member 1018 in an isolated state. In this state, the drug 1020 is free from pressure from the drugs 1020 aligned with each other on the inner plate 1013 or from friction derived from the pressure. Therefore, the drugs 1020 can be discharged one by one in an efficient and stable manner.

This completes the preparation of the PTP dispensing system for use. When prescription data or drug preparation instruction data is delivered to the main controller 1300 via communication or manual operation, medicine codes and prescribed amount are extracted from the data to formulate pharmaceutical product dispensing information. The main controller 1300 searches the medicine master file in accordance with the pharmaceutical product dispensing information. If any of the prescribed drugs 1020 can be automatically dispensed from the PTP dispensing apparatus 1040, the prescribed drug is selected. If not, or if the information indicates drug pieces instead of a package, and if any of the prescribed drugs can be dispensed from the pharmaceutical product storage apparatus 1100 or the apparatus 1200 in a semi-automatic fashion, the prescribed drug is selected. In either case, the number of drugs to be dispensed is displayed on the indicator 1150.

When any of the cassettes 1010 of the PTP dispensing apparatus 1040 is selected by the main controller 1300 for drug ejection, the main controller 1300 directs the associated vibration control circuit 1052 to eject the drug. This causes the solenoid 1053 to be operated under the control of the vibration control circuit 1052. The hook member 1054 recedes along with the advancing and receding member. In association with this, the hooked part of the hook member 1054 axially rotates the retention member 1018 (see FIG. 40B). When the axial rotation brings the retention member 1018 from a position to retain a drug to a position to discharge one (see FIG. 40C), the drug 1020 retained hitherto slides down from the retention member 1018 and is discharged into the descent guidance duct 1042.

The drug 1020 discharged from the cassette 1010 (see FIGS. 36A and 36B) drops in free fall through the descent guidance duct 1042, collected by the collecting mechanism 1044 and transported to the dispensing outlet 1046 by the transporting mechanism 1045. Thus, the drug 1020 ejected from the target cassette 1010 to the descent guidance duct 1042 are automatically dispensed. As the drug 1020 is taken out from the cassette 1010, no drugs 1020 remain retained on the retention member 1018. The cassette is now in a condition that occurred when the drugs are replenished except that the number of accommodated drugs 1020 is reduced by one (see FIG. 41A). Vibration of the inner plate 1013 is resumed so that the next drug 1020 in line is ejected out of the open front of the outer plates 1011 and then retained in the retention member 1018 (see FIG. 41B).

The operation described above is repeated each time the drug 1020 is discharged and finally ejected from the retention member 1018. Thus, the vibration-assisted ejection cassette 1010 enables efficient and reliable piece-by-piece automatic ejection of the PTP-packaged drugs 1020. The PTP dispensing apparatus 1040 is capable of storing various PTP-packaged drugs 1020 and automatically dispensing a desired one.

The drug 1020 dispensed from the PTP dispensing apparatus 1040 is transferred onto the transporting mechanism 1160 of the pharmaceutical product storage apparatus 1100 via the dispensing outlet 1046 and the incoming port 1118, and then transported to the discharge opening 1117 by the transporting mechanism 1160 before being fed to the chute 1116. The drug is then placed on the weighing dish of the weighing scale 1170 and weighed.

In parallel with or independent of this process, the main controller 1300 may select a pharmaceutical product in the pharmaceutical product storage apparatus 1100 or the pharmaceutical product storage apparatus 1200 for dispensing/retrieval in accordance with the pharmaceutical product dispensing information. In this case, the container 1220 storing the drug to be dispensed or taken out is selected and the mechanism 1230-1233 behind the selected container is activated. The target container 1220 is then pushed forward by the eccentric cam 1232 and opened. The light projecting member 1213 above projects light.

In this state (see FIGS. 34C and 35B), the front end of the target container 1220 is projected from the storing unit 1114 or the unit 1214 so that the light projected by the light projecting member 1213 impinges upon the slope 1222 of the container 1020, thereby directing the projected and diffused light A forward. As a result, the container 1220 is seen illuminated. In this way, the container 1220 for retrieval of a pharmaceutical product is highlighted and opened. An operator places his or her finger on the front plate 1221 through the opening so as to pull out the container 1220. The operator takes out a desired pharmaceutical product, closes the container 1220 by pushing it back and indicates to the main controller 1300 that the job is completed in order to save a job record. In response to this, the light projecting member 1213 stops projecting light.

In this way, manual dispensing of pharmaceutical products, stored in the pharmaceutical product storage apparatuses 1100 and 1200 according to the category in a closed status, can be performed easily and efficiently. Since pharmaceutical products are taken out manually, a desired number of products can be taken out in accordance with the guidance provided by the indicator 1150, even if the desired number is smaller than the number of products in a package. While the operation of taking out is manually performed, selection of a target of retrieval and operation of advancing are automatic, resulting in semi-automatic operation. Thus, desired drugs are dispensed easily and efficiently. As mentioned above, the mechanism 1230-1233 is of a simple structure comprised of a combination of the motor 1230 and the eccentric cam 1232. The number of light projecting members 1213 is small in that it is equal to the number of columns of the drawer frames of the storing units 1114 and 1214 and smaller than the number of containers 1220. Thus, the pharmaceutical product storage apparatuses 1100 and 1200 can be fabricated at a low cost.

Pharmaceutical products dispensed from the pharmaceutical product storage apparatuses 1100 and 1200 are assembled on the work table 1115 by the operator. After being inspected as to drug type and quantity, the products are slid on the work table 1115 before being dropped to the chute 1116. The products are then placed on the weighing dish of the weighing scale 1170 and weighted along with the drug 1020. The weight is displayed in the weighing scale 1170 and is also communicated by the weighing scale 1170 to the main controller 1300 by using a signal or the like. The main controller 1300 converts the weight into a drug count by referring to, for example, the weight per unit of drugs maintained in a medicine master file. The count is checked against the prescribed amount. When the count and the amount match, the indicator 1150 displays OK, for example. In the event of failure to match, the indicator 1150 displays NG, for example.

The operator may refer to the display to know whether there is a match and also to the number of products dispensed. The operator can then proceed to drug preparation checkup by transferring the drug 1120 and the product to the work table 1150 from the weighing scale 1170. In this way, the operator can easily follow the steps of checkup as well as drug preparation.

Thus, with the inventive PTP dispensing system, a large number of PTP-packaged drugs can be efficiently prepared and then checked at a reasonable cost.

Illustrative Embodiment 6-2

The specific structure of the illustrative embodiment 6-2 of the PTP dispensing apparatus according to the embodiment will be described with reference to the associated drawings. FIG. 42 is a sectional left side view of the cassette 1010.

The PTP dispensing apparatus differs from that of the illustrative embodiment 6-1 in the specific structure of the inner plate 1013 and the vibrating member 1015 of the cassette 1010.

The difference is that the cassette 1010 is that multiple (in the illustrated example, three) vibrating members 1015 are provided in the cassette 1010 and the descending slope 1013*a* of the inner plate 1013 is segmented (in the illustrated example, into three segments) so as to correspond to the vibrating members 1015.

The single vibrating member 1015 may be replaced by a large one to enhance capability to vibrate. In this case, however, increase in cost is minimized by using a desired number of inexpensive mass-produced products. Another advantage is that, by distributing multiple vibrating members 1015 in the longitudinal direction of the inner plate 1013, the entire inner plate 1013 is vibrated uniformly.

Illustrative Embodiment 6-3

Figure 43C:
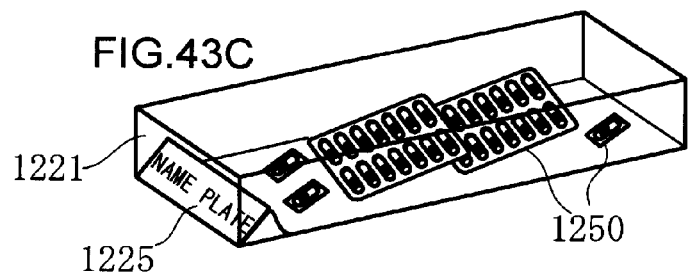

The specific structure of the pharmaceutical product storage apparatus according to the illustrative embodiment 6-3 will be described with reference to the associated drawings. FIG. 43A is a perspective view of the container 1220; FIG. 43B is a front view of a name plate 1225; and FIG. 43C is a perspective view of the container 1220. A complete PTP-packaged drug and a piece cut off from the package are shown in FIG. 43C as examples of pharmaceutical products 1250.

The pharmaceutical product storage apparatus differs from that of the illustrative embodiment 6-1 in that the container 1220 is integrally formed of transparent plastic and the visualizing means attached is implemented by the name plate 1225 placed on the slope 1222.

The container 1220 can be integrally fabricated at a low cost, using the same material for the slope 1222, the side plate 1223, the bottom plate 1224 and the front plate 1221.

The name plate 1225 is non-transparent paper or a plastic sheet and is formed with substantially the same size as the slope 1222. At least one side thereof is formed as a coarse surface reflecting and diffusing impinging light. The name and/or code of a medicine is handwritten or printed on the name plate 1225.

In this case, the visualizing means is easily and inexpensively provided in the container 1220 by placing the name plate 1225 on the slope 1222 with the printed or handwritten surface facing upward.

Illustrative Embodiment 6-4

The pharmaceutical product storage apparatus according to the embodiment, an essential part of which is shown in the right side view of FIGS. 44A-44C differs from those of the illustrative embodiments 6-1 and 6-3 in that the bottom plate 1224 of the container 1220 is non-transparent and that a light receiving member 1260 is provided at the destination of projection of light from the light projecting member 1213. The main controller 1300 is configured (not shown) to determine whether the container 1220 is drawn by referring to the light reception state of the light receiving member 1260.

In this case, as the mechanism 1230-1233 projects the container 1220 for retrieval out of the storing unit 1114 or the unit 1214 (see FIG. 44A), the light projected from the light projecting member 1213 to the light receiving member 1260 is blocked by the front end of the container 1220, preventing the light receiving member 1260 from receiving the light.

When the container 1220 is drawn further forward for retrieval of the pharmaceutical product 1250 (see FIG. 44B), the light receiving member 1260 continue to fail to receive the light because the light projected from the light receiving member 1213 to the light receiving member 1260 is blocked by the bottom plate 1224 of the container 1224 unless the container 1220 is completely pulled out.

Meanwhile, when the container 1220 is pushed back upon completion of the retrieval of the pharmaceutical products 1250, causing the container 1220 to recede into the storing unit 1114 or the unit 1214 (see FIG. 44C), nothing blocks the light projected from the light projecting member 1213 to the light receiving member 1260 so that the light receiving member 1260 receives the light.

A signal indicating change in the light reception status of the light receiving member 1260 that depends on whether the container 1220 is projected is input to the main controller 1300. A time stamp is included in log data.

If the failure of the light receiving member 1260 to receive the light cannot be detected even if the motor 1230 is activated, the main controller 1300 determines that automatic advancement of the container 1220 is not completed and issues an appropriate alarm.

If there is an input indicating the completion of a dispensing operation while resumption of reception of light by the light receiving member 1260 is not detected, the main controller 1300 determines that the dispensing operation is not completed and issues a guidance message prompting the operator to close the container 1220.

[Other Points of Note]

The cassettes 1010 may be cylindrically arranged as in the storage of patent document No. 2 instead of being arranged in a mutually orthogonal matrix.

In the illustrated examples, the control circuit 1052 and the actuator mechanism comprising the solenoid 1053 and the hook 1054 are fitted to the support member 1043. Alternatively, these elements may be fitted to the cassette 1010. For example, the circuit 1052 and the actuator mechanism may be fitted to the bottom plate of the outer plates 1011 and be fed power via the connector 1051.

In the above-described illustrative embodiments 6-1 and 6-2, it is ensured that the head and tail of the PTP-packaged drugs are identically oriented when the drugs are aligned in the drug accommodating space of the cassette. However, this is not an essential requirement. The orientation of the head and tail of the PTP-packaged drugs may only be given secondary consideration so long as the aligned condition is not impaired.

In the above-described illustrative embodiments 6-1 and 6-2, the drugs are taken out one by one from the cassette. Alternatively, multiple (e.g. two or three) drugs may be taken out at a time. More specifically, this can easily be achieved by extending the distance between the front end of the inner plate and the opposite face of the retention member.

In the illustrative embodiments 6-1, 6-3 and 6-4 described above, it is assumed that the containers 1220 have the same size and shape. Alternatively, the containers may come in different sizes or shapes. In that case, the height of the eccentric cam 1232 may be varied so as to be compatible with the height of the container 1220. The motor 1230 may not be at substantially the same height as the associated container 1220 so long as the eccentric cam 1232 is capable of pressing the rear end of the container 1220.

The light projecting member 1213 may be provided in front, or to the left or right of the front space, instead of above thereof. The direction of projection of light by the light projecting member 1213 may be upward, horizontal or diagonal instead of vertically downward.

In the illustrative embodiments, the control device is of a two-tier structure including the main controller 1300 and the subcontrollers 1310, 1311 and 1312. Alternatively, a local controller may be provided for each of the dispensing apparatuses 1040, 1100 and 1200 to achieve a three-tier structure including the main controller 1300, the local controller and the subcontrollers 1310, 1311 and 1312.

In the illustrative embodiments, an escalator-like slope conveyor is illustrated as an example of the transporting mechanism 1160. The transporting mechanism 1160 may be like an elevator or a combination of multiple types.

In the illustrative embodiments, the work table 1115 is cut immediately above the discharge opening 1117. Alternatively, the table may be projected above the chute 1116.

The pharmaceutical product storage apparatus 1200 is a version of the pharmaceutical product storage apparatus 1100 in which the storing unit is expanded. The number of apparatuses 1200 varies appropriately depending on the number of types of pharmaceutical products.

Described above is a description based on the preferred embodiments. While the preferred embodiments of the present invention have been described using specific terms, such description is for illustrative purposes only, and it is to be understood that changes and variations may be made without departing from the spirit or scope of the appended claims.

Industrial Usability

As described, the present invention is applicable to the job of dispensing PTP-packaged drugs etc.

The invention claimed is:

1. A vibration-assisted ejection cassette for aligning PTP-packaged or equivalently packaged drugs for storage and sequentially ejecting the drugs, comprising:
   outer plates which bound at least the sides of a drug accommodating space, a top of the space being open so as to facilitate replenishment of a drug and a front of the space being open so as to facilitate ejection of a drug;
   a top frame provided above the front of the space which prevents a drug at a head of a queue of drugs accommodated in the space from falling forward by interfering with a top end of the drug;
   an inner plate which is movably inserted to rest on an interior bottom of the drug accommodating space so as to be vibratably supported, a front end portion of a top face of the inner plate being formed as an ascending slope and a remaining portion of the inner plate being formed as a descending slope; and
   a vibrating member which vibrates the inner plate,
   wherein the front of the space has an opening for ejecting the drug at the head of the queue prevented from advancing by interference with the top frame by the top end of the drug and the open front is located substantially at an original position when the inner plate is vibrated.

2. The vibration-assisted ejection cassette according to claim 1, further comprising:
   a retention member which is provided in front of the open front and which retains the accommodated drug ejected from the open front; and
   a cassette controller which detects whether or not a drug is retained so as to activate the vibrating member when a drug is not retained and stop activating the vibrating member when a drug is retained.

3. A drug dispensing apparatus, wherein the vibration-assisted ejection cassettes according to claim 2 are arranged in a housing.

4. The vibration-assisted ejection cassette according to claim 1, comprising:
   a retention member which is provided in front of the open front and which retains the accommodated drug ejected from the open front; and
   a controller which detects whether or not a drug is retained so as to activate the vibrating member when a drug is not retained and stop activating the vibrating member when a drug is retained, wherein
   the retention member is movable and adapted to be positioned to discharge a drug as well as being positioned to retain one.

5. A drug dispensing apparatus, wherein the vibration-assisted ejection cassettes according to claim 4 are arranged in a housing.

6. A vibration-assisted ejection cassette, comprising:
   outer plates which align PTP-packaged or equivalently packaged drugs for storage;
   a top frame provided above an open front which prevents a drug at a head of a queue of accommodated drugs from falling forward by interfering with a top end of the drug;
   an inner plate which carries the accommodated drugs and advances the drugs when vibrated;
   a vibrating member which vibrates the inner plate, wherein the open front has an opening for ejecting the drug at the head of the queue prevented from advancing by interference with the top frame by the top end of the drug and the open front is located substantially at an original position while the inner plate is vibrated;
   a retention member which is provided in front of the open front and which retains the accommodated drug ejected from the open front; and
   a cassette controller which detects whether or not a drug is retained so as to activate the vibrating member when a drug is not retained and stop activating the vibrating member when a drug is retained.

7. A drug dispensing apparatus, wherein the vibration-assisted ejection cassettes according to claim 6 are arranged in a housing.

8. The drug dispensing apparatus according to claim 7, comprising:
   a plurality of indicators which are provided directly in the respective vibration-assisted ejection cassettes or indirectly provided in association therewith, so as to display at least a one-digit number; and
   an apparatus controller which selects one of the indicators in accordance with drug dispensing information such as drug preparation data, which causes the selected indicator to display the number of drugs to be taken out, and which updates the displayed number in accordance with the detection of ejection from the vibration-assisted ejection cassette for which the selected indicator is provided.

9. A vibration-assisted ejection cassette, comprising:
   outer plates which align PTP-packaged or equivalently packaged drugs for storage;
   a top frame provided above an open front which prevents a drug at a head of a queue of accommodated drugs from falling forward by interfering with a top end of the drug;
   an inner plate which carries the accommodated drugs and advances the drugs when vibrated; and
   a vibrating member which vibrates the inner plate,
   wherein the open front has an opening for ejecting the drug at the head of the queue prevented from advancing by interference with the top frame by the top end of the drug and the open front is located substantially at an original position while the inner plate is vibrated;
   a retention member which is provided in front of the open front and which retains the accommodated drug ejected from the open front; and
   a controller which detects whether or not a drug is retained so as to activate the vibrating member when a drug is not retained and stop activating the vibrating member when a drug is retained, wherein
   the retention member is movable and adapted to be positioned to discharge a drug as well as being positioned to retain one.

10. A drug dispensing apparatus, wherein the vibration-assisted ejection cassettes according to claim 9 are arranged in a housing.

11. The drug dispensing apparatus according to claim 10, further comprising an actuator mechanism which selects a desired vibration-assisted ejection cassette and activates the retention member of the selected cassette.

12. A PTP dispensing apparatus comprising:
- a large number of cassettes which align PTP-packaged or equivalently packaged drugs for storage so that the drugs are sequentially ejectable;
- a support which accommodates and holds the cassettes;
- a descent guidance member which guide the drugs discharged from the cassettes downward; and
- a collecting mechanism which collect the drugs, wherein each of the cassettes comprises:
- outer plates which accommodate drugs;
- a top frame which is provided above an open front and which prevents a drug at a head of a queue of accommodated drugs from falling forward via physical contact with a top end of the drug;
- an inner plate which carries the accommodated drugs and advances the drugs when vibrated;
- a vibrating member which vibrates the inner plate, wherein the open front of each cassette has an opening for ejecting the drug at the head of the queue prevented from advancing by the contact of the top end of the drug with the top frame and the open front is located substantially at an original position while the inner plate is vibrated; and
- a retention member which is provided in front of the open front and which retains the accommodated drug ejected from the open front, wherein
- an activating mechanism, which acts on the retention member so as to discharge a retained drug towards the descent guidance member, is provided for each cassette so as to detect whether or not a drug is retained in the retention member and activate the vibrating member when a drug is not retained and stop activating the vibrating member when a drug is retained.

13. The PTP dispensing apparatus according to claim 12, wherein, in the top frame is formed:
- a first contact surface in contact with the top end of the drug at the head of a queue on the inner plate; and
- a second contact surface located in front of and below the first contact surface and in contact with the top end of the drug retained on the retention member, and wherein
- the activating mechanism axially rotates the retention member so that the retention member assumes one of two positions, i.e., a position to retain a drug and a position to discharge one.

* * * * *